US011111996B2

(12) United States Patent
Chu

(10) Patent No.: US 11,111,996 B2
(45) Date of Patent: Sep. 7, 2021

(54) DIFFERENTIAL SYSTEM INCLUDING STEPPED PLANETARY GEARS WITH DIFFERENTIAL RATE GOVERNED BY VARIABLE SPEED MOTOR AND ASSOCIATED METHOD OF OPERATION

(71) Applicant: Shaun Chu, Canton, MA (US)

(72) Inventor: Shaun Chu, Canton, MA (US)

( * ) Notice: Subject to any disclaimer, the term of this patent is extended or adjusted under 35 U.S.C. 154(b) by 0 days.

(21) Appl. No.: 16/811,709

(22) Filed: Mar. 6, 2020

(65) Prior Publication Data
US 2020/0278015 A1    Sep. 3, 2020

Related U.S. Application Data

(63) Continuation of application No. PCT/US2018/050086, filed on Sep. 7, 2018.
(Continued)

(51) Int. Cl.
*F16H 48/08* (2006.01)
*F16H 48/36* (2012.01)

(52) U.S. Cl.
CPC ............ *F16H 48/36* (2013.01); *F16H 48/08* (2013.01); *F16H 2048/364* (2013.01); *F16H 2048/368* (2013.01)

(58) Field of Classification Search
CPC .... F16H 48/08; F16H 48/36; F16H 2048/364; F16H 2048/368; B60K 17/16; B60K 17/165
(Continued)

(56) References Cited

U.S. PATENT DOCUMENTS 1,382,289 A    6/1921   Janicki
2,746,319 A    5/1956   Greenbergh
(Continued)

FOREIGN PATENT DOCUMENTS

EP      1621800 A2     2/2006
GB      2428755 A      2/2007
WO   2017/198357 A1   11/2017

OTHER PUBLICATIONS

International Search Report and Written Opinion for Application No. PCT/US2018/050086, dated Jan. 15, 2019, 13 pages.
(Continued)

*Primary Examiner* — Leslie A Nicholson, III
(74) *Attorney, Agent, or Firm* — McCarter & English, LLP; Anita M. Bowles

(57) ABSTRACT

Disclosed herein are systems, gearing assemblies and methods for controlling a differential rotation rate between shafts of a vehicle using a variable speed motor. An embodiment includes a gearing assembly including a differential configured to engage a first axle shaft, a second axle shaft, and a drive shaft of a vehicle. The gearing assembly further includes a first plurality of adjustment gears and a second plurality of adjustment gears configured to engage the differential, configured to be driven by a variable speed reversible motor of the vehicle, and configured to controllably alter a rotation rate of a first axle shaft relative to a rotation rate of the second axle shaft based on rotation produced by the variable speed reversible motor. The first plurality of adjustment gears and the second plurality of adjustment gears each including stepped planetary gears.

20 Claims, 40 Drawing Sheets

Related U.S. Application Data

(60) Provisional application No. 62/556,221, filed on Sep. 8, 2017.

(58) Field of Classification Search
USPC .......................................................... 475/150
See application file for complete search history.

(56) References Cited

U.S. PATENT DOCUMENTS

| | | | |
|---|---|---|---|
| 3,010,342 A | 11/1961 | Kelley | |
| 3,450,218 A | 6/1969 | Looker | |
| 4,776,235 A | 10/1988 | Gleasman et al. | |
| 4,784,017 A | 11/1988 | Johnshoy | |
| 4,819,512 A | 4/1989 | Azuma et al. | |
| 5,368,120 A | 11/1994 | Sakai et al. | |
| 5,387,161 A | 2/1995 | Shibahata | |
| 5,409,425 A | 4/1995 | Shibahata | |
| 6,120,407 A * | 9/2000 | Mimura | B60K 17/16 475/205 |
| 6,959,799 B2 | 11/2005 | Fusegi et al. | |
| 7,056,252 B2 | 6/2006 | Gumpoltsberger et al. | |
| 7,115,057 B2 | 10/2006 | House | |
| 7,238,140 B2 * | 7/2007 | Gradu | B60K 23/04 475/221 |
| 7,273,436 B2 | 9/2007 | Hiroyuki et al. | |
| 7,344,469 B2 | 3/2008 | Sharma et al. | |
| 7,357,748 B2 | 4/2008 | Kelley, Jr. | |
| 7,500,933 B2 | 3/2009 | Baasch et al. | |
| 7,588,511 B2 | 9/2009 | Tangl et al. | |
| 7,604,560 B2 | 10/2009 | Shiotsu et al. | |
| 8,672,790 B2 | 3/2014 | Severinsson et al. | |
| 9,109,687 B1 | 8/2015 | Chu | |
| 9,709,148 B1 | 7/2017 | Chu | |
| 10,352,424 B2 | 7/2019 | Chu | |
| 10,697,528 B2 * | 6/2020 | Chu | B60K 23/04 |
| 2005/0266951 A1 | 12/2005 | Han | |
| 2005/0272547 A1 | 12/2005 | House | |
| 2006/0025267 A1 | 2/2006 | Gradu | |
| 2006/0025273 A1 | 2/2006 | Gradu | |
| 2006/0079370 A1 | 4/2006 | Kushino | |
| 2006/0172847 A1 | 8/2006 | Gradu | |
| 2009/0197727 A1 | 8/2009 | Janson | |
| 2009/0270214 A1 | 10/2009 | Nowak et al. | |
| 2010/0234158 A1 | 9/2010 | Kato et al. | |
| 2010/0234161 A1 | 9/2010 | Kato et al. | |
| 2012/0035820 A1 | 2/2012 | Falkenstein | |
| 2012/0245776 A1 | 9/2012 | Okada et al. | |
| 2013/0200210 A1 | 8/2013 | Oswald et al. | |
| 2013/0203543 A1 | 8/2013 | Sten | |
| 2014/0274527 A1 | 9/2014 | Sten et al. | |
| 2014/0315675 A1 | 10/2014 | Watanabe | |
| 2015/0166035 A1 | 6/2015 | Gieryluk | |
| 2015/0336453 A1 | 11/2015 | Pinschmidt | |
| 2016/0356370 A1 | 12/2016 | Richards et al. | |
| 2017/0227105 A1 | 8/2017 | Pinschmidt et al. | |
| 2018/0154882 A1 | 6/2018 | Sasaki et al. | |
| 2019/0128396 A1 | 5/2019 | Chu | |
| 2019/0383379 A1 | 12/2019 | Chu | |

OTHER PUBLICATIONS

U.S. Appl. No. 16/428,426, filed May 31, 2019, U.S. Pat. No. 10,352,424, Issued.
U.S. Appl. No. 16/428,426, filed May 31, 2019, 2019-0383379, Published.
U.S. Appl. No. 15/239,733, filed Aug. 17, 2019, U.S. Pat. No. 9,709,148, Issued.
U.S. Appl. No. 15/623,178, filed Jun. 14, 2017, U.S. Pat. No. 10,352,424, Issued.
U.S. Appl. No. 16/428,426, filed May 31, 2019, U.S. Pat. No. 10,907,715, Issued.
U.S. Appl. No. 17/138,565, filed Dec. 30, 2020, Pending.
U.S. Appl. No. 16/138,814, filed Sep. 21, 2018, 2019-0128396 / U.S. Pat. No. 10,697,528, Issued.

* cited by examiner

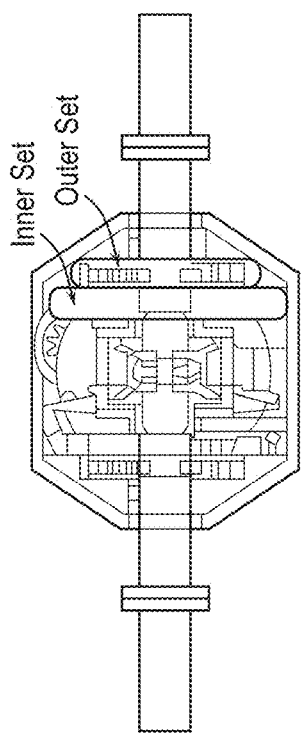

| Simple Planetary Configuration | | |
|---|---|---|
| Sun Teeth (Ts) | 36 | |
| Ring Teeth (Tr) | 84 | |
| Planets (Tp=sum of Ts+Tr) | 120 | |
| | Inner Set Ratio | |
| Driven = Tp | 120 | |
| Drive = Tr | 84 | |
| Ratio | 1.428571429 | |
| | Outer Set Ratio | |
| Driven = Ts | 36 | |
| Drive = Tp | 120 | |
| Ratio | 0.300 | |
| Overall Reduction Ratio | 0.429 | |

| Compound Planetary Configuration (large planet meshes with ring, small planet meshes with sun) Assume all gears are same module | | | | | | |
|---|---|---|---|---|---|---|
| Inner Set Ratio: Ring to Carrier (sun fixed) | | | | Outer Set Ratio: Carrier to Sun (ring fixed) | | |
| Ring Speed | 50 | | | Carrier Speed | 16.667 | |
| Sun Teeth (Ts) | 60 | | 60 | Sun Teeth (Ts) | 60 | 60 |
| Ring Teeth (Tr) | 105 | | 105 | Ring Teeth (Tr) | 105 | 105 |
| Small Planet Teeth (Tps) | 10 | | 10 | Small Planet Teeth (Tps) | 10 | 10 |
| Big Planet Teeth (Tpb) | 35 | | 35 | Big Planet Teeth (Tpb) | 35 | 35 |
| Compound planet ratios | Tr/Tpb | Tps/Ts | | Compound planet ratios | Ts/Tps | Tpb/Tr |
| | 3.00 | 0.17 | | | 6.00 | 0.33 |
| Ring-Carrier Ratio | | 0.50 | | Carrier-Sun Ratio | | 2.00 |
| speed difference between ring and carri | X= | 33.333 | | speed difference between carrier and sun | X= | 8.333 |
| Carrier Speed for given Ring Speed | Y= | 16.667 | | Sun Speed for given Carrier Speed | Y= | 25.000 |
| Reduction Ratio | | 3.000 :1 | | | | 0.667 :1 |
| | | | | Overall Reduction Ratio | | 2.00 :1 |

FIG. 15

DIFFERENTIAL SYSTEM INCLUDING STEPPED PLANETARY GEARS WITH DIFFERENTIAL RATE GOVERNED BY VARIABLE SPEED MOTOR AND ASSOCIATED METHOD OF OPERATION

RELATED APPLICATIONS

The application is a continuation of PCT/US2018/050086, filed Sep. 7, 2018, which claims benefit of and priority to U.S. Provisional Application No. 62/556,221 filed Sep. 8, 2017, the contents of both applications are incorporated herein by reference in their entireties.

BACKGROUND

Most vehicles have engines and transmissions. The engine and transmission is used to turn a drive shaft of the vehicle or equipment. The drive shaft is connected to a differential, which transfers the rotational energy of the drive shaft to the axle shafts and wheels of the vehicle for wheeled vehicles such as automobiles or to the axels and tracks of the vehicle for tracked vehicles such as tanks and tracked bulldozers.

Generally, when a vehicle is driving in a straight line, the tracks or wheels on the left side of the vehicle and the tracks or wheels on the right side of the vehicle rotate at the same speed. However, when the vehicle makes a turn, the tracks or wheels on the outside of the turn must travel farther than the tracks or wheels on the inside of the turn. Consequently, the tracks or wheels on the outside of the turn must rotate at a slightly faster rate than the inside tracks or wheels during the turn. The use of differentials enables opposing axle shafts on opposite sides of the vehicle to rotate at different speeds. As such, the tracks or wheels of the vehicle can each rotate at the proper speed to accommodate a turn.

Steering is performed differently in vehicles that employ differential steering (e.g., tanks, tracked bulldozers, skid-steered loaders, etc.), than in vehicles with wheels that employ front-wheel steering. Both differentially steered vehicles and front-wheel steered vehicles share the need to permit and to control differences in wheel rotation rates between the inside and outside wheels (or tracks) during a turn. However, despite this commonality, the designs, and control methods between these two types of vehicles have several key differences, as discussed below.

In the case of a differentially-steered vehicle, a controlled difference between the left and right track speeds or left and right wheel speeds provides the sole means of executing a desired turn, and as a result, these types of vehicles require direct active control over differential rates. There are many known gear designs that aim to achieve this active control. Some designs achieve steering control by applying friction to one side of the vehicle's traction elements in order to slow down one side, thus causing the vehicle to turn toward the side that is slowed down. Such "braked" differential steering systems are inherently inefficient due to frictional losses that the propulsion system must overcome while steering. These "subtractive" designs also tend to lack precision due to the difficulty in achieving exact rotation rates through differential braking.

Other designs, such as the double differential gear, provide a separate steering input shaft to selectively alter the differential rate. Such gear-based designs are regenerative in the sense that the steering input equally accelerates one axle shaft as it slows down the opposite axle shaft. This allows greater steering authority and precision over friction-based designs. However, these gear-based differential steering designs typically employ multiple control shafts mounted adjacent to, and intermeshing with the axle shafts. For example, in the no-slip imposed steering differential described and depicted in U.S. Pat. No. 4,776,235 to Gleasman et al., these adjacent control shafts appear as elements 22 and 23 in FIG. 1. While such designs are more efficient and precise than brake-based differential steering, they typically require large and heavy housings in order to accommodate the separate drive, control, and counter-rotating idler shafts. Moreover, the need to transmit propulsive power through an increased number of counter-rotating gear elements (even during straight line travel) results in reduced drivetrain efficiency from parasitic drivetrain losses.

In the case of many conventional differentials for front-wheel steered vehicles, the difference in relative wheel rotation rates is not used to steer or turn the vehicle, but is merely accommodated (such as with an open differential) in order to preserve the vehicle's steering agility and to prevent excess tire wear and driveline binding. These conventional differentials for front-wheel steered vehicles, such as open differentials, generally work well during operation when the wheels of the automobile are encountering good road conditions. However, this approach results in a susceptibility to undesired wheel slip if the vehicle encounters slippery or unequal traction conditions. Roads are often covered in snow, ice, dirt, gravel, mud and the like that can cause a wheel to slip or skid during a turn. In such situations, open differentials may allow too much power to be applied to the slipping wheel. This can adversely affect the safety of the vehicle. In an effort to mitigate this, some differential designs employ mechanisms to detect and react to the undesired wheel slip by applying friction to slow down an already-slipping wheel. More recent advancements aim to provide more pro-active slip control such as through torque vectoring during a turn, or by pre-emptively toggling specialized traction modes for a given traction condition. Regardless, these methods still redirect power between opposing wheels by applying differential friction (either through braking or clutches) in response to steering or other inputs. This reliance on friction to limit undesired wheel slip leads to the same inherent inefficiencies and imprecisions that plague brake-based differentially-steered vehicle applications. It should be no surprise, therefore, that such friction-based slip-limiting traction control systems are often unable to arrest the loss of momentum when responding to a dramatic traction imbalance such as one wheel suddenly coming off the ground while climbing a hill.

A need therefore exists for an improved differential system for differentially steered vehicles. A need also exists for an improved differential system for front-wheel steered vehicles that precisely controls a differential rotational rate between different axle shafts while allowing for no significant slip.

SUMMARY

Embodiments described herein include systems, gearing assemblies, and methods for controlling differential rotation between different axle shafts of a vehicle.

In one embodiment, a gearing assembly is provided. The gearing assembly includes a differential configured to engage a first axle shaft, a second axle shaft, and a drive shaft of a vehicle. The gearing assembly further includes a plurality of adjustment gears configured to engage the differential, configured to be driven by a variable speed motor of the vehicle, and configured to controllably alter a rotation of the first axle shaft relative to the second axle shaft based on rotation produced by the variable speed motor. The plurality of adjustment gears includes a subassembly of planetary gears including a planetary gear carrier, a first set of planetary gears coupled to the planetary gear carrier, and a second set of planetary gears coupled to the planetary gear carrier.

In an example embodiment, the second set of planetary gears is configured to couple with the first axle shaft of the vehicle.

In an example embodiment, the plurality of adjustment gears further includes a sun gear coupled with or attached to the differential, where the sun gear is configured to engage the first set of planetary gears. The plurality of adjustment gears interact with the differential through the sun gear. In an example embodiment, the differential includes a gear carrier and the sun gear is attached to the gear carrier. In an embodiment, the differential includes a miter gear carrier and the sun gear is attached to the miter gear carrier.

In an example embodiment, the plurality of adjustment gears further includes an internal gear configured to engage the second set of planetary gears, where the internal gear is stationary with respect to the variable speed motor.

In an example embodiment, the orbital speed of the first set of planetary gears is proportional to the rotational speed of the first axle shaft. In a further embodiment, the plurality of adjustment gears is configured to enable the orbital speed of the first set of planetary gears to be selectively adjusted using the variable speed motor.

In an example embodiment, the plurality of adjustment gears further includes an annular gear or a ring gear that transfers rotational motion from the variable speed motor to the first set of planetary gears. In a further embodiment, the annular gear or the ring gear has interior gear teeth that engage the first set of planetary gears. In yet a further embodiment, the annular gear or the ring gear also has exterior teeth that are engaged by a control shaft driven by the variable motor.

In yet a further embodiment, the plurality of adjustment gears is configured such that zero rotation of the annular gear or the ring gear corresponds to no difference in rotational velocity between the first axle shaft and the second axle shaft.

In yet another embodiment, the plurality of adjustment gears is configured such that a rate of rotation of the annular gear or the ring gear is proportional to a desired difference in rotational velocity between the first axle shaft and the second axle shaft.

In an example embodiment, the plurality of adjustment gears is configured such that a rate of rotation output by the variable speed motor is proportional to a difference in rotational velocity between the first axle shaft and the second axle shaft.

In another example embodiment, the gearing assembly does not rely on friction when altering or maintaining a rotation rate of the first axle shaft relative to the second axle shaft.

In another embodiment, a method includes determining a desired differential in rotational velocity between a first axle shaft and a second axle shaft of a vehicle. The determining is based, at least in part, on a current steering angle of the vehicle and on a current rotational velocity of a first drive shaft of the vehicle using a microprocessor of the vehicle, where the first drive shaft powers a differential to which the first axle shaft and the second axle shaft are connected. The method also includes sending a signal to a variable speed motor of the vehicle based on the desired differential in rotational velocity to control relative rotation of the first axle shaft and the second axle shaft to match the desired differential in rotational velocity to within an allowable range.

In a further embodiment, determining the desired differential in rotational velocity includes receiving information regarding a sensed current turning angle of the vehicle and receiving information regarding a sensed current rotational velocity of the first drive shaft of the vehicle.

In an example embodiment, the variable speed motor controls relative rotation of the first axle shaft and the second axle shaft by rotating a control shaft at a rotational velocity that is proportional to the desired differential in rotational velocity.

In an example embodiment, the method further includes changing the allowable range based, at least in part, on a sensor input while the vehicle is in motion or in response to a user input.

In an example embodiment, the method further includes determining a second desired differential in rotational velocity between a third axle shaft and a fourth axle shaft of the vehicle. The determining is based, at least in part, on the current steering angle of the vehicle and on the current rotational velocity of a second drive shaft of the vehicle, where the second drive shaft powers a second differential to which the third axle shaft and the fourth axle shaft are connected. The method also includes sending a signal to a second variable speed motor of the vehicle based on the desired second differential in rotational velocity to control relative rotation of the third axle shaft and the fourth axle shaft to match the desired second differential in rotational velocity to within a second allowable range, wherein the second allowable range is the same as or different than the allowable range.

In a further example embodiment, the first and second axle shafts are shafts of a rear axle of the vehicle, and the third and fourth axle shafts are shafts of a front axle of the vehicle. The method further includes determining a third desired differential in rotational velocity between the first drive shaft and the second drive shaft of the vehicle. The determining is based, at least in part, on the current turning angle of the vehicle and on the current rotational velocity output by the transmission or drive motor of the vehicle. The method also includes sending a signal to a third variable speed motor of the vehicle based on the desired third differential in rotational velocity to control relative rotation of the first drives haft and the second drive shaft to match the desired third differential in rotational velocity to within a third allowable range.

In an example embodiment, determining the desired differential in rotational velocity between the first axle shaft and the second axle shaft of the vehicle is also based on information regarding a width of the vehicle and a wheelbase of the vehicle.

In an example embodiment, determining the desired differential in rotational velocity between the first axle shaft and the second axle shaft of the vehicle includes adding a factor related to a differential baseline during straight line travel based on a vehicle asymmetry. In a further embodiment, the factor related to a differential baseline during straight line travel is determined based on a sensed resistance to the desired differential rate during a period of time when the vehicle is in motion.

In another example embodiment, a method includes determining if a magnitude of a current steering angle of a vehicle is larger than a minimum steering angle value and determining if a magnitude of a current rotational velocity of a first drive shaft of the vehicle is nonzero using a microprocessor of the vehicle. If the magnitude of the current turning angle is larger than the minimum turning angle value and the magnitude of the current rotational velocity of the drive shaft is greater than the minimum drive rotational velocity value, then the method includes determining a desired differential in rotational velocity between a first axle shaft and a second axle shaft of the vehicle. The determining is based, at least in part, on the current steering angle of the vehicle and on the current rotational velocity of the first drive shaft of the vehicle using the microprocessor of the vehicle, where the first drive shaft powers a differential to which the first axle shaft and the second axle shaft are connected. The method further includes sending a signal to a variable speed motor of the vehicle based on the determined desired differential in rotational velocity to controllably alter a rotation of the first axle shaft relative to a rotation of the second axle shaft.

In an example embodiment, if the magnitude of the current turning angle is larger than the minimum turning angle value and the magnitude of the current rotational velocity of the drive shaft is nonzero, then the method includes determining a second desired differential in rotational velocity between a third axle shaft and a fourth axle shaft of the vehicle. The determining is based, at least in part, on the current steering angle of the vehicle and on the current rotational velocity of a second drive shaft of the vehicle, where the second drive shaft powers a second differential to which the third axle shaft and the fourth axle shaft are connected. The method also includes sending a signal to a second variable speed motor of the vehicle based on the determined second desired differential in rotational velocity to controllably alter the rotation of the third axle shaft relative to the fourth axle shaft.

In a further embodiment, the first and second axle shafts are shafts of a rear axle of the vehicle, and the third and fourth axle shafts are shafts of a front axle of the vehicle. The method includes determining a third desired differential in rotational velocity between first drive shaft and the second drive shaft of the vehicle based. The determining is based, at least in part, on the current steering angle of the vehicle and on the current rotational velocity output by the transmission or drive motor of the vehicle. The method also includes sending a signal to the variable speed motor of the vehicle based on the determined third desired differential in rotational velocity to controllably alter the rotation of the first drive shaft relative to a rotation of the second drive shaft.

In a further embodiment, the method also includes receiving information regarding a sensed current turning angle of the vehicle and receiving information regarding a sensed current rotational velocity of the drive shaft of the vehicle. In a further embodiment, the minimum steering angle value falls in a range of 0.01 degrees to 5 degrees. In a further embodiment, the method also includes changing the minimum steering angle based, at least in part, on a sensor input while the vehicle is in motion or in response to a user input.

Some embodiments include a system for controlling a differential in rotation between a first axle shaft and a second axle shaft. The system includes a gearing assembly as described herein and a variable speed motor configured to drive a control shaft of the gearing assembly. In some embodiment, the system also includes a processor or microprocessor configured to determine a desired differential rate and to control the variable speed motor.

Embodiments described herein include vehicles, systems, gearing assemblies, methods for controlling differential rotation between different axle shafts of a vehicle and methods for differential steering of a vehicle.

An embodiment includes a gearing assembly including a differential configured to engage a first axle shaft and a second axle shaft of a vehicle and configured to be driven by a drive shaft of the vehicle and a differential control pinion gear configured to be driven by a variable speed reversible motor of the vehicle. The gearing assembly also includes a first plurality of adjustment gears configured to engage the differential and to engage the differential control pinion gear, and a second plurality of adjustment gears configured to engage the differential and to engage the differential control pinion gear. The first plurality of adjustment gears includes: a first planetary gear carrier; a first set of planetary gears coupled to the first planetary gear carrier; and a second set of planetary gears coupled to the first planetary gear carrier. The second plurality of adjustment gears includes: a second planetary gear carrier; a third set of planetary gears coupled to the second planetary gear carrier; and a fourth set of planetary gears coupled to the second planetary gear carrier. The first plurality of adjustment gears and the second plurality of adjustment gears are configured to controllably alter a rotation rate of the first axle shaft relative to a rotation rate of the second axle shaft through rotation of the differential control pinion gear produced by the variable speed reversible motor.

In some embodiments the first plurality of adjustment gears and the second plurality of adjustment gears are configured to control a rotation rate of the first axle shaft relative to a rotation rate of the second axle shaft through rotation of the differential control pinion gear produced by the variable speed reversible motor.

In some embodiments the first plurality of adjustment gears and the second plurality of adjustment gears are configured such that a rotation rate of the differential control pinion gear is proportional to a difference between the rotation rate of the first axle shaft and the rotation rate of the second axle shaft.

In some embodiments the first plurality of adjustment gears further includes a first externally toothed ring gear having external teeth configured to intermesh with the differential control pinion gear and having internal teeth configured to be driven by the first set of planetary gears, and the second plurality of adjustment gears further includes a second externally toothed ring gear having external teeth configured to be driven by the differential control pinion gear and having internal teeth configured to intermesh with the third set of planetary gears.

In some embodiments, the external teeth of the first externally toothed ring gear are configured to intermesh with the differential control pinion gear and the external teeth of the second externally toothed ring gear are configured to intermesh with the differential control pinion gear.

In some embodiments, the external teeth of the first externally toothed ring gear are configured to intermesh with the differential control pinion gear and the gearing assembly also includes a reversing shaft including a first set of external teeth that are configured to intermesh with the differential control pinion gear, where the external teeth of the second externally toothed ring gear are configured to intermesh with a second set of external teeth of the reversing shaft.

In some embodiments, the gearing assembly also includes a first extension shaft including a gear configured to intermesh with the differential control pinion gear and gear configured to intermesh with the external teeth of the first externally toothed ring; and a second extension shaft including a gear configured to intermesh with the differential control pinion gear and a gear configured to intermesh with the external teeth of the first externally toothed ring. In some embodiments, the differential control pinion gear is a bevel pinion gear, the gear of the first extension shaft configured to intermesh with the differential control pinion gear is a bevel gear; and the gear of the second extension shaft configured to intermesh with the differential control pinion gear is a bevel gear. In some embodiments, the gear of the first extension shaft configured to intermesh with the external teeth of the first externally toothed ring is a spur gear or a helical gear; and the gear of the second extension shaft configured to intermesh with the external teeth of the second externally toothed ring is a spur gear or a helical gear.

In some embodiments the gearing assembly is configured such that rotation of the differential control pinion gear drives a first rotation of the first externally toothed ring gear and an equal and opposite rotation of the second externally toothed ring gear. In some embodiments the differential control pinion gear is a bevel pinion gear, the external teeth of the first externally toothed ring gear are beveled, and the external teeth of the second externally toothed ring gear are beveled. In some embodiments the first plurality of adjustment gears and the second plurality of adjustment gears are configured such that zero rotation of the first externally toothed ring gear and zero rotation of the second externally toothed ring gear correspond to no difference in rotational velocity between the first axle shaft and the second axle shaft. In some embodiments the first plurality of adjustment gears and the second plurality of adjustment gears are configured such that a rate of rotation of first externally toothed ring gear is proportional to a desired difference in rotational velocity between the first axle shaft and the second axle shaft.

In some embodiments the differential includes a carrier housing. In some embodiments the gearing assembly also includes: a first differential sun gear coupled to, attached to, or integral with the carrier housing with the first set of planetary gears being configured to engage the first differential sun gear; and a second differential sun gear coupled to, attached to, or integral with the carrier housing with the third set of planetary gears being configured to engage the second differential sun gear, where the first plurality of adjustment gears is configured to interact with the differential through the first differential sun gear and second plurality of adjustment gears is configured to interact with the differential through the second differential sun gear. In some embodiments the carrier housing is a miter gear carrier.

In some embodiments the gearing assembly also includes a first axle sun gear coupled to, attached to, or integral with the first axle and a second axle sun gear coupled to, attached to, or integral with the second axle, where the second set of planetary gears is configured to engage the first axle sun gear and the fourth set of planetary gears is configured to engage the second axle sun gear.

In some embodiments the differential control pinion gear is coupled to, attached to, or integral with a differential control shaft driven by the variable speed reversible motor, and the differential control shaft and the drive shaft are configured to rotate about a same axis of rotation. In some embodiments the drive shaft extends through and beyond the differential control shaft of the vehicle. In some embodiments the drive shaft is at least partially nested within the differential control shaft.

In some embodiments the differential control pinion gear is disposed on an opposite side of the differential from the drive shaft.

In some embodiments the gearing assembly is a gearing assembly for a differentially steered vehicle, and the gearing assembly and the variable speed reversible motor are configured to steer the vehicle by controllably altering a rotation speed of the first axle shaft relative to a rotation speed of the second axle shaft based on rotation produced by the variable speed reversible motor. In some embodiments the gearing assembly is a gearing assembly for a differentially steered vehicle, and the gearing assembly and the variable speed reversible motor are configured to steer the vehicle by controlling a rotation speed of the first axle shaft relative to a rotation speed of the second axle shaft based using rotation of the differential control pinion gear produced by the variable speed reversible motor.

In some embodiments the first plurality of adjustment gears also includes a first internal gear configured to engage the second set of planetary gears with the first internal gear stationary with respect to the variable speed reversible motor, and the second plurality of adjustment gears also includes a second internal gear configured to engage the fourth set of planetary gears with the second internal gear stationary with respect to the variable speed reversible motor.

In some embodiments a rotational speed of the first axle shaft is proportional to an orbital speed of the first set of planetary gears and a rotational speed of the second axle shaft is proportional to an orbital speed of the third set of planetary gears.

In some embodiments the first plurality of adjustment gears is configured to enable the orbital speed of the first set of planetary gears to be selectively adjusted using the variable speed reversible motor, and the second plurality of adjustment gears is configured to enable the orbital speed of the third set of planetary gears to be selectively adjusted using the variable speed reversible motor.

In some embodiments the first plurality of adjustment gears and the second plurality of adjustment gears are configured such that a rate of rotation output by the variable speed reversible motor imposes a difference in rotational velocity between the first axle shaft and the second axle shaft proportional to the rate of rotation output by the variable speed reversible motor.

In some embodiments the gearing assembly does not rely on friction when altering or maintaining a rotation rate of the first axle shaft relative to the second axle shaft.

In some embodiments, the gearing assembly further comprises one or more torque sensors configured to provide information regarding an instantaneous differential torque between the first axle shaft and the second axle shaft.

In some embodiments the vehicle is a differentially steered vehicle and the gearing assembly is configured for use in a cross-drive transmission.

Another embodiment includes a gearing assembly for a differentially steered vehicle. The gearing assembly includes a differential configured to engage a first axle shaft and a second axle shaft of a vehicle and configured to be driven by a drive shaft of the vehicle and a differential control pinion gear connected to, attached to, or integral with a differential control shaft, the drive shaft at least partially nested in the differential control shaft and configured to be driven by a variable speed reversible motor of the vehicle. The gearing assembly also includes a first plurality of adjustment gears configured to engage the differential, configured to engage the differential control pinion gear; and a second plurality of adjustment gears configured to engage the differential, configured to engage the differential control pinion gear; where the first plurality of adjustment gears and the second plurality of adjustment gears are configured to controllably alter a rotation rate of the first axle shaft relative to a rotation rate of the second axle shaft through rotation of the differential control pinion gear produced by the variable speed reversible motor.

In some embodiments the first plurality of adjustment gears and the second plurality of adjustment gears are configured to control a rotation rate of the first axle shaft relative to a rotation rate of the second axle shaft through rotation of the differential control pinion gear produced by the variable speed reversible motor. In some embodiments the gearing assembly is configured for use in a cross-drive transmission.

Another embodiment includes a differentially steered vehicle. The differentially steered vehicle includes: an engine; a first axle shaft; a second axle shaft; a drive shaft; a differential control shaft; a variable speed reversible motor; and a gearing assembly in accordance with any embodiments described herein.

In some embodiments the variable speed reversible motor is a hydraulic variable speed reversible motor driven by a hydraulic pump powered by the engine. In some embodiments the hydraulic variable speed reversible motor is a hydrostatic variable speed reversible motor powered by the engine.

In some embodiments the differentially steered vehicle also includes a transmission, where the gearing assembly and the transmission are included in a cross-drive transmission unit of the vehicle. In some embodiments the differentially steered vehicle also includes a torque converter, where the variable speed reversible motor is driven by the torque converter.

Another embodiment includes gearing assembly for a differentially steered vehicle. The gearing assembly includes: a differential configured to engage a first axle shaft and a second axle shaft of a vehicle and configured to be driven by a drive shaft of the vehicle; a differential control pinion gear configured to be driven by steering clutches of the vehicle; a first plurality of adjustment gears configured to engage the differential and to engage the differential control pinion gear; and a second plurality of adjustment gears configured to engage the differential and to engage the differential control pinion gear. The first plurality of adjustment gears includes: a first planetary gear carrier; a first set of planetary gears coupled to the first planetary gear carrier; and a second set of planetary gears coupled to the first planetary gear carrier. The second plurality of adjustment gears includes: a second planetary gear carrier; a third set of planetary gears coupled to the second planetary gear carrier; and a fourth set of planetary gears coupled to the second planetary gear carrier. The first plurality of adjustment gears and the second plurality of adjustment gears are configured to controllably alter a rotation rate of the first axle shaft relative to a rotation rate of the second axle shaft based on rotation of the differential control pinion gear produced by the steering clutches.

Another embodiment includes front-wheel steered vehicle including: an engine; a first axle shaft; a second axle shaft; a drive shaft; a differential control shaft; a variable speed reversible motor; and a gearing assembly as described herein. In some embodiments, the variable speed reversible motor is an electric motor.

Another embodiment is a method including providing a differentially steered vehicle including a variable speed reversible motor and a gearing assembly as described herein; and steering the vehicle by controlling a rate of rotation of a first axle shaft of the vehicle relative to a rate of rotation of a second axle shaft of the vehicle by controlling rotation of the differential control pinion gear using the variable speed reversible motor. In some embodiments the method also includes comprising adjusting rotation of the differential control pinion gear based at least in part on a first sensor signal indicating an actual drive shaft rotational speed and a second sensor signal indicating an actual differential in rotational speeds between the first axle shaft and the second axle shaft using a computer of the vehicle.

In some embodiments, the method includes adjusting rotation of the differential control pinion gear based at least in part one or more sensor signals from one or more torque sensors providing information regarding a differential torque between the first axle shaft and the second axle shaft.

In another embodiment, a method includes determining a desired differential in rotational velocity between a first axle shaft and a second axle shaft of a vehicle. The determining is based, at least in part, on a current steering angle of the vehicle and on a current rotational velocity of a first drive shaft of the vehicle using a microprocessor of the vehicle, where the first drive shaft powers a differential to which the first axle shaft and the second axle shaft are connected. The method also includes modifying the desired differential in rotational velocity based on a measured differential torque between the first axle shaft and the second axle shaft using the microprocessor of the vehicle. The method also includes sending a signal to a variable speed reversible motor of the vehicle based on the desired differential in rotational velocity to control relative rotation of the first axle shaft and the second axle shaft to match the desired differential in rotational velocity to within a first allowable range. In some embodiments, determining the desired differential in rotational velocity includes receiving information regarding a sensed current steering angle of the vehicle and receiving information regarding a sensed current rotational velocity of the first drive shaft of the vehicle. In some embodiments, the method further includes receiving information regarding the current differential torque between the first axle shaft and the second axle shaft and determining a measured differential torque based on the received information. In some embodiments, the measured differential torque is a current differential torque. In some embodiments, the measured differential torque is a previously measured differential torque and wherein information regarding the previously measured differential torque is stored in a memory of the vehicle. In some embodiments, the measured differential torque is an instantaneous differential torque. In some embodiments, the measured differential torque is an averaged value of differential torque over time. In some embodiments, the measured differential torque includes any combination of an instantaneous differential torque, a current differential torque, an averaged value of differential torque over time, or a previously measured differential torque stored in a memomory of the vehicle.

In some embodiments determining the desired differential in rotation velocity includes: determining a natural differential rate based on a sensed current velocity of the vehicle or a sensed current rotational velocity of the first drive shaft of the vehicle and based on a sensed current steering angle of the vehicle, and the method further includes setting the desired differential in rotational velocity to be greater than the natural differential rate after modifying the desired differential in rotational velocity based the measured differential torque between the first axle shaft and the second axle shaft using the microprocessor of the vehicle. The desired differential rate may correspond to oversteering the vehicle, to correcting for an undersiarable understeer condition, or to otherwise correcting for a condition causing undesirable steering pull to one side.

In some embodiments, determining the desired differential in rotation velocity includes determining a natural differential rate based on a sensed current velocity of the vehicle or a sensed current rotational velocity of the first drive shaft of the vehicle and based on a sensed current steering angle of the vehicle, and the method further includes setting the desired differential in rotational velocity to be smaller than the natural differential rate after modifying the desired differential in rotational velocity based the measured differential torque between the first axle shaft and the second axle shaft using the microprocessor of the vehicle. The desired differential rate may correspond to understeering the vehicle, to correcting for an undersiarable oversteer condition, or to otherwise correcting for a condition causing undesirable steering pull to one side.

In some embodiments, determining the desired differential in rotation velocity includes determining a natural differential rate based on a sensed current velocity of the vehicle or a sensed current rotational velocity of the first drive shaft of the vehicle and based on a sensed current steering angle of the vehicle, and the method further comprises setting the desired differential in rotational velocity to be smaller than the natural differential rate or larger than the natural differential rate based, at least in part, on a setting selected by a user of the vehicle prior to modifying the desired differential in rotational velocity based the measured differential torque between the first axle shaft and the second axle shaft using the microprocessor of the vehicle.

In some embodiments, determining the desired differential in rotation velocity includes determining a natural differential rate based on a sensed current velocity of the vehicle or a sensed current rotational velocity of the first drive shaft of the vehicle and based on a sensed current steering angle of the vehicle, and the method further includes automatically setting the desired differential in rotational velocity to be smaller than the natural differential rate or larger than the natural differential rate based, at least in part, on information obtained from one or more sensors of the vehicle. In some embodiments, the information obtained from one or more sensors of the vehicle includes information regarding a current yaw of the vehicle.

In some embodiments, modifying the desired differential in rotational velocity based on the measured differential torque between the first axle shaft and the second axle shaft using the microprocessor of the vehicle is performed automatically by the microprocessor of the vehicle In an example embodiment, the variable speed reversible motor controls relative rotation of the first axle shaft and the second axle shaft by rotating a control shaft at a rotational velocity that is proportional to the desired differential in rotational velocity.

In an example embodiment, the method further includes changing the first allowable range based, at least in part, on a sensor input while the vehicle is in motion or in response to a user input.

In an example embodiment, the method further includes determining a second desired differential in rotational velocity between a third axle shaft and a fourth axle shaft of the vehicle. The determining is based, at least in part, on the current steering angle of the vehicle and on the current rotational velocity of a second drive shaft of the vehicle, where the second drive shaft powers a second differential to which the third axle shaft and the fourth axle shaft are connected. The method also includes sending a signal to a second variable speed reversible motor of the vehicle based on the desired second differential in rotational velocity to control relative rotation of the third axle shaft and the fourth axle shaft to match the desired second differential in rotational velocity to within a second allowable range, wherein the second allowable range is the same as or different than the first allowable range.

In a further example embodiment, the first and second axle shafts are shafts of a rear axle of the vehicle, and the third and fourth axle shafts are shafts of a front axle of the vehicle. The method further includes determining a third desired differential in rotational velocity between the first drive shaft and the second drive shaft of the vehicle. The determining is based, at least in part, on the current steering angle of the vehicle and on the current rotational velocity output by the transmission or drive motor of the vehicle. The method also includes sending a signal to a third variable speed reversible motor of the vehicle based on the desired third differential in rotational velocity to control relative rotation of the first drive shaft and the second drive shaft to match the desired third differential in rotational velocity to within a third allowable range.

In an example embodiment, determining the desired differential in rotational velocity between the first axle shaft and the second axle shaft of the vehicle is also based on information regarding a width of the vehicle and a wheelbase of the vehicle.

In an example embodiment, determining the desired differential in rotational velocity between the first axle shaft and the second axle shaft of the vehicle includes adding a factor related to a differential baseline during straight line travel based on a vehicle asymmetry. In a further embodiment, the factor related to a differential baseline during straight line travel is determined based on a sensed resistance to the desired differential rate during a period of time when the vehicle is in motion.

In another example embodiment, a method includes determining if a magnitude of a current steering angle of a vehicle is larger than a minimum steering angle value and determining if a magnitude of a current rotational velocity of a first drive shaft of the vehicle is nonzero using a microprocessor of the vehicle. If the magnitude of the current steering angle is larger than the minimum steering angle value and the magnitude of the current rotational velocity of the drive shaft is greater than the minimum drive rotational velocity value, then the method includes determining a desired differential in rotational velocity between a first axle shaft and a second axle shaft of the vehicle. The determining is based, at least in part, on the current steering angle of the vehicle and on the current rotational velocity of the first drive shaft of the vehicle using the microprocessor of the vehicle, where the first drive shaft powers a differential to which the first axle shaft and the second axle shaft are connected. The method further includes sending a signal to a variable speed reversible motor of the vehicle based on the determined desired differential in rotational velocity to controllably alter a rotation of the first axle shaft relative to a rotation of the second axle shaft.

In an example embodiment, if the magnitude of the current steering angle is larger than the minimum steering angle value and the magnitude of the current rotational velocity of the drive shaft is nonzero, then the method includes determining a second desired differential in rotational velocity between a third axle shaft and a fourth axle shaft of the vehicle. The determining is based, at least in part, on the current steering angle of the vehicle and on the current rotational velocity of a second drive shaft of the vehicle, where the second drive shaft powers a second differential to which the third axle shaft and the fourth axle shaft are connected. The method also includes sending a signal to a second variable speed reversible motor of the vehicle based on the determined second desired differential in rotational velocity to controllably alter the rotation of the third axle shaft relative to the fourth axle shaft.

In a further embodiment, the first and second axle shafts are shafts of a rear axle of the vehicle, and the third and fourth axle shafts are shafts of a front axle of the vehicle. The method includes determining a third desired differential in rotational velocity between first drive shaft and the second drive shaft of the vehicle based. The determining is based, at least in part, on the current steering angle of the vehicle and on the current rotational velocity output by the transmission or drive motor of the vehicle. The method also includes sending a signal to the variable speed reversible motor of the vehicle based on the determined third desired differential in rotational velocity to controllably alter the rotation of the first drive shaft relative to a rotation of the second drive shaft.

In a further embodiment, the method also includes receiving information regarding a sensed current steering angle of the vehicle and receiving information regarding a sensed current rotational velocity of the drive shaft of the vehicle. In a further embodiment, the minimum steering angle value falls in a range of 0.01 degrees to 5 degrees. In a further embodiment, the method also includes changing the minimum steering angle based, at least in part, on a sensor input while the vehicle is in motion or in response to a user input.

Some embodiments include a system for controlling a differential in rotation between a first axle shaft and a second axle shaft. The system includes a gearing assembly as described herein and a variable speed reversible motor configured to drive a control shaft of the gearing assembly. In some embodiments, the system also includes a processor or microprocessor configured to determine a desired differential rate and to control the variable speed reversible motor.

BRIEF DESCRIPTION OF THE DRAWINGS

The drawings are intended to illustrate example embodiments taught herein and are not intended to show relative sizes and dimensions, or to limit the scope of examples or embodiments. In the drawings, the same numbers are used throughout the drawings to reference like features and components of like function.

FIG. 15 includes a table of example calculations of a gear reduction ratio for adjustment gears in a simple planetary configuration and in compound planetary configuration including stepped planetary gears;

DETAILED DESCRIPTION

Figure 1:
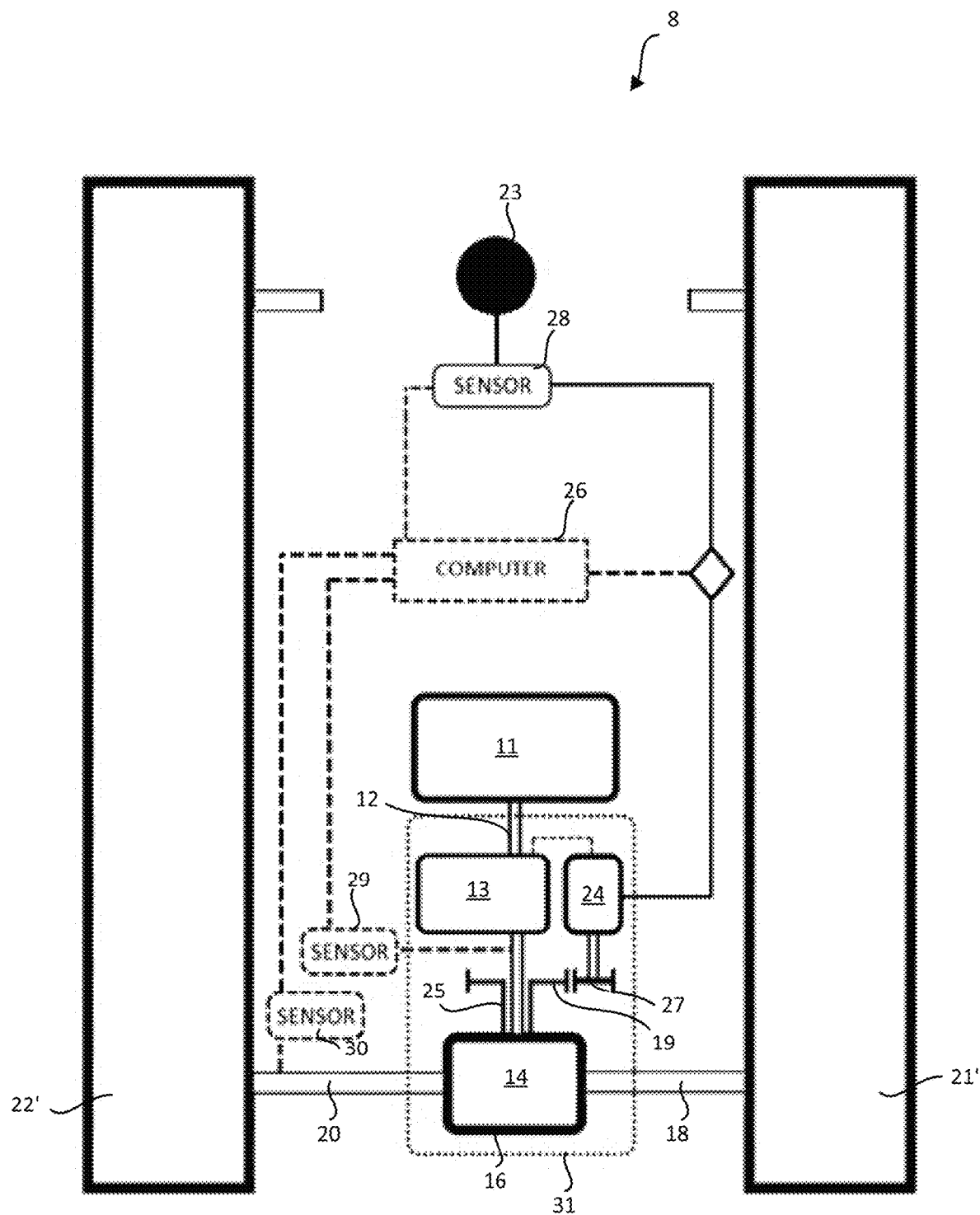
FIG. 1 schematically depicts selected electrical and mechanical components of a vehicle including a gearing assembly in accordance with some embodiments.

Some embodiments include systems, gearing assemblies, and methods for control of a differential in rotation between axle shafts. Some embodiments include methods for differential steering of a vehicle. Some embodiments include vehicles, gearing assemblies for vehicles, and methods for providing propulsive power, as well as gear-based regenerative control of differential rates to the drive axles of a vehicle. Some embodiments incorporate a regenerative gearing assembly for active control of differential rotation rates having a compact design as compared with conventional active control differentials. Some embodiments include a regenerative gearing assembly for active control of differential rotation rates (e.g., for differentially steered vehicles) that is simpler and includes fewer control shafts than conventional regenerative differential steering system.

Some embodiments of a gearing assembly include a differential (e.g., an open differential) and two different pluralities of adjustment gears, one for each axle shaft. Each plurality of adjustment gears includes an inner set of planetary gears and an outer second set of planetary gears that share a gear carrier with the inner set of planetary gears. The pluralities of adjustment gears on both sides of the differential are driven by the same differential control pinion gear to impart a differential in rotation between the gears, and thus, achieve the desired steering behavior.

In some embodiments, steering control for a differentially-steered vehicle is achieved by rotating a differential control pinion gear using a variable speed reversible motor based, at least in part, on a steering input signal. Embodiments employ a gearing assembly that converts the rotation of the differential control pinion gear to an imposed difference between a rotational rate of a first axle shaft and a rotation rate of a second axle shaft to achieve the desired steering behavior. Because this design is regenerative, a sufficiently strong variable speed steering motor would enable the vehicle to neutral steer, or spin in place in some embodiments.

In contrast to existing gear-based designs for regenerative differential control, some embodiments apply propulsive power directly to each drive axle through a single differential gear assembly, as is the common practice in most automobiles. Additionally, embodiments do not send power through intermediate or idler gears, so in straight-line travel there are no counter-rotating shafts. Furthermore, some embodiments locate all drive and steering control gears in a symmetrical arrangement along the single set of drive axles, without the need for additional adjacent control shafts.

As a result, some embodiments employ a more efficient, compact, and weight-saving design for achieving combined propulsion and regenerative differential rate control.

Some embodiments include systems, gearing assemblies, and methods for control of a differential in rotation between axle shafts, and methods for differential steering of a vehicle.

Some embodiments do not rely on friction when altering the rotation rate of a first axle shaft relative to a second axle shaft. Such embodiments may be advantageous because they do not permit slip of axle shafts and wheels, thereby increasing the safety of a vehicle. Embodiments that do not rely on friction may also be advantageous as eliminating components that rely on friction eliminates components that are likely to wear out due to friction, which may reduce long term costs. Embodiments that do not rely on friction or that allow only a slight deviation from the desired differential in rotational speed between the axel shafts may benefit from the reduction or elimination of torque-steer, which occurs due to unequal torque being supplied to drive wheels. Additional aspects and benefits of various embodiments are described below.

Some embodiments described herein may be incorporated in to or are implemented in connection with a differentially steered vehicle. FIG. 1 is a schematic overview of a differentially steered vehicle 8 incorporating a gearing assembly 14, in accordance with some embodiments. The differentially steered vehicle includes a propulsion engine 11 and a transmission 13 that turns a drive shaft 12. The drive shaft 12 is connected to the gearing assembly 14. A differential control shaft 25 driven by a variable speed reversible motor 24 is also connected to the gearing assembly 14. A gearing assembly case 16 holds and protects the gearing assembly 14 and holds oil about the gearing assembly 14.

The gearing assembly 14 transfers rotation for propulsion from the drive shaft 12 to the first axle shaft 18 and a second axle shaft 20 for propulsion of the vehicle 8 and transfers rotation for steering from the differential control shaft 25 to a first axle shaft 18 and a second axle shaft 20 for propulsion and steering of the vehicle. The axle shafts 18, 20 drives a first track 21' and a second track 22' of the vehicle. The gearing assembly 14 is configured to impose a differential in a rate of rotation of the first axle shaft 18 relative to that of the second axle shaft 20 based on rotation of the differential control shaft 25. In this way rotation of the differential control shaft 25 is used to control a differential in a rate of rotation of the first track 21' relative to that of the second track 22'.

In some circumstances this can be described as the gearing assembly 14 converts rotation of the differential control shaft 25 into a first differential steering torque applied to the first axle shaft 18 and a second differential steering torque applied to the second axle shaft 20 to steer the vehicle. In most circumstances, the second differential steering torque would have a sign opposite to that of the first differential steering torque.

When steering the vehicle, movement of a steering input device 23 such as a steering wheel, yoke, or lever is measured by a steering angle sensor 28, which provides a signal to a variable speed reversible motor 24. In some embodiments, the variable speed reversible motor 24 is directly controlled by a signal provided by the steering angle sensor 28. In such embodiments, no additional sensors are required. In some embodiments, an axle rotational velocity sensor 30 and a drive shaft rotation velocity sensor 29 provide inputs to a computer 26 of the vehicle in order to provide closed loop and speed sensitive steering adjustments.

In some embodiments, the variable speed reversible motor 24 is controlled by a computer 26 of the vehicle. In some embodiments, the control signals sent to the variable speed reversible motor 24 by the engine computer 26 depend upon inputs received from a steering angle sensor 28, a drive shaft rotational velocity sensor 29, and one or more axle rotational velocity sensors 30.

The variable speed reversible motor 24 drives the differential control shaft 25 that communicates with the gearing assembly 14. In some embodiments, the variable speed reversible motor 24 may be coupled to the differential control shaft 25 through one or more other gears. For example, FIG. 1 shows a pinion gear 27 driven by the variable speed reversible motor 24 that meshes with a spur gear 19 attached to the differential control shaft 25. In some embodiments, a reduction gear may be used to couple the variable speed reversible motor 24 to the differential control shaft 25. The pinion gear 27 and spur gear 19 function as a reduction gear. In some embodiments, the variable speed reversible motor 24 may include a reduction gear. In some embodiments, a reduction gear may be used to couple the variable speed reversible motor 24 to the differential control shaft 25. In some embodiments, the variable speed reversible motor 24 may directly couple with the differential control shaft 25.

In some embodiments for differentially-steered vehicles, a speed sensitive steering function is provided by reducing the rotation speed of the differential control pinion gear for the same steering input signal value as the vehicle's drive shaft speed increases. In some embodiments, a torque converter (not shown) may be employed between the transmission and the variable speed reversible motor 24 such that the amount of steering torque supplied to the differential control shaft 25 depends on the overall speed of the vehicle, with more steering torque applied at lower vehicle speeds and less steering torque applied at greater vehicle speeds. In some embodiments, the computer 26 or a control unit is used to control the amount of steering torque applied to the differential control shaft 25 as a function of vehicle speed.

Differentially steered vehicles may combine some or all of the functions of the transmission 13, the variable speed reversible motor 24, and the gearing assembly 14 into a single enclosure forming a cross-drive transmission unit 31. In some embodiments, the gearing assembly 14 described herein is integrated into a cross-drive transmission unit to serve as the final drive gear. In some embodiments, the variable speed reversible motor 24 is one of the outputs of the cross-drive transmission unit.

In some embodiments for differentially-steered vehicles, the engine 11 is used to provide both propulsive power as well as power to turn the variable speed reversible motor 24 for steering the vehicle. However, because steering is generally controlled independently from propulsion, such vehicles must provide a way to independently adjust the amount of engine torque that goes toward steering the vehicle.

One way to accomplish this is to have the engine turn a hydraulic pump (not shown), which, in turn, powers a hydraulic motor (e.g., a hydrostatic motor) to controllably apply steering torque. In this case, the hydraulic motor would act as the variable speed reversible motor 24 that drives the differential control shaft 25. In some embodiments including a hydraulic motor, the steering input device 23 moves one or more hydraulic valves that, in turn, control rotation of the variable speed reversible motor 24. In some embodiments including a hydrostatic motor, the steering input device 23 changes the angle of one or more swash plates that, in turn, control rotation of the variable speed reversible motor 24.

Another way to accomplish this is to provide a pair of left and right steering clutches (not shown) that are set to engage clockwise and counterclockwise rotating elements (not shown) that are rotated by the engine 11. Engagement of one of these clutches would controllably apply either a clockwise or counterclockwise steering torque to the differential control shaft 25. In such embodiments, rather than a variable speed reversible motor 24, the pair of clutches and the rotating elements are used to controllably drive the differential control shaft 25. Although some embodiments and features of vehicles, gearing assemblies and methods related to differentially-steered vehicles are described herein with respect to a variable speed reversible motor, alternatively, steering clutches and rotating elements could be employed instead of a variable speed reversible motor in any of the embodiments.

In some embodiments, the drive shaft 12 is at least partially nested within the differential control shaft 25 as shown, but rotates independently of the differential control shaft 25 (see also FIGS. 3A-3C described below). Specifically, in some embodiments the differential control shaft 25 is hollow and the drive shaft 12 extends through and beyond the differential control shaft 25 of the vehicle (see FIGS. 3A-3C described below). In other embodiments, the drive shaft 12 and the differential control shaft 25 enter the gearing assembly from different sides (see, e.g., FIGS. 4A-4D described below).

Figure 2:
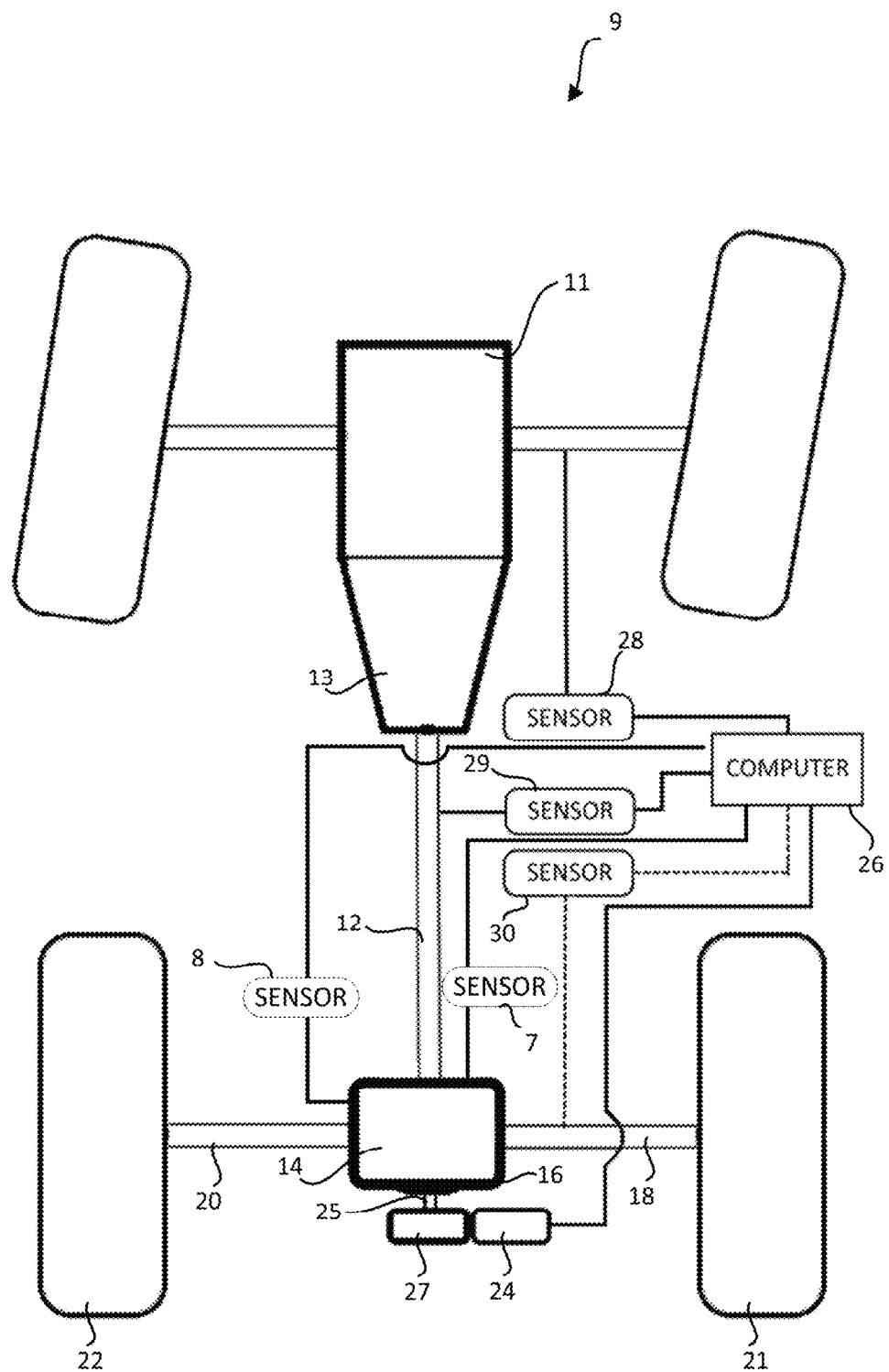
FIG. 2 schematically depicts selected electrical and mechanical components of a differentially steered vehicle including a gearing assembly in accordance with some embodiments.

Some embodiments described herein may be incorporated into or are implemented in connection with a front-wheel steered vehicle. FIG. 2 is a schematic overview of a front-wheel steered vehicle 9 incorporating a gearing assembly 14, in accordance with some embodiments. The front-wheel steered vehicle 9 includes an engine 11 and a transmission 13 that turns a drive shaft 12 that is connected to the gearing assembly 14. The vehicle 9 also includes a variable speed motor 24, which in some embodiments is a variable speed reversible motor 24 (e.g., a variable speed electric reversible motor) that drives a differential control shaft 25, that is connected to the gearing assembly 14. The variable speed motor 24, the differential control shaft 25 and the gearing assembly 14 are used to control a differential in rotational speed between a first axle 18 connected to a first wheel 21 of the vehicle and a second axle 20 connected to a second wheel 22 of the vehicle.

Generally speaking, in front-wheel steered vehicles, control of a differential in rotational speeds between axles is not used to steer the vehicle. Instead, control of the differential in rotational speeds between axles to match or nearly match a desired differential in rotational speeds between axles corresponding to a natural differential in rotational speeds between axles for a given angle of turn and a given vehicle velocity can be used to reduce or prevent slipping of a wheel or reduce or prevent transferring power to a slipping wheel under less than ideal road conditions. An explanation of calculation of a desired differential in rotational speeds corresponding to a natural differential in rotational speeds between axles for a given angle of turn and a given vehicle velocity is provided below with respect to respect to FIGS. 18-25. However, in some front-wheel steered embodiments, the differential can be controlled to have a rate other than the natural differential rate. This natural differential rate may also be termed the ideal differential rate for a given angle of turn and a given vehicle velocity under ideal conditions of no slip and no vehicle asymmetries. For example, in some vehicles and in some circumstances, it may be desirable to impose a differential in rotation between the axle shafts that is greater than the natural differential in rotation rates that would correspond to the current steering angle and the current velocity of the vehicle. In such vehicles and such circumstances, the computer may direct the gearing assembly to impose a greater differential in rotation rates than the natural differential in rotation rates for the current steering angle and current vehicle velocity to provide active yaw control of the vehicle.

For front-wheel steered vehicle 9, movement of a steering input device such as a steering wheel, yoke, or lever (not shown) is measured by a steering angle sensor 28 which provides a signal to a computer 26. A drive shaft rotational velocity sensor 29 provides an additional signal to the computer needed to calculate a desired differential rate for the given steering angle and drive shaft speed. An optional differential rotation sensor, (e.g., an axle rotational velocity sensor 30) may be employed to provide closed-loop feedback to the computer 26. The computer 26 commands the variable speed motor 24 to rotate in accordance with a calculated desired differential rate. In some cases a reduction gear 27 is employed to more efficiently provide the desired differential rotation for a given variable speed reversible motor size or power.

In some embodiments, a vehicle also includes one or more torque sensors that determine a current or instantaneous differential torque between the first axle shaft and the second axle shaft. For example, vehicle 9 includes a sensor 7 that measures current torque for the first axle shaft 18 and a sensor 8 that measures current torque for the second axle shaft 20. In some embodiments, a desired differential rate may be employed that differs from the natural differential rate, based, at least in part, on a sensed current differential in torque between the first axle shaft and the second axle shaft. For example, the one or more torque sensors 7, 8 may be employed to provide closed-loop feedback to the computer 26.

In some embodiments, the variable speed motor (e.g., variable speed reversible motor) is an electric motor, (e.g., a servo motor or a stepper motor). In other embodiments the variable speed motor (e.g., variable speed reversible motor) is a hydraulic motor. Variable speed motors (e.g., variable speed reversible motor) that can be employed include, but are not limited to electric motors (e.g., servo or stepper motors), and hydrostatic motors.

Figure 3A:
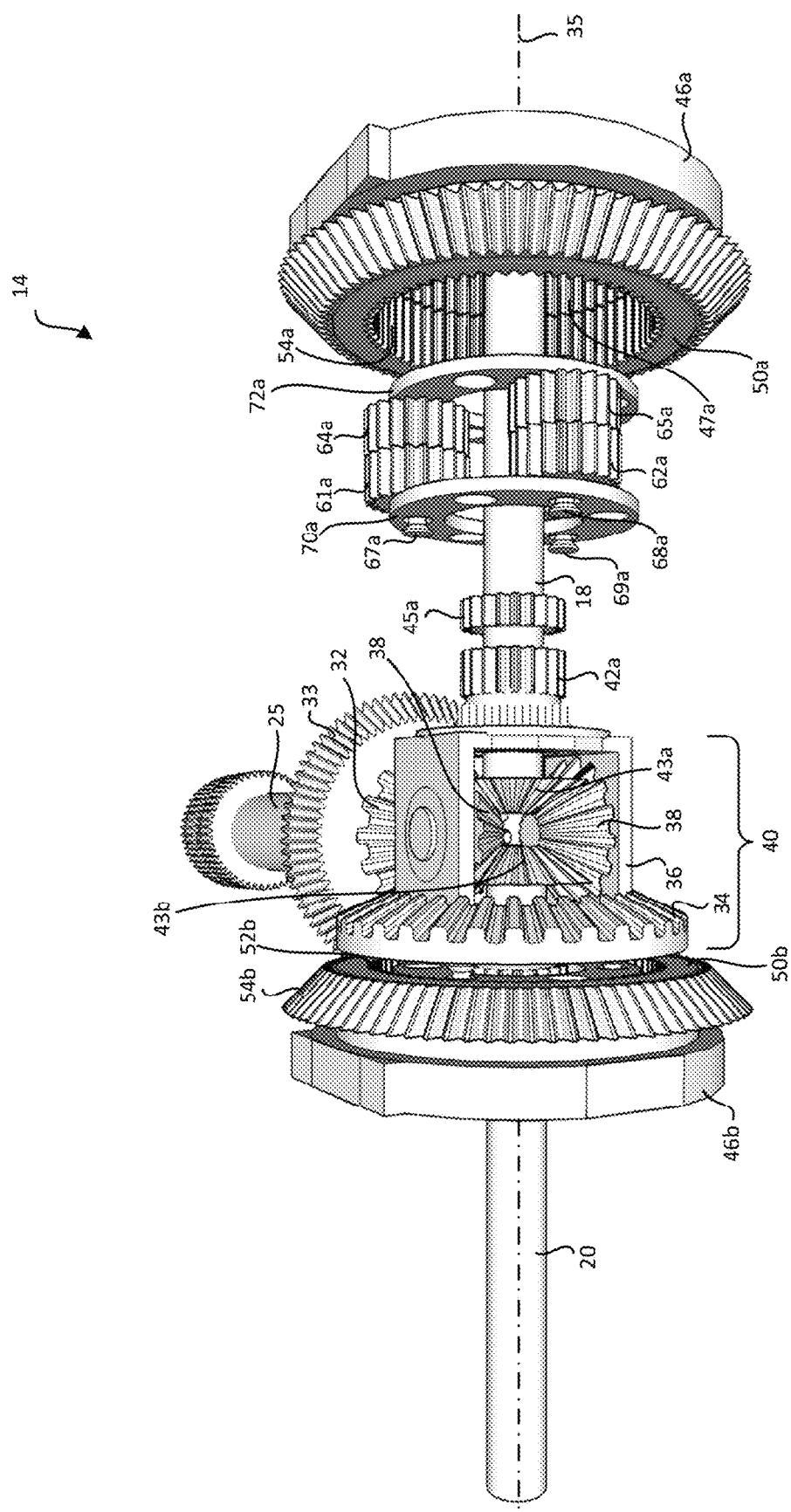
FIG. 3A is a perspective partially exploded view showing a regenerative gearing assembly having nested drive and control shafts in accordance with some embodiments.

As schematically shown in FIG. 2, the differential control shaft 25 extends from a different side of the gearing assembly 14 from the drive shaft 12; however in other front-wheel steered embodiments, the drive shaft 12 is at least partially nested in the differential control shaft 25 (see, e.g., FIG. 3D described below). In embodiments employing nested shafts, the drive shaft 12 rotates independently from the differential control shaft 25.

As described below, the gearing assembly 14 is used to control a differential in rotation rates between a first axle 18 and a second axle 20.

A first example embodiment of a gearing assembly 14 is depicted in FIGS. 3A-3D. The gearing assembly 14 includes a differential 40 (see FIG. 3A) configured to engage a first axle shaft 18 and a second axle shaft 20 of a vehicle and configured to be driven by a drive shaft 12 of the vehicle (see FIG. 3D). In some embodiments, the differential 40 is based on an open differential. Within the gearing assembly 14, the drive shaft 12 terminates with a beveled pinion gear 32. The pinion gear 32 turns a large beveled ring gear 34 that is set about the primary axis of rotation 35 of the first and second axle shafts 18, 20. The beveled ring gear 34 is attached to a carrier housing 36, which may be described as a gear carrier (e.g., a miter gear carrier), differential case or a differential cage. The carrier housing 36 turns with the beveled ring gear 34. The carrier housing 36 carries either one or two miter gears 38, which are also known as spider gears. In the embodiment depicted in FIGS. 3A-3D, two miter gears 38 are shown. The miter gears 38 are oriented at a perpendicular to the primary axis of rotation 35. In some embodiments, the carrier housing 36 is rotatably mounted within the gearing assembly case 16 using roller bearings 48a, 48b.

Both axle shafts 18, 20 terminate with beveled drive gears 43a, 43b. The first axle shaft 18 extends into the carrier housing 36 in which the beveled drive gear 43a of the first axle shaft intermeshed with the beveled miter gears 38. The second axle shaft 20 extends through the beveled ring gear 34 and into the carrier housing 36 where the beveled drive gear 43b of the second axle shaft intermeshes with the beveled miter gears 38.

The beveled pinion gear 32, beveled ring gear 34, carrier housing 36 and miter gears 38 are herein referred to collectively as the differential 40, which is configured to engage the first axle shaft 18, the second axle shaft 20, and a drive shaft 12 of the vehicle. One of ordinary skill in the art will appreciate that the components of the differential 40 may vary. For example, the gear carrier 36 may have a different shape or configuration, the beveled ring gear 34 may be a spiral beveled ring gear or a spur gear. There may be more or fewer than two miter gears (e.g., there may be four miter gears).

Figure 3B:
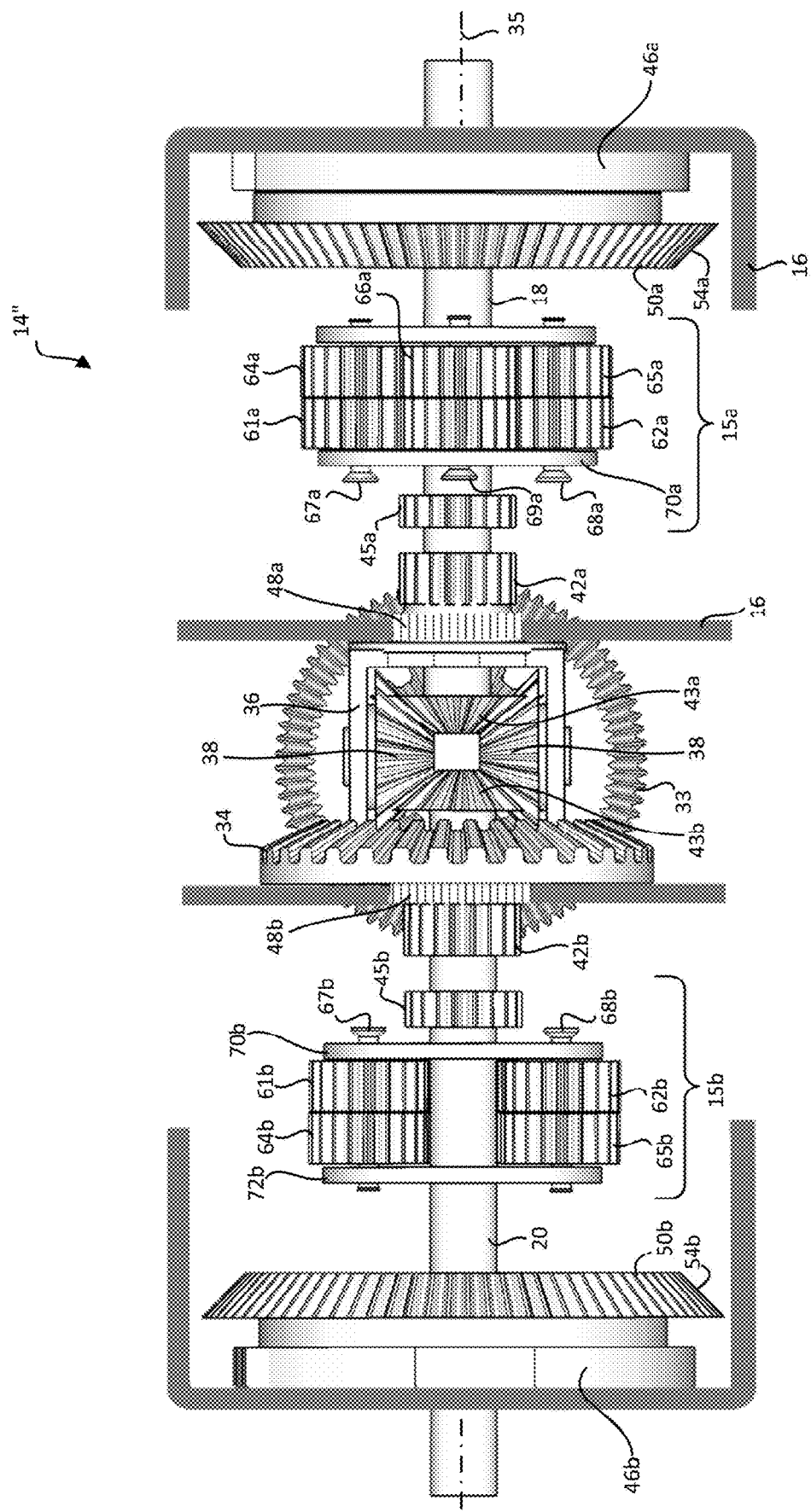
FIG. 3B is an exploded side view of the gearing assembly shown in FIG. 3A.

The gearing assembly 14 also includes a differential control pinion gear 33 configured to be driven by a variable speed reversible 24 motor of the vehicle (see FIG. 3B). In vehicles employing steering clutches and rotating elements instead of a variable speed reversible motor, the differential control pinion gear 33 is configured to be driven by the steering clutches and rotating elements. The gearing assembly 14 also includes a first plurality of adjustment gears 15a and a second plurality of adjustment gears 15b both configured to engage the differential 40 and to be driven by the differential control pinion gear 33 (see FIGS. 3B and 3D). The first plurality of adjustment gears 15a and the second plurality of adjustment gears 15b are configured to controllably alter a rotation rate of the first axle shaft 18 relative to a rotation rate of the second axle shaft 20 due to rotation of the differential control pinion gear 33 produced by the variable speed reversible motor 24 (see FIGS. 3B and 3D). In some embodiments, the first plurality of adjustment gears 15a is configured to apply a first differential torque to the first axle shaft 18 and the second plurality of adjustment gears 15b is configured to apply a second differential torque to the second axle shaft 20 due to rotation of the differential control pinion gear 33. The first plurality of adjustment gears 15a, and the second plurality of adjustment gears 15b are configured to impose a differential in rotational rates between the first axle shaft and the second axle shaft based on rotation of the differential control pinion gear 33 by the variable speed reversible motor 24. In some embodiments, the differential control pinion gear 33 is connected to the variable speed reversible motor 24 through a differential control shaft 25.

In some embodiments, the arrangement of the second plurality of adjustment gears 15b generally mirrors the arrangement of the first plurality of adjustment gears 15a. Both the first plurality of adjustment gears 15a and the second plurality of adjustment gears 15b include two sets of planetary gears, an inner set closer to the differential 40 (first set of planetary gears 61a, 62a, 63a and third set of planetary gears 61b, 62b, 63b) and an outer set further from the differential 40 (second set of planetary gears 64a, 65a, 66a and fourth set of planetary gears 64b, 65b, 66b). For both the first plurality of adjustment gears 15a and the second plurality of adjustment gears 15b the inner and outer sets of planetary gears coupled to the same respective planetary gear carrier (e.g., the first set of planetary gears 61a, 62a, 63a and the second set of planetary gears 64a, 65a, 66a are coupled to a first planetary gear carrier and the third set of planetary gears 61b, 62b, 63b and the fourth set of planetary gears 64b, 65b, 66b are coupled to a second planetary gear carrier). In the embodiment depicted in FIGS. 3A-3D, each planetary gear carrier includes two endplates and pins (e.g., the first planetary gear carrier includes endplates 70a, 72a and pins 67a, 68a, 69a and the second planetary gear carrier includes endplates 70b, 72b and pins 67b, 68b, 69b); however, in other embodiments, the planetary gear carriers can have other configurations as are known in the art.

The choice of three planetary gears per set of planetary gears is merely exemplary and it will be understood that any number of planetary gears per set can be used provided the described transfer of mechanical energy between components is achieved.

The inner set of planetary gears (first set of planetary gears 61a, 62a, 63a and third set of planetary gears 61b, 62b, 63b) couples the respective plurality of adjustment gears 15a, 15b to the differential 40. For example, in some embodiments, the gearing assembly 14 also includes a first differential sun gear 42a coupled to, attached, to or integral with the carrier housing 36 of the differential and a second first differential sun gear 42b coupled to, attached, to or integral with the carrier housing 36. The differential sun gears 42a, 42b rotate with the beveled ring gear 34 and the carrier housing 36 of the differential 40. Each inner set of planetary gears (first set of planetary gears 61a, 62a, 63a and third set of planetary gears 61b, 62b, 63b) engages with the differential 40 by engaging the respective differential sun gear 42a, 42b.

Embodiments employing differential sun gears 42a, 42b to engage and drive the inner sets of planetary gears may have relatively little parasitic drag because the differential sun gears 42a, 42b are relatively small.

The outer set of planetary gears (second set of planetary gears 64a, 65a, 66a and fourth set of planetary gears 64b, 65b, 66b) couples the respective plurality of adjustment gears 15a, 15b to the respective axle shaft 18, 20. For example, in some embodiments a first axle sun gear 45a is coupled to, attached, to or integral with the first axle shaft 18 and a second axle sun gear 45b is coupled to, attached, to or integral with the second axle shaft 18. The first axle sun gear 45a rotates with the first axle shaft 18 and the second axle sun gear 45b rotates with the second axle shaft. Each outer set of planetary gears (second set of planetary gears 64a, 65a, 66a and fourth set of planetary gears 64b, 65b, 66b) engages the respective axle 18, 20 through the respective axle sun gear 45a, 45.

By coupling the inner set of planetary gears (first set of planetary gears 61a, 62a, 63a and third set of planetary gears 61b, 62b, 63b, respectively) and the outer set of planetary gears (second set of planetary gears 64a, 65a, 66a and fourth set of planetary gears 64b, 65b, 66b, respectively) to a common planetary gear carrier (first planetary gear carrier and second planetary gear carrier, respectively), the inner set of planetary gears and the outer set of planetary gears are forced to orbit their respective sun gears at the same orbital velocity. However, while inner and outer planet gears share the same orbital velocity due to being mounted on a common planetary gear carrier, they are allowed to spin independently from each other.

The orbital speed of the inner set of planetary gears (e.g., first set of planetary gears 61a, 62a, 63a and third set of planetary gears 61b, 62b, 63b) is proportional to the rotational speed of the respective axle shaft (e.g., first axle shaft 18 and second axle shaft 20).

In some embodiments, each plurality of adjustment gears 15a, 15b also includes an internal gear 46a, 46b that is stationary with respect to the gearing assembly case 16 (e.g., mounted to, coupled to, or integral with the gearing assembly case 16), which is stationary with respect to the variable speed reversible motor 24. Each internal gear 46a, 46b includes internal teeth 47a that engage the respective outer set of planetary gears (second set of planetary gears 64a, 65a, 66a and fourth set of planetary gears 64b, 65b, 66b, respectively).

In some embodiments, each plurality of adjustment gears 15a, 15b also includes an externally toothed ring gear 50a, 50b having external teeth 54a, 54b configured to intermesh with the differential control pinion gear 33 and having internal teeth 52a, 52b configured to intermesh with the respective inner set of planetary gears (first set of planetary gears 61a, 62a, 63a and third set of planetary gears 61b, 62b, 63b). In some embodiments, the external teeth 54a, 54b are beveled as shown. Turning the externally toothed ring gear 50a, 50b imparts an additive or subtractive rotation to the rotational speed of the respective axle shaft 18, 20 relative to the other axle shaft, depending on which direction the externally toothed ring gear 50a, 50b, is rotated. Both externally toothed ring gears 50a, 50b are intermeshed with the differential control pinion gear 33 in such a way that rotating differential control pinion gear 33 causes the externally-toothed ring gears 50a, 50b to both rotate with the same rotation speed in opposite directions, thus imposing an increased a rotational rate on one axle shaft by an amount and imposing a decreased rotation rate on the other axle shaft by the same amount to impose a difference in rotational rates between the axle shafts 18, 20.

In some embodiments, the rate of rotation of the variable speed reversible motor 24 is proportional to the desired difference in rotational velocity between the first axle shaft 18 and the second axle shaft 20 and the rate of rotation of the differential control pinion gear 33 is proportional to the desired difference in rotational velocity between the first axle shaft 18 and the second axle shaft 20. In embodiments employing externally toothed ring gears 50a, 50b to transfer rotational motion from the variable speed reversible motor 24 to the respective inner sets of planetary gears, the rate of rotation of the externally toothed ring gear 50a, 50b is also proportional to the desired difference in rotational speed between the first axle shaft 18 and the second axle shaft 20. Thus, when there is no desired difference in the rotational speed between the first axle shaft 18 and the second axle shaft 20, there is no rotation of the externally toothed ring gears 50a, 50b. During straight line travel when there is no desired difference in the rotational speed between the first axle shaft 18 and the second axle shaft 20, the externally toothed ring gear 50a, 50b, the inner sets of planetary gears and the outer sets of planetary gears, all turn at a fraction of the rotational speed of the second axle shaft 20. Because the externally toothed ring gears 50a, 50b would have a relatively high inertia as compared to a gear having a smaller diameter, it is particularly beneficial that externally toothed ring gears 50a, 50b only rotate when a difference in rotational speed between the axle shafts is required, and when a difference in rotational speed is required, the rotational speed of externally toothed ring gears 50a, 50b is smaller than that of either axle shaft. If instead the externally toothed ring gears 50a, 50b were required to rotate faster than the second axle shaft, the system would experience significant drag from the externally toothed ring gears 50a, 50b.

When the carrier housing 36 of the differential 40 turns, the differential sun gears 42a, 42b also turn. The differential sun gears 42a, 42b, each turn the respective inner set of planetary gears. The orbital movement of the inner set of planetary gears is transferred to the outer set of planetary gears by the common carrier. Each outer set of planetary gears turns the respective axle sun gear 45a, 45b on the respective axle shaft 18, 20.

The differential control pinion gear 33 is selectively rotated by the variable speed reversible motor 24. The differential control pinion gear 33 intermeshes with the exterior teeth 54a, 54b of each externally toothed ring gear 50a, 50b causing the externally toothed ring gears 50a, 50b, to rotate in opposite directions. Because the differential control pinion gear 33 can be rotated by the variable speed reversible motor 24 at different speeds, it will be understood that the externally toothed ring gears 50a, 50b can also be rotated at different speeds.

In some embodiments, the first plurality of adjustment gears 15a and the second plurality of adjustment gears 15b are configured such that zero rotation of first externally toothed ring gear 50a and zero rotation of the second externally toothed ring gear 50b correspond to no difference in rotational velocity between the first axle shaft 18 and the second axle shaft 20. In some embodiments, a rate of rotation of the first externally toothed ring gear 50a is proportional to a desired difference in rotational velocity between the first axle shaft 18 and the second axle shaft 20.

As described above, the first plurality of adjustment gears 15a and the second plurality of adjustment gears 15b enable control of a difference in rotational speed between the first axle shaft 18 and the second axle shaft 20 using a variable speed reversible motor with relatively little added drag and with relatively little resistance to changes in rotational velocity.

As noted above, the differential control pinion gear 33 is rotated by the variable speed reversible motor 24. In some embodiments, the variable speed reversible motor 24 may connect to differential control pinion gear 33 through a reduction gear 73 (see FIGS. 4C and 4D).

In some embodiments, the differential control pinion gear 33 is attached to a differential control shaft 25 that is driven by the variable speed reversible motor 24. In some embodiments, the differential control shaft 25 is hollow and the drive shaft 12 extends through the differential control shaft 25, which is referred to herein an embodiment with nested drive and differential control shafts. Although the shafts are nested, the differential control shaft 25 and the drive shaft 12 are free to rotate independent of each other. These nested shaft embodiments provide for a compact layout. For embodiments where the differential control shaft is used to steer the vehicle, this may be described as nested drive and steering shafts.

In other embodiments, the drive shaft 12 and the differential control shaft 25 may extend from different sides of the gearing assembly case 16. In some embodiments the differential control pinion gear 33 is located on the opposite side of the carrier housing 36 from the bevel pinion gear 33 connected to the drive shaft 12 (see FIGS. 4A-4D described below).

The drive shaft 12 is rotated by the vehicles propulsion system, such as an internal combustion engine and transmission, a hydrostatic drive or through an electric motor. Power to rotate the differential control shaft 25 is supplied by the existing propulsion engine or motor, or through a separate, dedicated engine or variable speed reversible motor.

As depicted in FIGS. 3A-3D, the planetary gears 61a-66a, 61b-66b are not stepped gears. In some embodiments, the planetary gears are stepped planetary gears, as described below with respect to FIGS. 7-15. In some embodiments, the planetary gears in the embodiment of FIGS. 3A-3D are replaced with stepped planetary gears.

As depicted in FIGS. 3A-3D the first axle sun gear 45a and the second axle sun gear 42b are spur gears. As depicted in FIGS. 3-6, the first differential sun gear 42a and the second differential sun gear 42b are spur gears. In other embodiments, the axle sun gears and the differential sun gears may have other configurations. For example, in some embodiments, any or all of the differential sun gears, the axle sun gears, the set of inner planetary gears, and the set of outer planetary gears may have helical teeth (see embodiment shown in FIGS. 4A-4C). In such embodiments, the internal teeth 52a, 52b of the externally toothed ring gears 50a, 50b are also helical (see embodiment shown in FIGS. 4A-4C). In some embodiments, the planetary gears may be stepped and have helical teeth.

As depicted, the pinion gear 32 for the drive shaft is beveled. In some embodiments, the pinion gear 32 for the drive shaft may be a spiral bevel pinion gear and the beveled ring gear 34 may be a spiral bevel ring gear (see embodiment shown in FIGS. 4A-4C). In some embodiments, the pinion gear for the drive shaft may not be a bevel pinion gear (see embodiment shown and described with respect to FIGS. 17A and 17B). In some embodiments, the pinion gear for the drive shaft is a bevel pinion gear, but the externally toothed ring gears are not beveled (see embodiment shown and described with respect to FIGS. 16A and 16B). In some embodiments, the pinon gear interacts with one or both of the externally toothed ring gears via one or more other gears (see embodiments shown and described with respect to FIGS. 16A-17B).

As depicted in FIGS. 3A-3D, the first axle shaft 18 is the right axle shaft of the vehicle for a rear axle and the second axle shaft 20 is the left axle shaft of the vehicle for a rear axle; however, in some embodiments the first axle shaft 18 is the left axle shaft and the second axle shaft 20 is the right axle shaft. Further, in some embodiments, the first axle shaft 18 and the second axle shaft 20 are axle shafts of a front axle. In some embodiments, the first axle shaft 18 and the second axle shaft 20 provide a differential rotation rate between a front axle and a rear axle of a vehicle in a vehicle with all-wheel drive. In the embodiment depicted in FIGS. 3A-3D, the interior of each internal gear 46a, 46b is the same size and has the same gearing as the internal teeth 52a, 52b of the respective externally toothed ring gear 50a, 50b. However, these dimensions and gearing types can be altered depending upon numerous factors, such as wheel size and vehicle type to optimize performance.

Figure 3C:
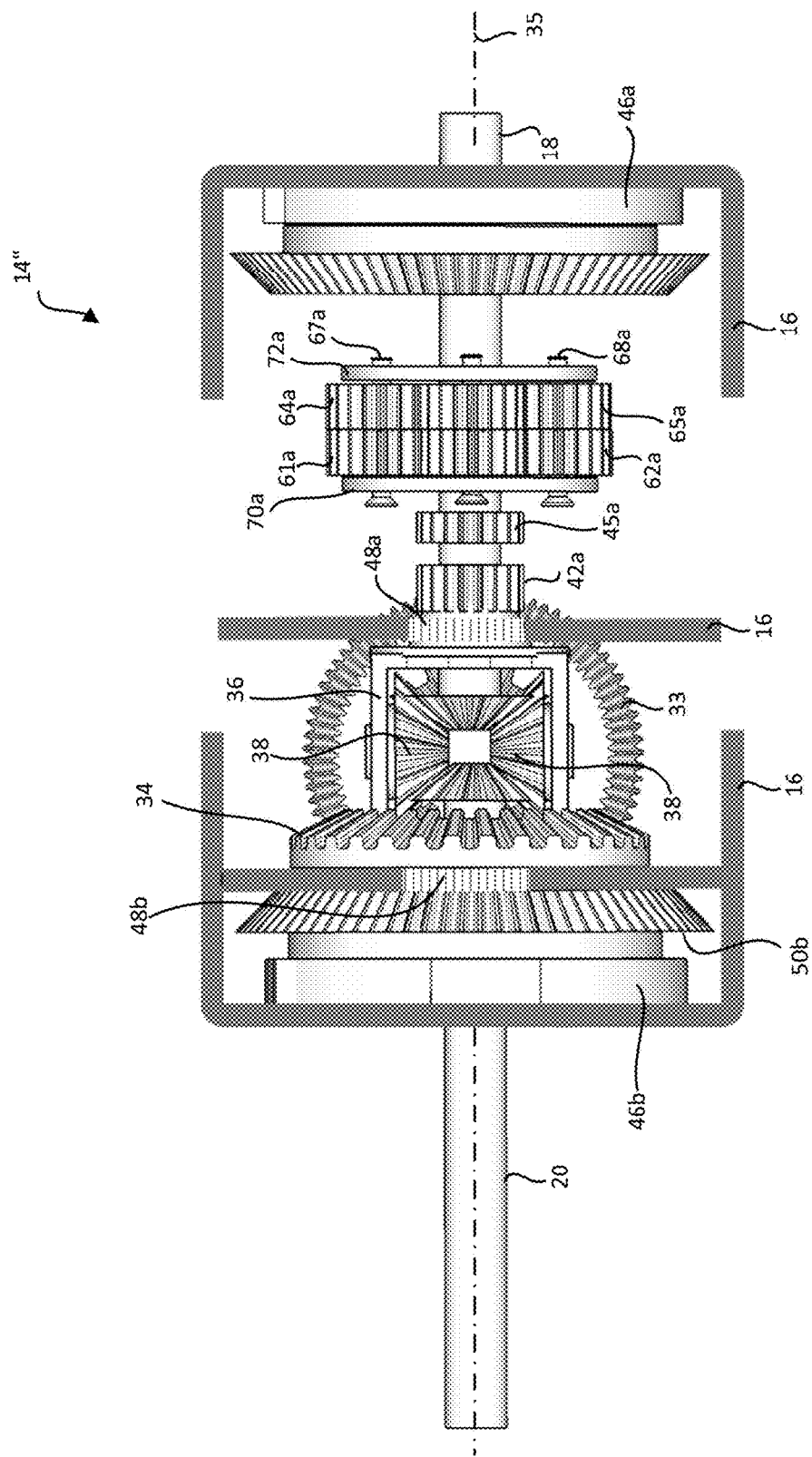
FIG. 3C is a partially exploded side view of the gearing assembly shown in FIG. 3A.
Figure 3D:
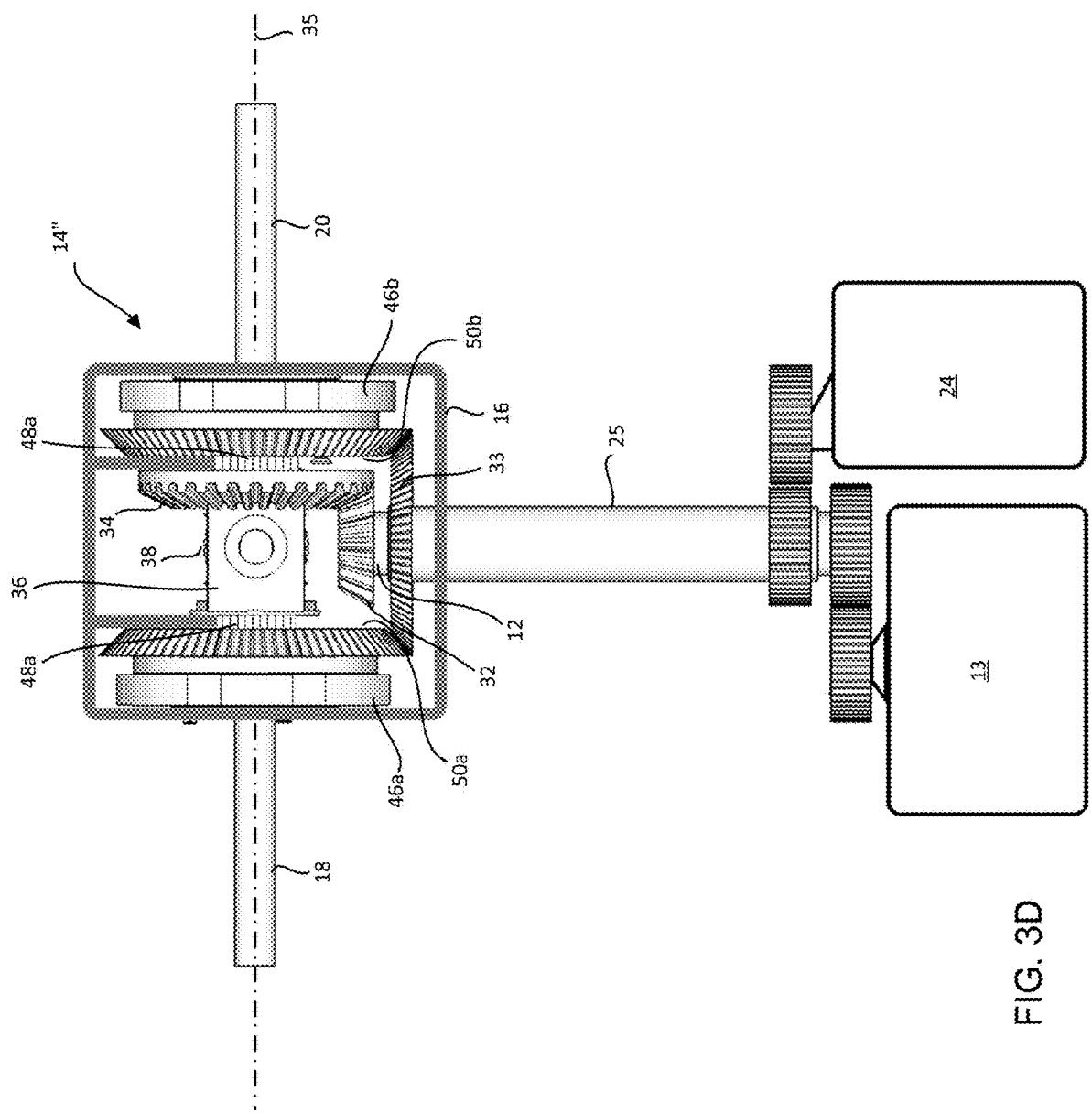
FIG. 3D is a top view of the gearing assembly shown in FIG. 3A.
Figure 4A:
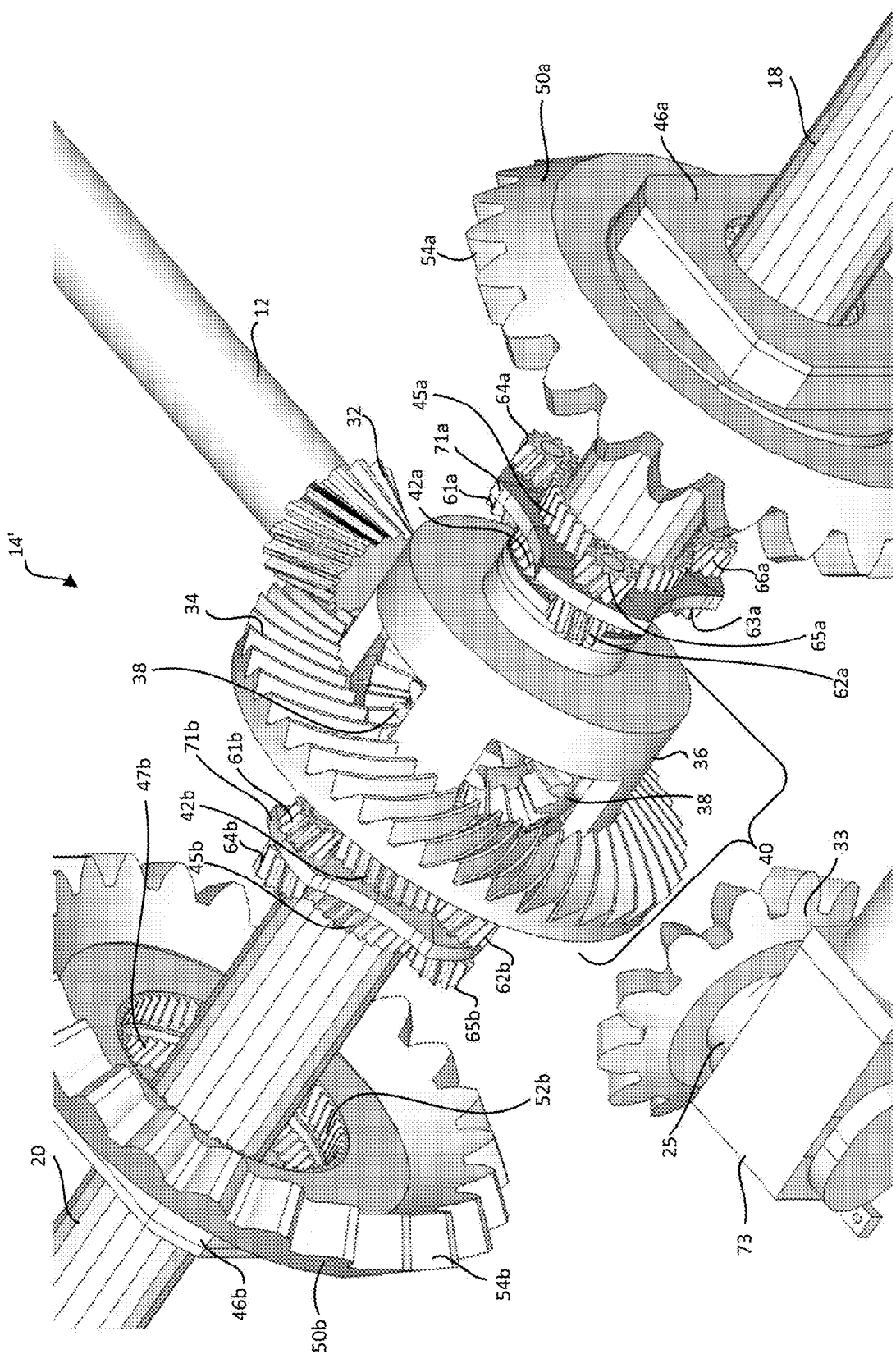
FIG. 4A is a perspective exploded view of a regenerative gearing assembly where the drive and control shafts are on opposite sides of the assembly in accordance with some embodiments.
Figure 4B:
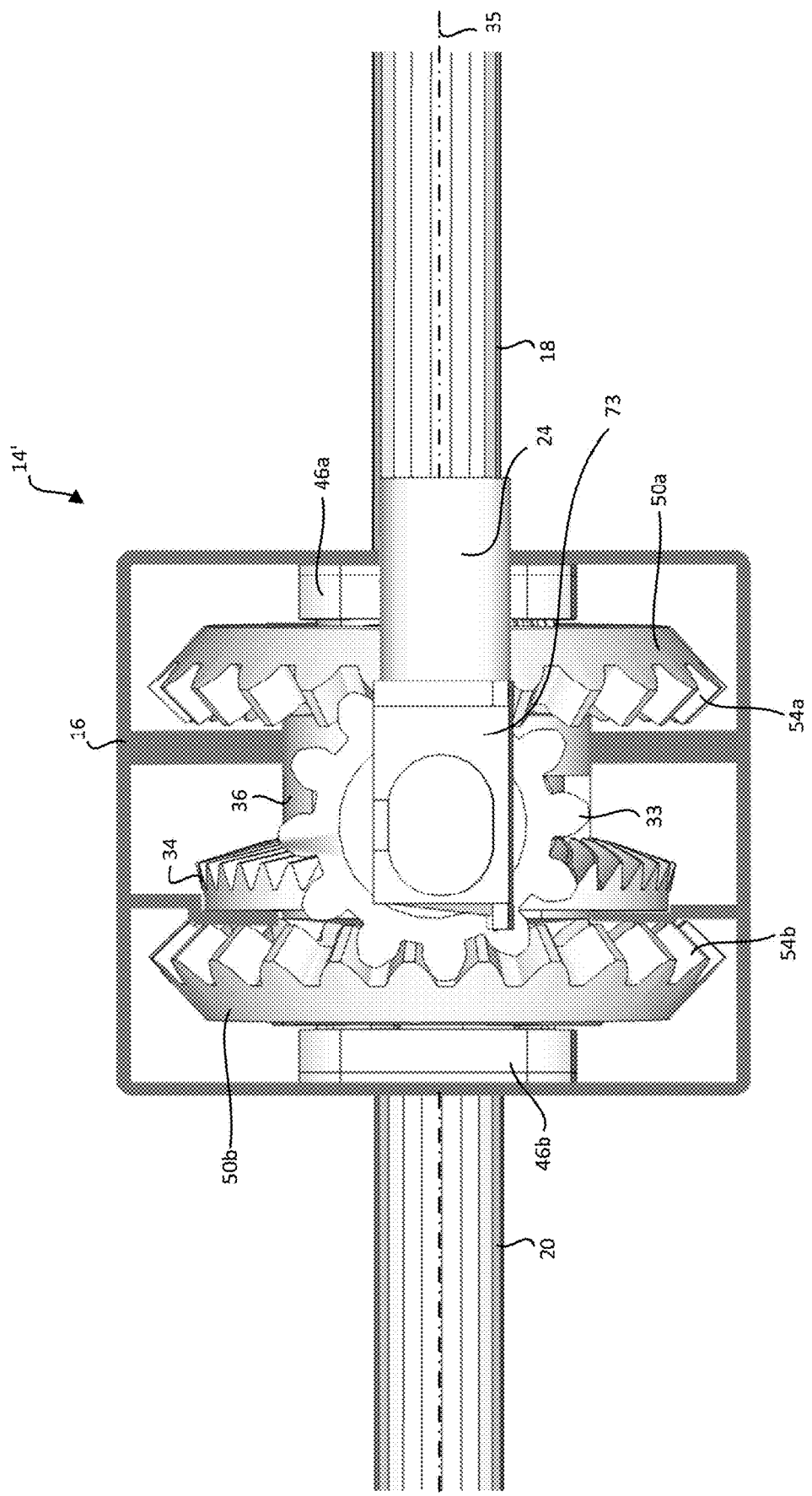
FIG. 4B is a side view of the gearing assembly shown in FIG. 4A.
Figure 4C:
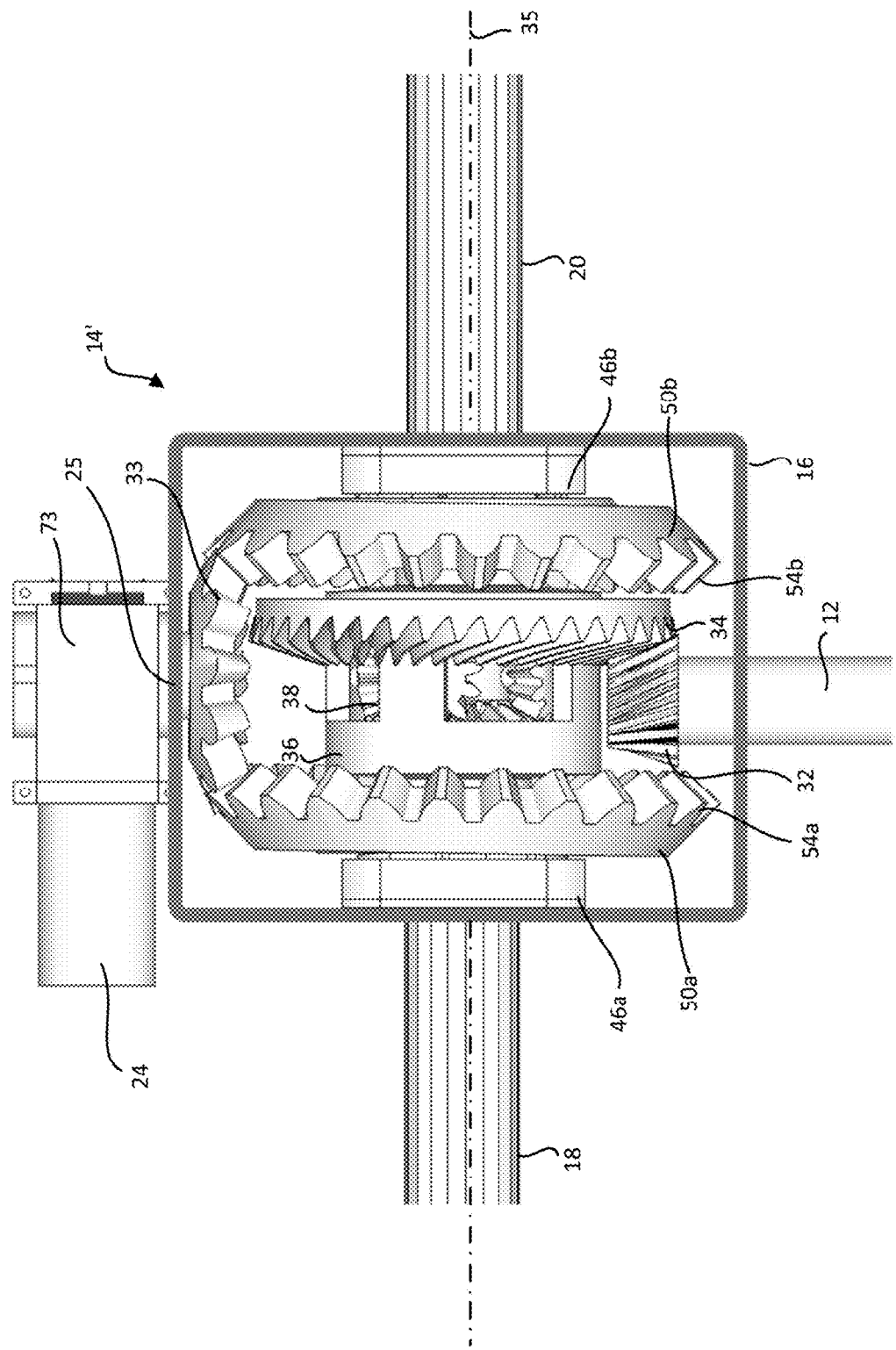
FIG. 4C is a top view of the gearing assembly shown in FIG. 4A.
Figure 4D:
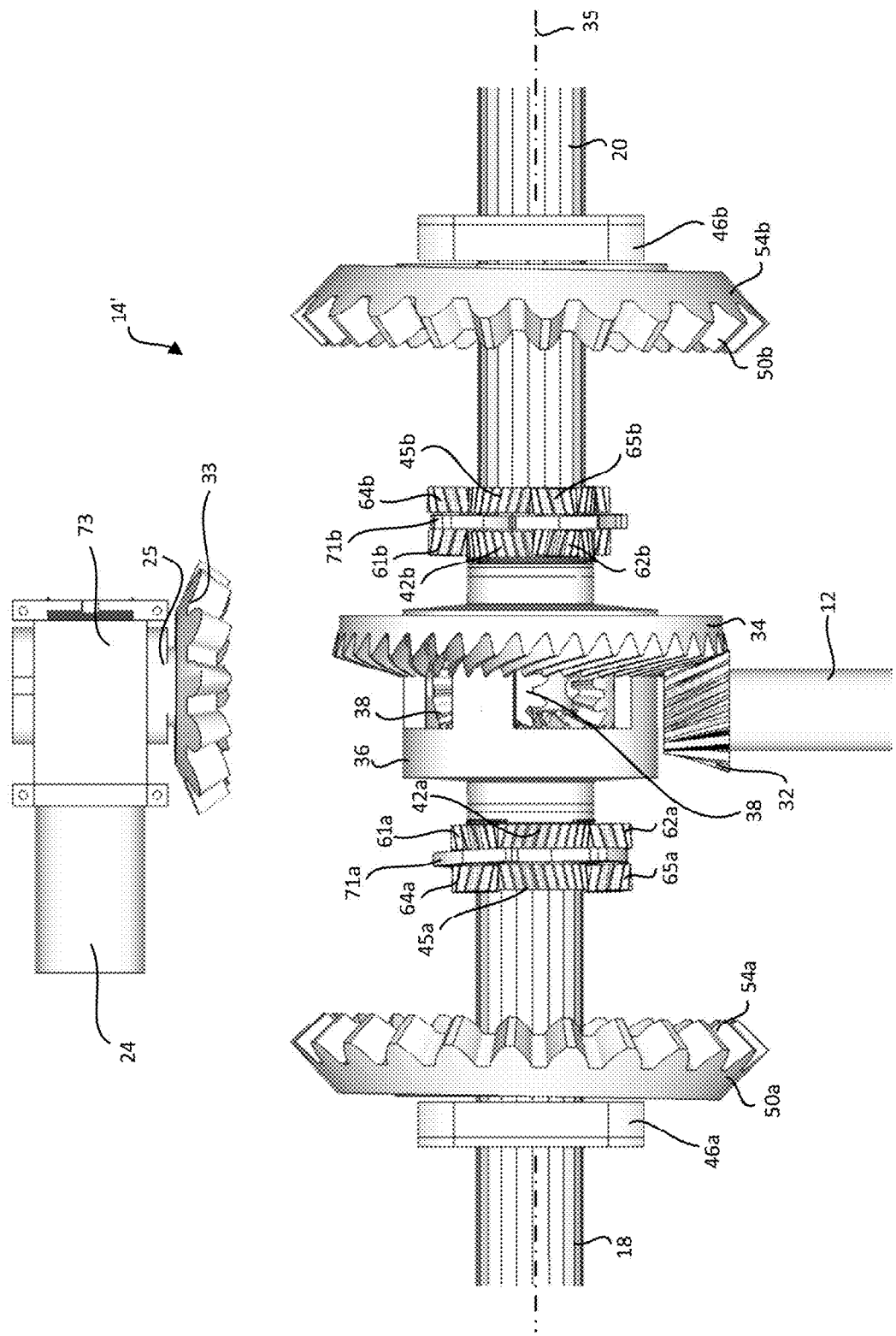
FIG. 4D is an exploded top view of the gearing assembly shown in FIG. 4A.

FIGS. 4A-4C depict a gearing assembly 14' in accordance with a second example embodiment. The gearing assembly 14' FIGS. 4A-4C includes many components that are the same as or similar to the components described above in relation to the gearing assembly 14 of FIGS. 3A-3D, and therefore, uses many of the same reference numbers. Most of the description above with respect to the first example embodiment is applicable to the second example embodiment. Some differences between the embodiments are described below.

In the second example embodiment of the gearing assembly 14', the teeth of many of the gears have a different configuration than those of the corresponding elements in the first example embodiment. For example, in the second example embodiment, the teeth 47a, 47b of the internal gears 46a, 46b are helical. The interior teeth 52a, 52b of the externally toothed ring gears 50a, 50b are also helical in gearing assembly 14'. The teeth of the axle sun gears 45a, 45b, the teeth of the differential sun gears 42a, 42b, and the teeth of all of the sets of planetary gears 61a, 62a, 63a, 64a, 65a, 66a, 61b, 62b, 63b, 64b, 65b, 66b are all helical in gearing assembly 14'. Further, the externally toothed ring gears 50a, 50b have a different shape in gearing assembly 14' with an outer portion of the ring extending inward toward the differential control pinion gear 33. The differential 40 also has some different aspects in gearing assembly 14' of the second example embodiment as compared with gearing assembly 14 of the first example embodiment. The carrier housing 36 has an overall cylindrical shape in gearing assembly 14' as compared to the overall generally box shape of the carrier housing 36 in gearing assembly 14. Further, beveled ring gear 34 is a spiral bevel gear in gearing assembly 14' to intermesh with a spiral bevel pinion gear 32 driven by the drive shaft 12. Also the differential 40 includes four miter gears 38 in the second embodiment, as opposed to two miter gears in the first embodiment.

The use of helical teeth for various gears may be advantageous because, generally, helical gears are quieter and may carry more load than straight cut gears. However, gears with helical teeth are generally more expensive than straight cut gears.

Unlike the nested shaft embodiment depicted in FIGS. 3A-3D, the gearing assembly 14' includes a configuration where the pinion gear 32 for the drive shaft 12 is on an opposite side of the carrier housing 36 from the differential control pinion gear 33. In the embodiment shown in FIGS. 3A-3D, the differential control shaft 25 is relatively short and the variable speed reversible motor 24 is located close to the gearing assembly (see FIG. 4C).

The arrangement of the inner sets of planetary gears and the outer sets of planetary gears with respect to the planetary gear carrier is different in the second example embodiment than in the first example embodiment. For example, in the first example embodiment, each planetary gear carrier includes two endplates 70a, 72a, and 70b, 72b respectively with the inner sets and the outer set of planetary gears disposed between the end plates. In the second example embodiment, each planetary gear carrier 71a, 71b separates the inner set of planetary gears from the outer set of planetary gears.

As depicted in FIGS. 4A-4C, the planetary gears 61a-66a, 61b-66b are not stepped gears. In some embodiments, the planetary gears are stepped planetary gears, as described below with respect to FIGS. 7-15. In some embodiments, the planetary gears in the embodiment of FIGS. 4A-4C are replaced with stepped planetary gears.

As noted above, in some embodiments of a gearing assembly for a differentially steered vehicle, the differential control pinion gear 33 is configured to be driven by steering clutches of the vehicle instead of by a variable speed reversible motor. In such embodiments, the steering clutches are used to controllably alter a rotation rate of the first axle 18 relative to the second axle 20 to steer the vehicle.

Figure 5A:
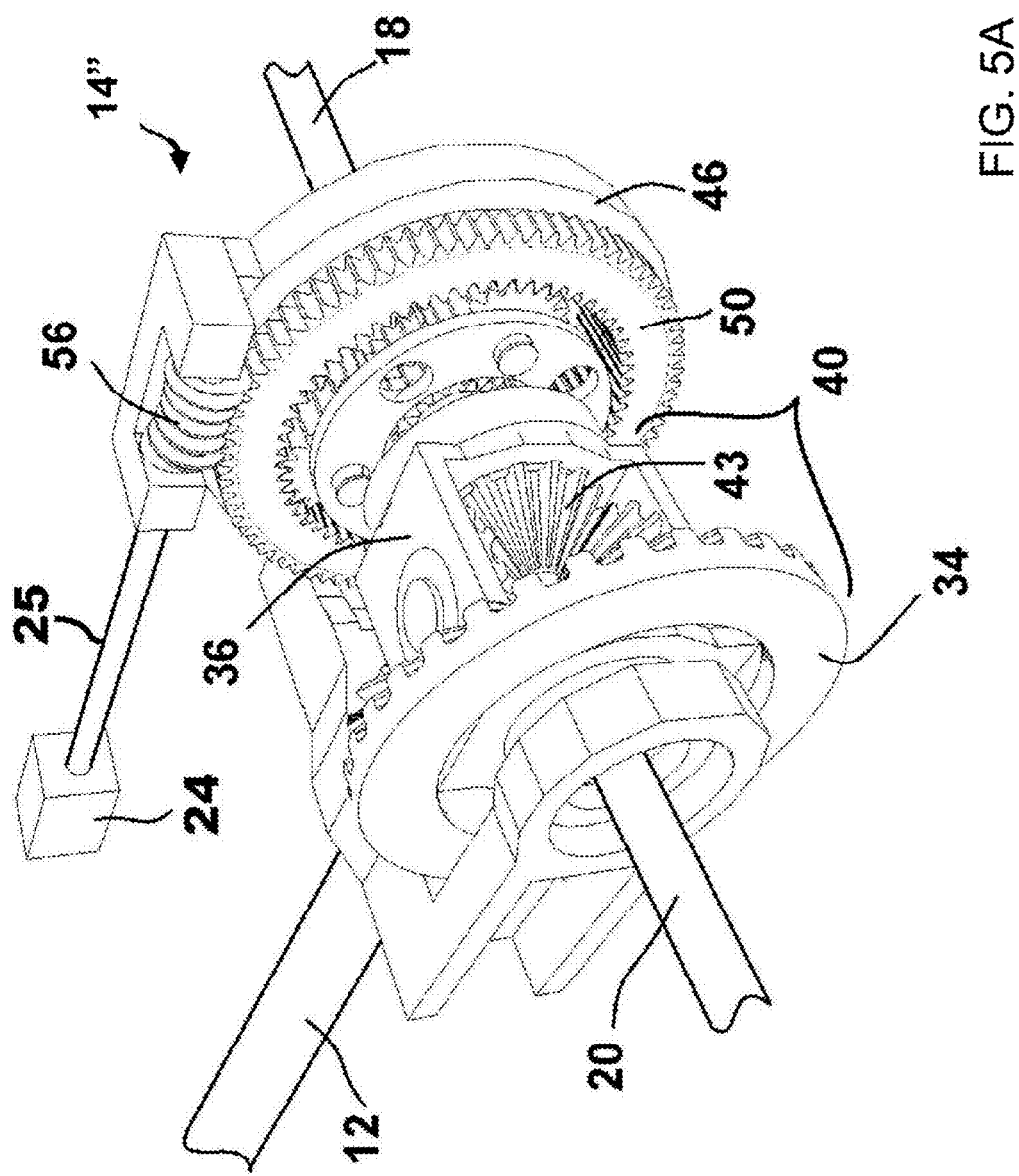
FIG. 5A is a perspective view of non-regenerative gearing assembly having one plurality of adjustment gears in accordance with some embodiments.
Figure 5B:
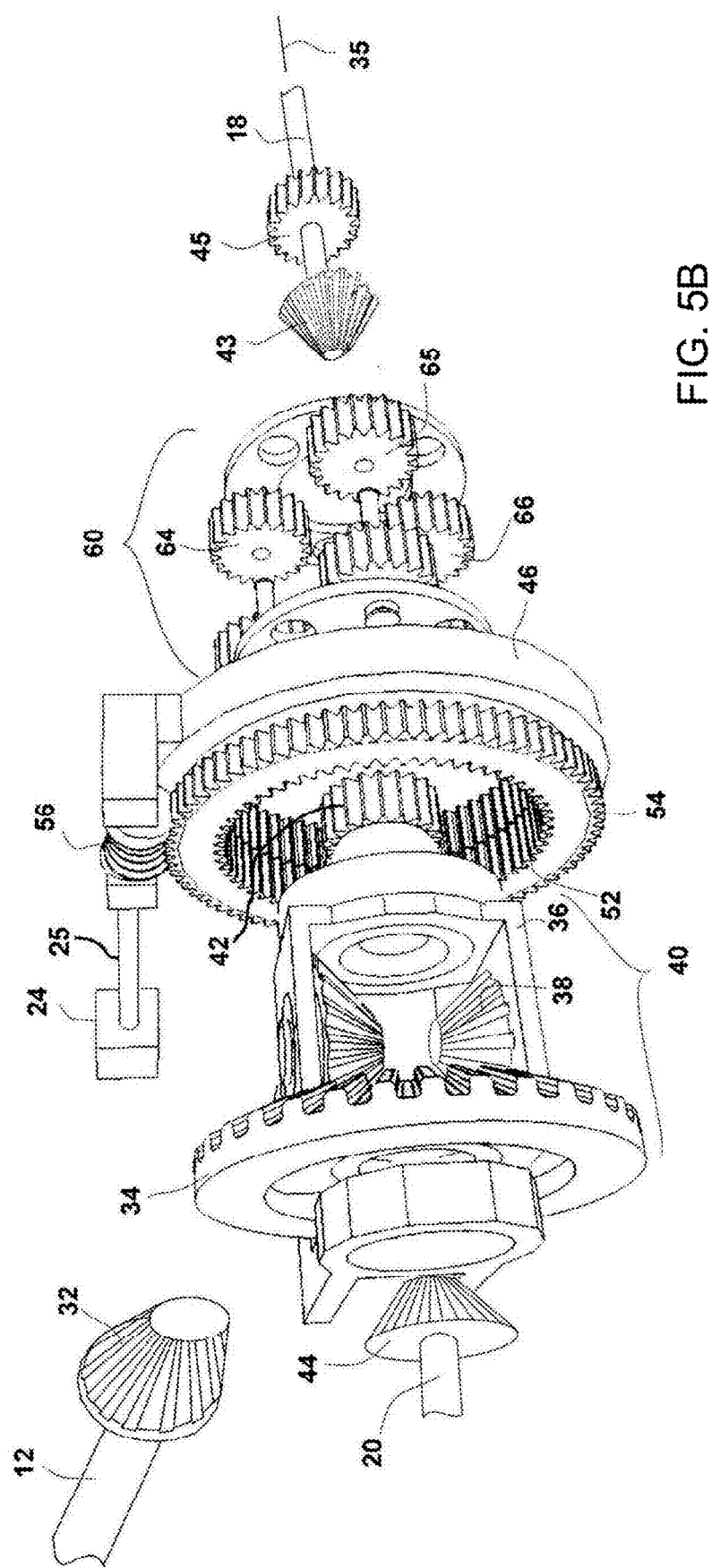
FIG. 5B is an exploded perspective view of the gearing assembly shown in FIG. 5A.
Figure 5C:
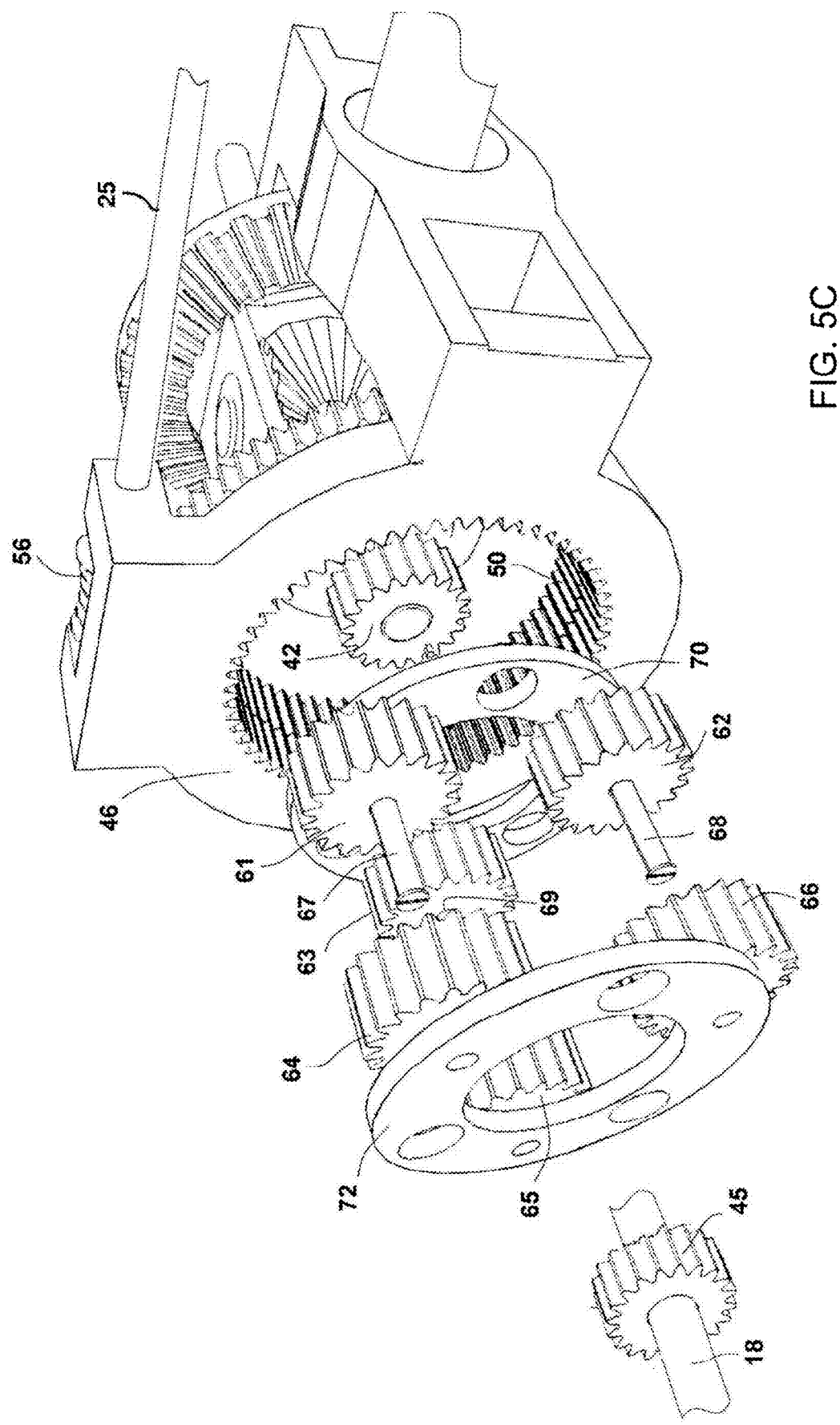
FIG. 5C is an exploded reverse perspective view of the gearing assembly shown in FIG. 5A.
Figure 6A:
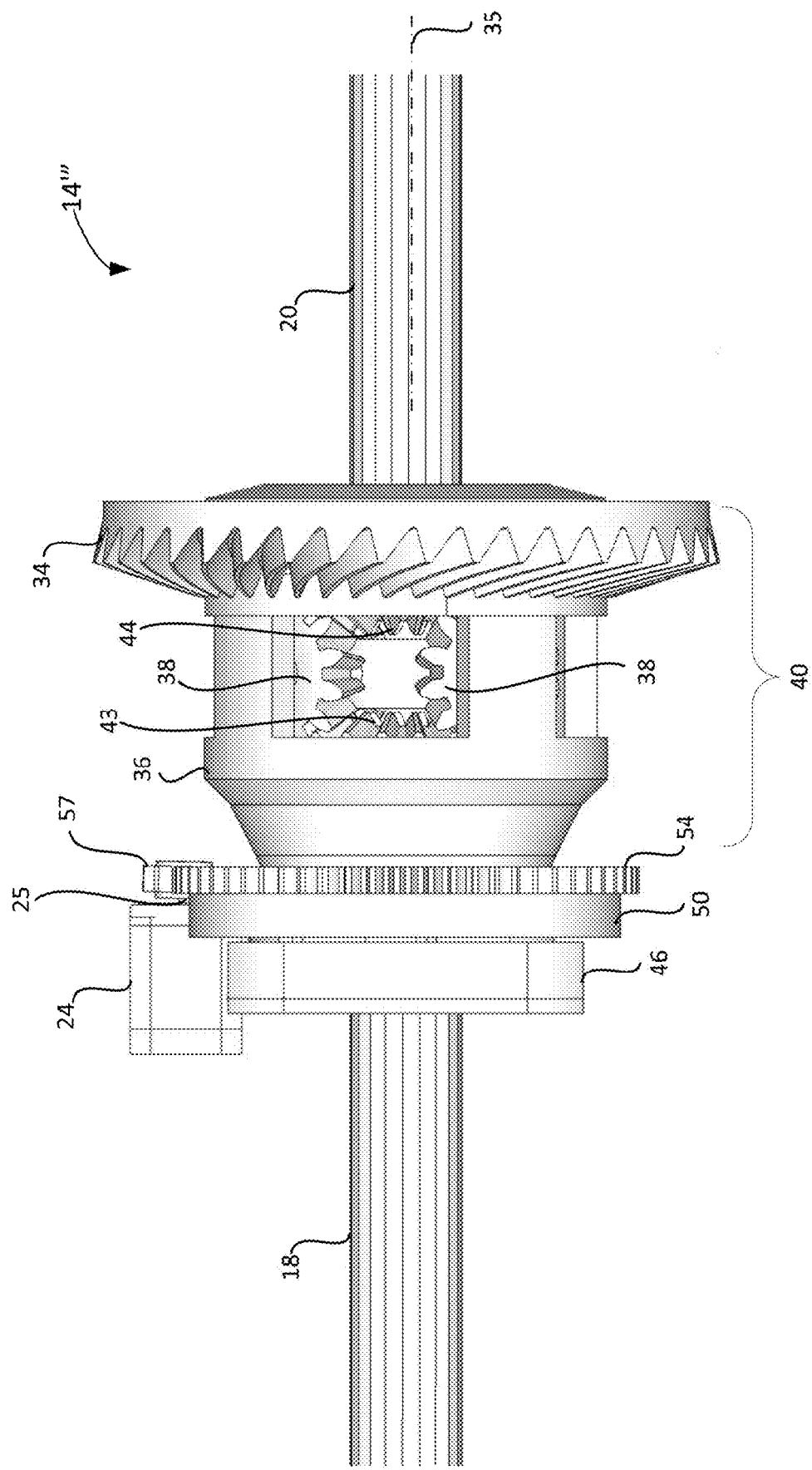
FIG. 6A is a side view of another non-regenerative gearing assembly having one plurality of adjustment gears in accordance with some embodiments.
Figure 6B:
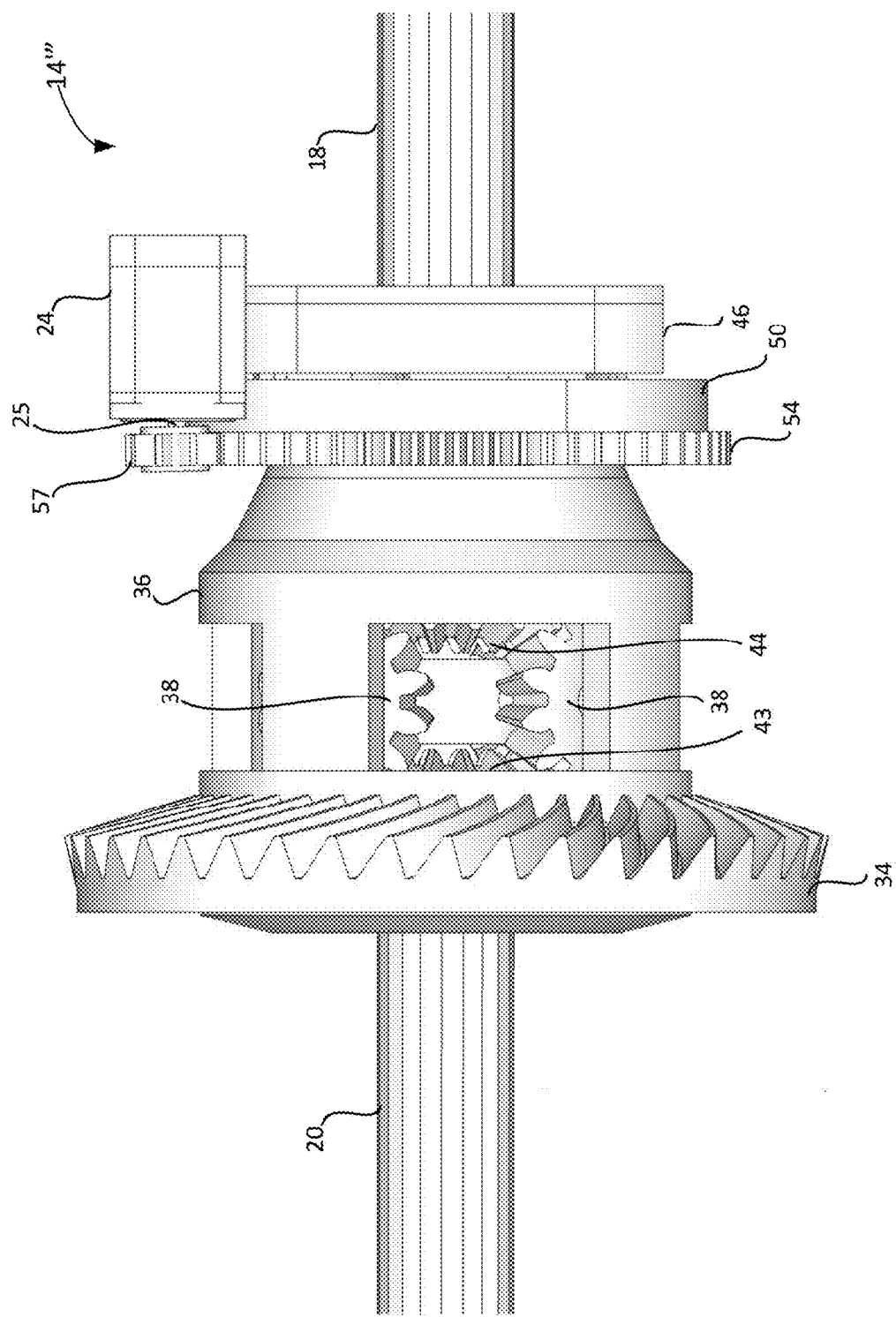
FIG. 6B is a reverse side view of the gearing assembly shown in FIG. 6A.
Figure 6C:
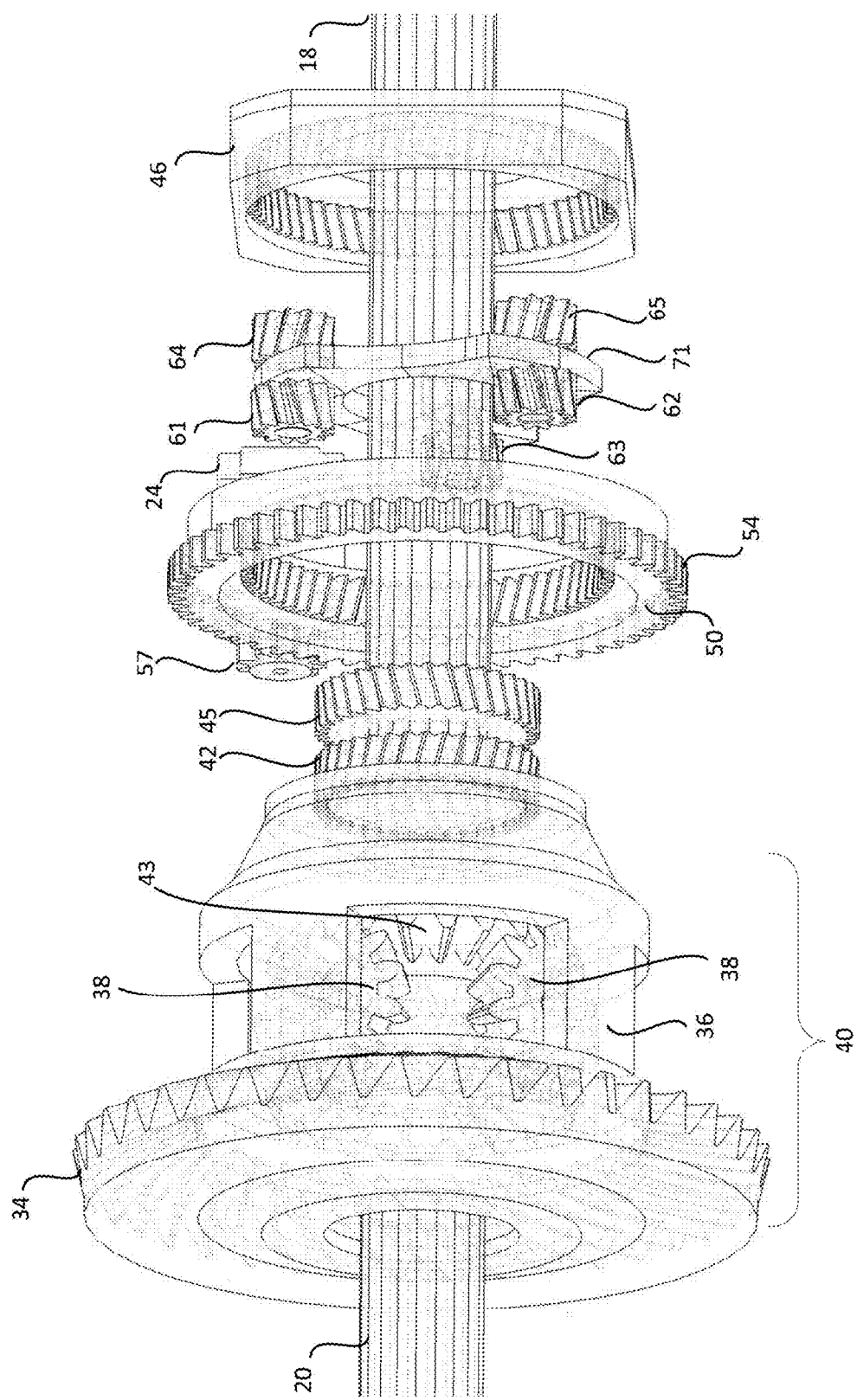
FIG. 6C is an exploded perspective view of the gearing assembly shown in FIG. 6A.
Figure 6D:
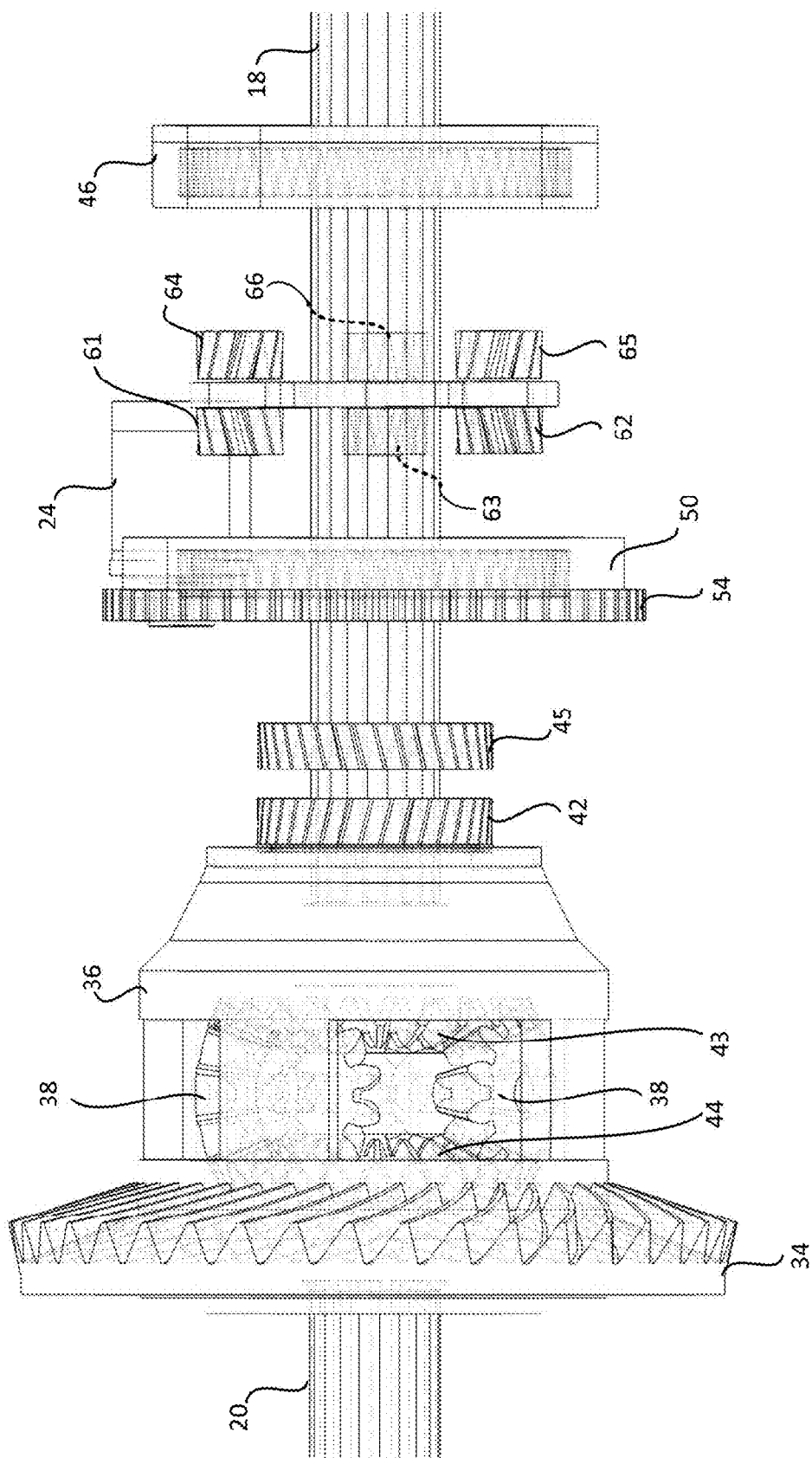
FIG. 6D is an exploded side view of the gearing assembly shown in FIG. 6A.

FIGS. 5A-5C depict a gearing assembly 14" in accordance with a third example embodiment. Some elements of gearing assembly 14" are similar to those of gearing assembly 14 and 14' described above. Two significant differences are that the gearing assembly 14" has only one plurality of adjustment gears and is not regenerative. Within the gearing assembly 14, the driveshaft 12 terminates with a traditional beveled pinion gear 32. The pinion gear 32 turns a large beveled ring gear 34 that is set about the primary axis of rotation 35 of the two rear axle shafts 18, 20. The beveled ring gear 34 is attached to a miter gear carrier 36. The miter gear carrier 36 turns with the beveled ring gear 34. The miter gear carrier 36 carries one or more miter gears 38. In the shown embodiment, two miter gears 38 are shown. The miter gears 38 are oriented at a perpendicular to the primary axis of rotation 35 in the traditional manner.

The beveled pinion gear 32, beveled ring gear 34, miter gear carrier 36 and miter gears are herein referred to collectively as the differential 40, which is configured to engage the first axle shaft 18, the second axle shaft 20, and a drive shaft 12 of the vehicle. One or ordinary skill in the art will appreciate that the components of the differential 40, may vary. For example, the gear carrier 36 may have a different shape or configuration, the beveled ring gear 34 may be a spiral beveled ring gear. There may be more or fewer than two miter gears (e.g., there may be four miter gears).

The gearing assembly 14 also includes a plurality of adjustment gears configured to engage the differential 40, configured to be drive by the variable speed motor 24 and configured to controllable alter a rotation of the first axle shaft 18 relative to the second axle shaft 20 based on rotation produced by the variable speed motor 24. The plurality of adjustment gears includes a subassembly of planetary gears 60 including a planetary gear carrier, a first set of planetary gears 61, 62, 63 coupled to the planetary gear carrier, and a second set of planetary gears 64, 65, 66 coupled to the planetary gear carrier. The second set of planetary gears 64, 65, 66 is configured to couple with the first axle shaft 18 of the vehicle. In some embodiments the second set of planetary gears 64, 65, 66 is configured to engage and turn a gear 45 attached to the first axle shaft 18 of the vehicle. In some embodiments, the second set of planetary gears are configured to engage and turn a spur gear 45 or a helical gear attached or coupled to the first axle shaft 18.

In some embodiments, the plurality of adjustment gears also includes a sun gear 42 coupled with or attached to the differential 40 where the sun gear 40 is configured to engage the first set of planetary gears 64, 65, 66 and the plurality of adjustment gears interact with the differential 40 through the sun gear 20. In some embodiments, the sun gear 42 is attached to the gear carrier 36 of the differential. The sun gear 42 is oriented on the primary axis of rotation 35. It will therefore be understood that the sun gear 42 rotates with the beveled ring gear 34 and the gear carrier 36 of the differential 40.

Both axle shafts 18, 20 terminate with beveled drive gears 43, 44. The second axle shaft 20 extends through the beveled ring gear 34, wherein its beveled drive gear 44 intermeshes with the beveled miter gears 38 in the miter gear carrier 36 of the differential 40. Conversely, the first axle shaft 18 extends through the center of the sun gear 42, wherein its beveled drive gear 43 intermeshes with the beveled miter gears 38 in the miter gear carrier 36 of the differential 40.

In some embodiments, the plurality of adjustment gears also includes an internal gear (e.g., stationary internal spur gear 46), that is configured to engage the second set of planetary gears 64, 65, 66. The internal gear is stationary with respect to the variable speed motor. For example, stationary internal spur gear 46 is connected to the differential casing 16 and therefore does not move. In some embodiments, the internal gear is a helical internal gear.

In some embodiments, the plurality of adjustment gears also includes an annular gear 50 or a ring gear that transfers rotations motion from the control shaft 25 driven by the variable speed motor 24 to the first set of planetary gears 61, 62, 63. The annular gear 50 has interior gear teeth 52 that engage the first set of planetary gears 61, 62, 63. The annular gear also has exterior gear teeth 54. In the shown embodiment, the interior of the annular gear 50 is the same size and has the same gearing as does the interior of the internal spur gear 48. However, these dimensions and gearing types can be altered depending upon numerous factors, such as wheel size and vehicle type to optimize performance. The annular gear 50 is positioned around the sun gear 42 of the miter gear carrier 36.

In contrast to embodiments depicted in FIGS. 3A-4C where a differential control pinion gear engages exterior teeth of an externally toothed ring gear, in the embodiment depicted in FIGS. 5A-5C a gear (e.g., worm gear 56) associated with the control shaft 25 engages the exterior gear teeth 54 of the annular gear 50. In embodiments employing a worm gear to engage the annular gear, the worm gear 56 is stationary, being anchored to the differential casing. In some embodiments, the gear associated with the control shaft has a different configuration (e.g., a spur gear or a helical gear). In this first example embodiment, the axis of rotation of the control shaft 25 is oriented roughly parallel to the drive shaft and perpendicular to the axis of rotation 35 of the axle shafts; however, in other embodiments, the axis of rotation of the control shaft 25 may be parallel to the axis of rotation of rotation 35 of the axle shafts or may have a different orientation.

The gear associated with the control shaft 25 (e.g., the worm gear 56) is selectively rotated by the variable speed motor 24. As the worm gear 56 turns, it intermeshes with the exterior gear teeth 54 of the annular gear 50 and causes the annular gear 50 to turn. Because the worm gear 56 can be rotated by the variable speed motor 24 at different speeds, it will be understood that the annular gear 50 can also be selectively rotated at different speeds. In some embodiments, the worm gear 56 prevents the first axle shaft 18 and the second axle shaft 20 from rotating at different rates when the control shaft 25 is not turning.

FIG. 5C in conjunction with FIG. 5B, shows the subassembly 60 of planetary gears. The subassembly 60 includes six planetary gears 61, 62, 63, 64, 65, 66, set into a framework of three pins 67, 68, 69 between two endplates 70, 72. The planetary gears 61, 62, 63, 64, 65, 66 are arranged in two sets of three. The first set of planetary gears 61, 62, 63 orbits the sun gear 42 and joins the sun gear 42 to the interior gear teeth 52 of the annular gear 50. The second set of planetary gears 64, 65, 66 orbits the spur gear 45 on the first axle shaft 18 and joins the spur gear 45 to the internal spur gear 46. The use of six planetary gears 61, 62, 63, 64, 65, 66 is merely exemplary and it will be understood that any number of planetary gears can be used provided the described transfer of mechanical energy between components is achieved. In this third example embodiment, the planetary gear carrier includes the endplates 70, 72 and the pins 67, 68, 69. One of ordinary skill in the art will appreciate that the planetary gear carrier may have a variety of different configurations.

As depicted in FIGS. 5A-5C, the planetary gears 61-66 are not stepped gears. In some embodiments, the planetary gears are stepped planetary gears, as described below with respect to FIGS. 7-15. In some embodiments, the planetary gears in the embodiment of FIGS. 5C-5C are replaced with stepped planetary gears.

When the miter gear carrier 36 within the differential 40 turns, the sun gear 42 also turns. The sun gear 42 turns the first set of planetary gears 61, 62, 63. The orbital movement of the first set of planetary gears 61, 62, 63 is transferred to the second set of planetary gears 64, 65, 66 by the pins 67, 68, 69. The second set of planetary gears 64, 65, 66 turns the spur gear 45 on the first axle shaft 18. The spur gear 45 turns the first axle shaft 18 and any vehicle wheel that is attached to that first axle shaft 18. Consequently, by the various interconnections, the orbital speed of the first set of planetary gears 61, 62, 63 is proportional to the rotational speed of the first axle shaft 18.

The orbital speed of the first set of planetary gears 61, 62, 63 can be selectively adjusted by the gear 56 (e.g., worm gear) connected to by the control shaft 25 variable speed motor 24. As the motor turns the control shaft 25, the gear connected to the control shaft (e.g., worm gear 56) causes the annular gear 50 to rotate. Depending upon its direction of rotation, the rotation of the annular gear 50 will either increase the orbital speed of the first set of planetary gears 61, 62, 63 or decrease the speed of the same. Since the orbital speed of the first set of planetary gears 61, 62, 63 is proportional to the rotational speed of the first axle shaft 18, it will be understood that the turning of the worm gear 56 either increases or decreases the rotational speed of the first axle shaft 18. Accordingly, by operating the variable speed motor 24, the plurality of adjustment gears enable the rotational speed of the first axle shaft 18 to be selectively adjusted (e.g., increased or decreased) relative to the rotational speed of the second axle shaft 20. The plurality of adjustment gears are configured such that a rate of rotation of the annular gear or ring gear 50 is proportional to a desired difference in rotational velocity between the first axle shaft 18 and the second axle shaft 20. Similarly, the rate of rotation output by the variable speed motor is proportional to the resulting difference in rotational velocity between the first axle shaft 18 and the second axle shaft 20. Zero rotation of the annular gear 50 or the ring gear corresponds to no difference in rotational velocity between the first axle shaft 18 and the second axle shaft 20.

The two axle shafts 18 and 20 are coupled together and rotate together equally unless a difference is allowed via the rotation of the worm gear 56. Should the variable speed motor 24 fail, the worm gear 56 would not turn. The differential 40 still operates and the two axle shafts 18, 20 remain free to rotate together at a common rate of rotation. In some embodiments, the gearing assembly 14 does not rely on friction when altering or maintaining a rotation rate of the first axle shaft 18 relative to the second axle shaft 20.

FIGS. 6A-6D depict a gearing assembly 14''' of a fourth example embodiment. The gearing assembly 14''' of FIGS. 6A-6D includes many components that are the same as or similar to the components described above in relation to FIGS. 5A-5C, and therefore, uses many of the same reference numbers. Most of the description above with respect to the third example embodiment depicted in FIGS. 5A-5C is applicable to the fourth example embodiment. Some differences between the embodiments are described below.

Instead of employing a worm gear connected with the control shaft 25 that engages an annular gear 50, the gearing assembly 14''' employs a spur gear 57 connected to the control shaft 25 that engages an annular gear 50. Also, in the fourth example embodiment of the gearing assembly 14''', the axis of rotation of the control shaft 25 is parallel to the axis of rotation 35 of the first axle shaft 18 and the second axle shaft 20. Further, the control shaft 25 is shorter and the variable speed motor 24 is closer to the gearing assembly 14'''. This arrangement of the control shaft 25 axis of rotation being parallel to the axis of rotation 35 of the first and second axel shafts 18, 20 and the control shaft being coupled to a spur gear 57 (instead of a worm gear) that engages the annular gear 50 is generally more compact and lighter weight than the arrangement of the corresponding components in the third example embodiment. Additionally, this arrangement in the fourth example embodiment of the gearing assembly 14''' is better able to accommodate a wider range of allowable differential rates because forces that resist implementing the calculated desired rate are not blocked by the one-way nature of the worm gear. Instead, the spur gear 57 communicates these forces through the control shaft 25 to the variable speed motor, where they may be allowed by the control algorithm to change the rotation rate of the variable speed motor if they fall within the allowable range, or resisted by the motor if they exceed the allowable range.

In the fourth example embodiment of the gearing assembly 14''', the teeth of many of the gears have a different configuration than those of the corresponding elements in the first example embodiment. For example, in the second example embodiment the teeth of the stationary internal gear 46 are helical. The interior gear teeth 52 of the annular gear 50 or ring gear are also helical in gearing assembly 14'''. In the third example embodiment, the gear 45 attached to the first axle shaft 18 is a spur gear; however, in the fourth example embodiment the gear is a helical spur gear 45. In the third example embodiment, the planetary gears 61, 62, 63, 64, 65, 66 are each spur gears. In gearing assembly 14''', the planetary gears 61, 62, 63, 64, 65, 66 are each helical spur gears. In gearing assembly 14''' the sun gear 42 has helical teeth. The use of helical teeth for these gears may be advantageous because, generally, helical gears are quieter and may carry more load than straight cut gears.

The arrangement of the first set of planetary gears 61, 62, 63 and the second set of planetary gears 64, 65, 66 with respect to the gear carrier 71 is different in the fourth example embodiment than in the third example embodiment. For example, in the third example embodiment, the gear carrier for the planetary gears includes two endplates 70 with all the planetary gears between them. In the fourth example embodiment, the gear carrier 71 separates the first set of planetary gears 61, 62, 63 from the second set of planetary gears 64, 65, 66.

In the fourth example embodiment, gear carrier 36 of the differential 40 has a different shape than that of the miter gear carrier 36 in the second example embodiment. Also the differential includes four miter gears 38 in the fourth example embodiment of the gearing assembly 14', as opposed to two miter gears in the third example embodiment.

In some embodiments, the plurality of adjustment gears includes subassembly of planetary gears 60 including planetary gear carrier (e.g., endplate 72, endplate 70 and pins 67, 68, 69), a first set of planetary gears 61, 62, 63 coupled to the planetary gear carrier, and a second set of planetary gears 64, 65, 66 coupled to the planetary gear carrier. The second set of planetary gears 64, 65, 66, which are on the same carrier as the first set of planetary gears 61, 62, 63, couples the first set of planetary gears 61, 62, 63 with the first axle shaft 18. For example, in some embodiments, the second set of planetary gears 64, 65, 66, turn a spur gear 45 attached to the first axle shaft 18. The orbital speed of the first set of planetary gears 61, 62, 63 is proportional to the rotational speed of the first axis 18. The orbital speed of the first set of planetary gears 61, 62, 63 can be selectively adjusted using the variable speed motor 24, thereby selectively adjusting the rotational speed of the first axle shaft 18. For example, in some embodiments, the variable speed motor 24 turns a worm gear 56 that engages exterior gear teeth 54 of an annular gear 50, whose interior gear teeth 52 engage the first set of planetary gears 61, 62, 63. In some embodiments, the plurality of adjustment gears includes the annular gear 50. One of the benefits of connecting the motor 24 to the annular gear 50 is that the annular gear 50 is disposed outward of the subassembly of planetary gears 60 making it easy to connect the annular gear 50 to shaft rotated by the motor 24.

In some embodiments, the rate of rotation of the motor 24 is proportional to the desired difference in rotational velocity between the first axle shaft 18 and the second axle shaft 20. In embodiments employing an annular gear 50 to transfer rotational motion from the motor to the first set of planetary gears 61, 62, 63, the rate of rotation of the annular gear 50 is also proportional to the desired difference in rotational speed between the first axle shaft 18 and the second axle shaft 20. Thus, when there is no desired difference in the rotational speed between the first axle shaft 18 and the second axle shaft 20, there is no rotation of the annular gear 50. During straight line travel when there is no desired difference in the rotational speed between the first axle shaft 18 and the second axle shaft 20, the annular gear 50, the first set of planetary gears 61, 62, 63 and the second set of planetary gears 64, 65, 66, all turn at a fraction of the rotational speed of the second axle shaft 20. Because an annular gear 50 would have a relatively high inertia, it is particularly beneficial that annular gear 50 only rotates when a difference in rotational speed between the axles is required, and when a difference in rotational speed is required, the rotational speed of the annular gear 50 is much smaller than that of either axle. If instead the annular gear were required to rotate faster than the second axle shaft, the system would experience significant drag from the annular gear.

In some embodiments, the plurality of adjustment gears interact with the differential 40 through a sun gear 42 that engages and drives the first set of planetary gears 61, 62, 63. Embodiments employing a sun gear 42 to engage and drive the first set of planetary gears 61, 62, 63 may have relatively little parasitic drag because the sun gear 42 is relatively small and the easiest gear to turn of all of the gears in the planetary gear subassembly.

In some embodiments, the plurality of adjustment gears includes the annular gear 60, the first set of planetary gears 61, 62, 63, the second set of planetary gears 64, 65, 66, the planetary gear carrier (e.g., endplate 72, endplate 70 and pins 67, 68, 69 or planetary gear carrier 71), the sun gear 42, which is coupled to the differential 40, and the spur gear 45.

As described above, the subassembly of planetary gears, which includes a first set of planetary gears and a second set of planetary gears on a common carrier, and the annular gear in which the subassembly of planetary gears is disposed enable control of a difference in rotational speed between the first axle shaft and the second axle shaft using a variable speed motor with relatively little added drag and with relatively little resistance to changes in rotational velocity.

Either gearing assembly 14" or gearing assembly 14"" can incorporate stepped adjustment gears 15a, 15b that aid in adjusting differential rates, as explained below with respect to FIGS. 7-15. In some embodiments, the planetary gears in the embodiment of FIGS. 6A-6D are replaced with stepped planetary gears.

Some embodiments provide a gearing reduction to aid in adjusting the differential rates. In some embodiments, this gearing reduction can be provided within the set of adjustment gears 15, 15a and 15b. In some embodiments, this gearing reduction can be provided in the interface with the steering control pinion gear 33. In some embodiments, this gearing reduction can be provided both within the set of adjustment gears 15a, 15b and in the interface with the steering control pinion gear 33.

A gearing reduction in the differential control adjustment gears is beneficial in some embodiments because it provides increased torque to control differential rates for a given variable speed motor size. This is particularly beneficial for some embodiments employed in differentially steered vehicles, which often require the variable speed motor to overcome the inertia of the vehicle to force the desired turn. Another advantage of such a gearing reduction in some embodiments is that it increases the resistance of the system to external forces acting in opposition of the desired differential rate. The greater the reduction ratio, the easier it will be for a given variable speed motor to resist shocks or other traction conditions that disturb the desired differential rate.

Figure 7:
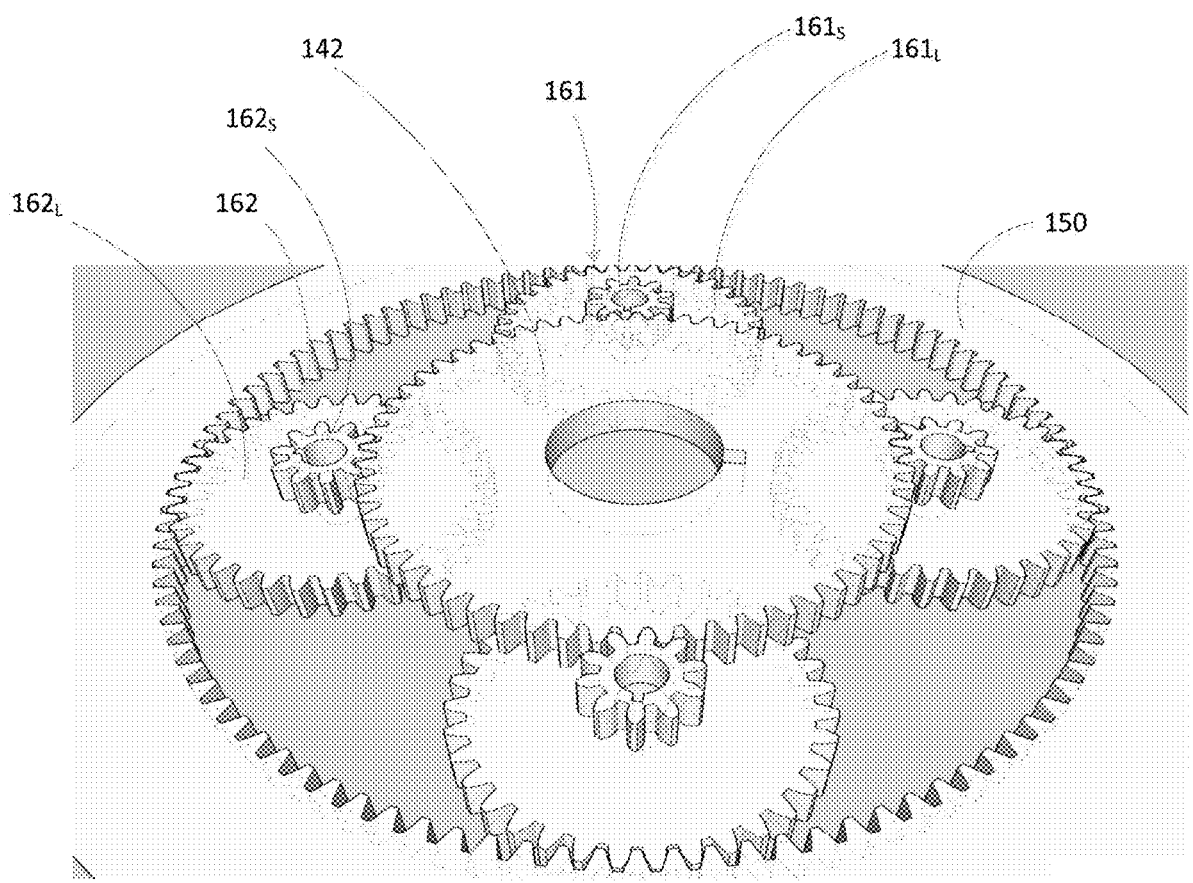
FIG. 7 is a perspective view of stepped planetary gears that are employed in some embodiments of the gearing assembly.

In some embodiments that provide a reduction within the set of adjustment gears 15a and 15b, at least some or all of the planetary gears (e.g., 61, 62, 63, 64, 65, 66 and 61a, 62a, 63a, 64a, 65a, 66a, 61b, 62b, 63b, 64b, 65b, 66b) are stepped planetary gears, each including a larger diameter gear or gear portion and a smaller diameter gear or gear portion, which are coaxial with each other and affixed to each other or integral with each other so as to rotate together as a single stepped planetary gear. As used herein, a larger diameter portion of a stepped planetary gear and a smaller diameter portion of a stepped planetary gear can refer to different portions of a single integral stepped planetary gear or different diameter gears that are attached to each other to form different portions of a single stepped planetary gear. For example, FIG. 7 depicts a perspective view of example stepped planetary gears 161, 162, 163, 164 which each include a larger diameter portion $161_L$, $162_L$ and a smaller diameter portion $161_S$, $162_S$. For simplicity, FIG. 7 shows a single set of stepped planetary gears 161, 162, 163, 164 that each engages both an outer ring gear 150 and an inner sun gear 142; however, in use, two sets of stepped planetary gears will be employed, which are both attached to the same carrier. In some embodiments employing stepped planetary gears, each larger diameter portion meshes with the internal teeth of its respective ring gear or internal gear (e.g., 50, 50a, 50b, 46, 46a, 46bb). For example, FIG. 7 depicts larger diameter portions $161_L$, $162_L$ meshing with internal teeth of a ring gear 150. In some embodiments employing stepped planetary gears, each smaller diameter portion meshes with its respective sun gear (e.g., 42, 42a, 42b, 45, 45a, 45b). For example, FIG. 7 depicts smaller diameter portions $161_S$, 162 meshing with teeth of sun gear 142. This achieves a gearing reduction between input ring gear 150 and sun gear 142. Similarly, stepped gears can be used to achieve a gearing reduction between internal gear (e.g., 50, 50a, 50b) and the output sun gear (e.g. 45, 45a, 45b). A larger "step" difference between the diameters of the larger and smaller diameter planetary gears or gear portions corresponds to a larger gearing reduction. In some embodiments, the ratio of the diameter of the smaller diameter portion to the diameter of the larger diameter portion for the stepped planetary gears falls in a range of 1:1.1 to 1:4.0. In other embodiments, the ratio falls outside of this range.

In FIG. 7, various elements (e.g., additional structure of ring gear 150, gear carrier, etc.) are omitted for clarity. Further, in FIG. 7, the relative differences in diameter in the smaller diameter portion and the larger diameter portion are not to scale. In some embodiments, the stepped planetary gears are helical. In FIG. 7, four stepped planetary gears are depicted, however, more or fewer than four stepped planetary gears may be employed in some embodiments.

Figure 8:
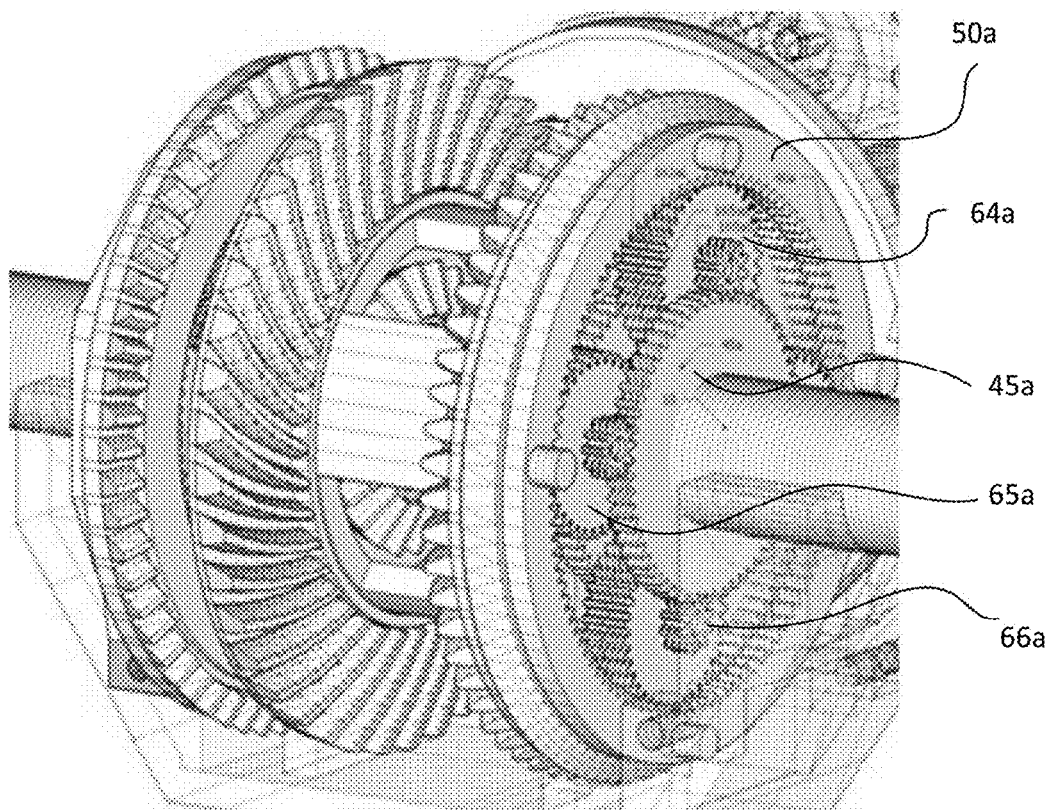
FIG. 8 is perspective view of a regenerative gearing assembly having nested drive and control shafts and including stepped planetary gears in accordance with some embodiments.

FIG. 8 depicts portions of a gearing assembly that includes stepped planetary gears 64a, 65a, 66a in accordance with some embodiments. A larger diameter portion of each stepped planetary gear 64a, 65a, 66a intermeshes with internal teeth of the externally toothed ring gear 50a and a smaller diameter portion of each stepped planetary gear 64a, 65a, 66a intermeshes with a first axle sun gear 45a.

Figure 9A:
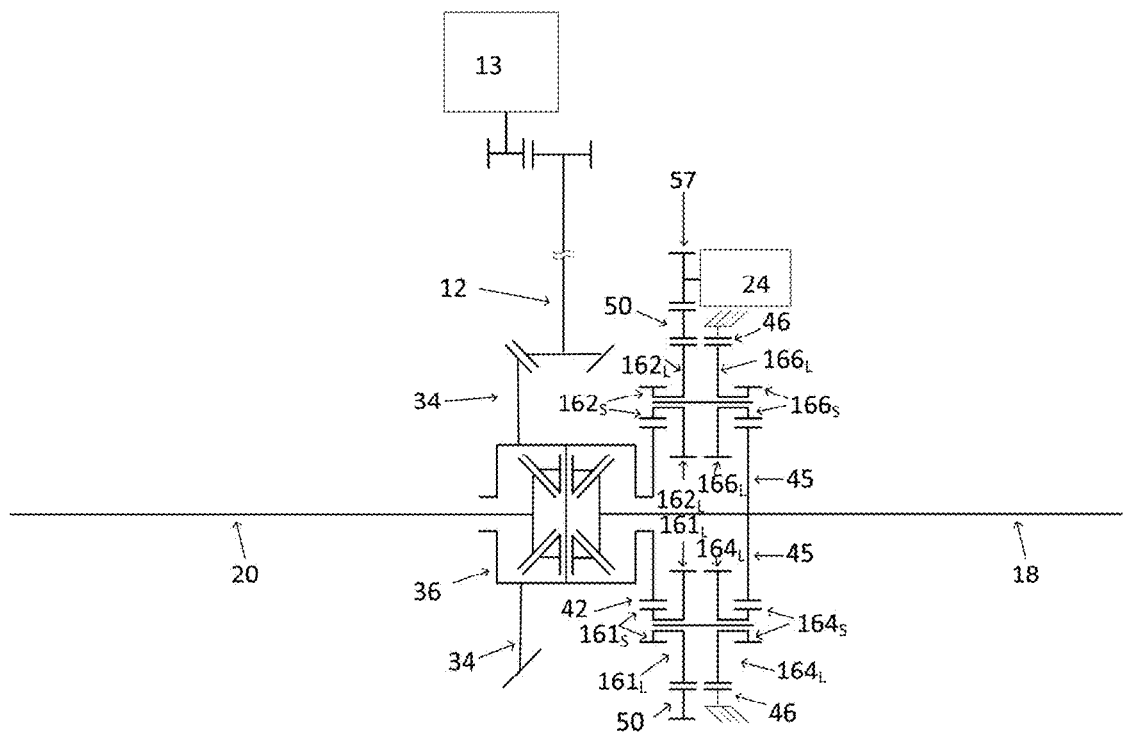
FIG. 9A is a schematic gearing diagram for an embodiments similar to that depicted in FIGS. 6A-6D with planetary gears replaced by stepped planetary gears in accordance with some embodiments.

FIG. 9A schematically depicts a gearing diagram for an embodiment similar to that depicted in FIGS. 6A-6D, in which spur gear 57 engages annular gear 50, except that planetary gears 61, 62, 64, 66 are replaced by stepped planetary gears. As shown, stepped planetary gears that replace planetary gears 61 and 62 each include a smaller diameter portion $161_S$, $162_S$ that meshes with teeth of the sun gear 42, which is attached to or integral with the housing 36, and also include a larger diameter portion 161$_L$, 162$_L$ that meshes with internal teeth of externally toothed ring gear 50. Similarly, stepped planetary gears that replace planetary gears 64 and 66 each include a smaller diameter portion 164$_S$, 166$_S$ that meshes with teeth of the sun gear 45, which is attached to, coupled to, or integral with axle shaft 18, and a larger diameter portion 164$_L$, 166$_L$ that meshes with internal gear 46.

Figure 9B:
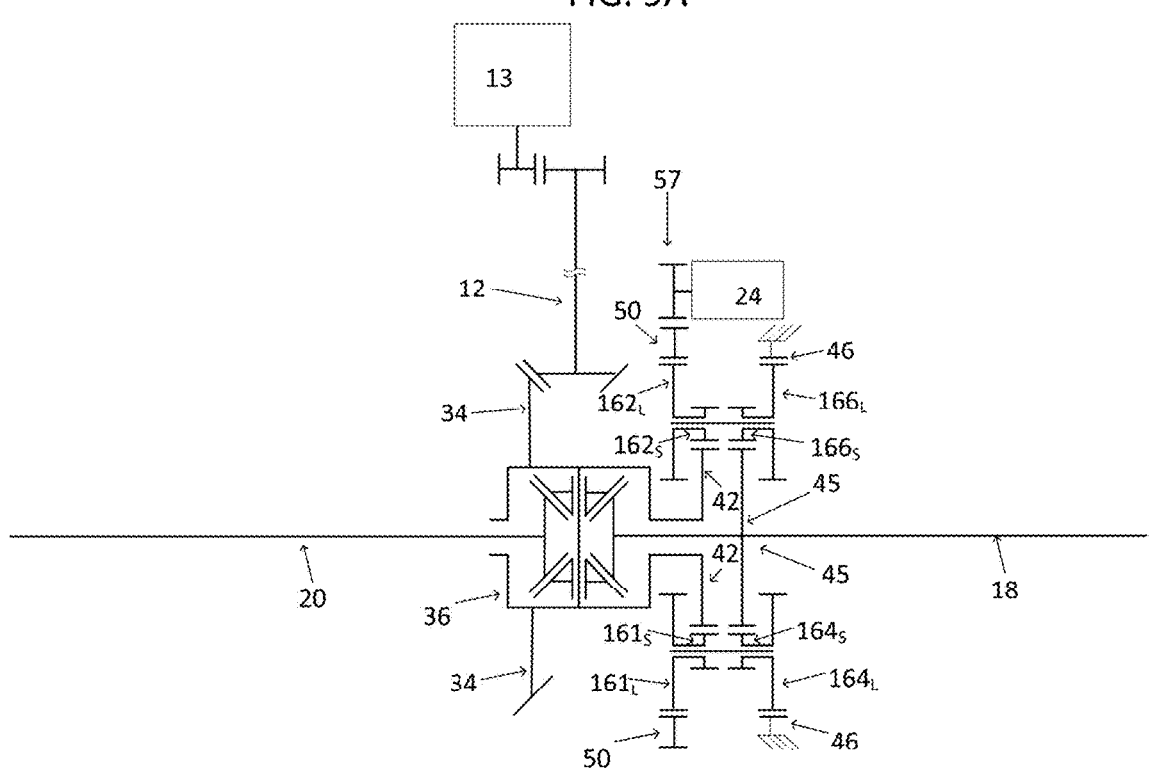
FIG. 9B is a schematic gearing diagram for an embodiment similar to that depicted in FIG. 9A except that the orientation of the stepped planetary gears has been reverse in accordance with some embodiments.

In some embodiments, the orientation of some or all of the sets of stepped planetary gears may be reversed as desired to accommodate different layouts and different torque loads for different applications. FIG. 9B schematically depicts a gearing diagram similar to that of FIG. 9A, except that the orientation of the stepped planetary gears has been reversed. Specifically, in FIG. 9A, the stepped planetary gear larger diameter portions 161$_L$, 162$_L$ for are further out along axle shaft 18 and further from a central portion of the differential carrier housing 36 than the stepped planetary gear smaller diameter portions 161$_S$, 162$_S$ for the first set of stepped planetary gears. In contrast, in FIG. 9B, the stepped planetary gear smaller diameter portions 161$_S$, 162$_S$ are further out along axle shaft 18 and further from the central portion of the differential carrier housing 36 than the stepped planetary gear larger diameter portions 161$_L$, 162$_L$ for the first set of stepped planetary gears.

In FIG. 9A the stepped planetary gear smaller diameter portions 164$_S$, 166$_S$ are further out along axle shaft 18 and further from the central portion of the differential carrier housing 36 than the stepped planetary gear larger diameter portions 164$_L$, 166$_L$ for the second set of stepped planetary gears. In contrast, in FIG. 9B, the stepped planetary gear larger diameter portions 164$_L$, 166$_L$ are further out along axle shaft 18 and further from the central portion of the differential carrier housing 36 than the stepped planetary gear smaller diameter portions 164$_S$, 166$_S$ for the second set of stepped planetary gears.

In other embodiments, the stepped planetary gear larger diameter portions may be further out along the axle shaft and further from the central portion of the differential carrier housing 36 than the stepped planetary gear smaller diameter portions for both the first set of stepped planetary gears and the second set of stepped planetary gears.

In other embodiments, the stepped planetary gear smaller diameter portions may be further out along the axle shaft and further from the central portion of the differential carrier housing 36 than the stepped planetary gear larger diameter portions for both the first set of stepped planetary gears and the second set of stepped planetary gears.

Figure 10:
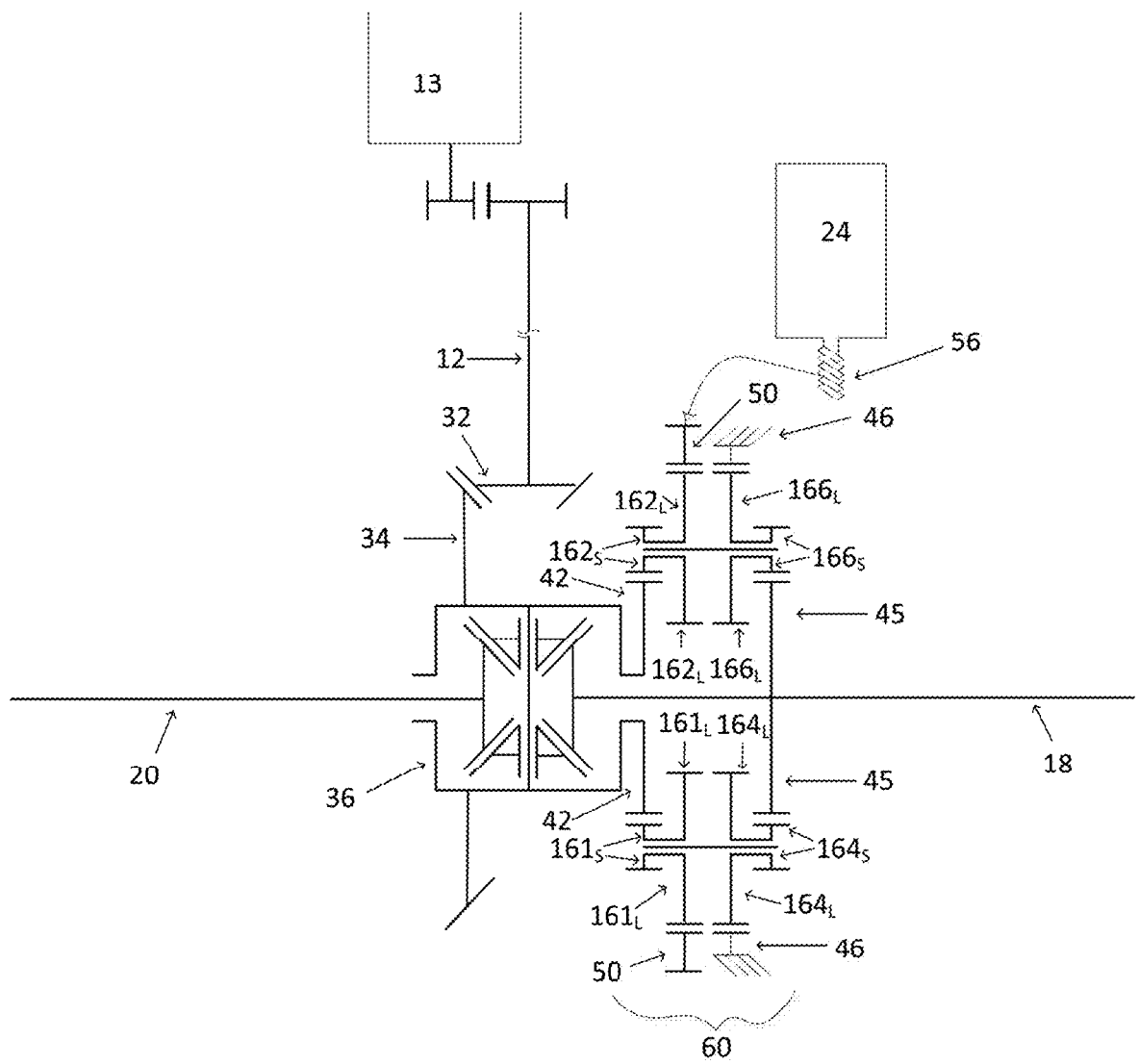
FIG. 10 is a schematic gearing diagram for an embodiment similar to that depicted in FIGS. 5A-5C with the planetary gears replaced by stepped planetary gears in accordance with some embodiments.

FIG. 10 schematically depicts a gearing diagram for an embodiment similar to that depicted in FIGS. 5A-5C, in which worm gear 35 engages annular gear 50, except that planetary gears 61, 62, 64, 66 are replaced by stepped planetary gears. As shown, stepped planetary gears that replace planetary gears 61 and 62 each include a smaller diameter portion 161$_S$, 162$_S$ that meshes with teeth of the sun gear 42, which is attached to, coupled to, or integral with the housing 36, and also include a larger diameter portion 161$_L$, 162$_L$ that meshes with internal teeth of externally toothed ring gear 50. Similarly, stepped planetary gears that replace planetary gears 64 and 66 each include a smaller diameter portion 164$_S$, 166$_S$ that meshes with teeth of the sun gear 45, which is attached to or integral with axle shaft 18, and a larger diameter portion 164$_L$, 166$_L$ that meshes with internal gear 46.

Figure 11:
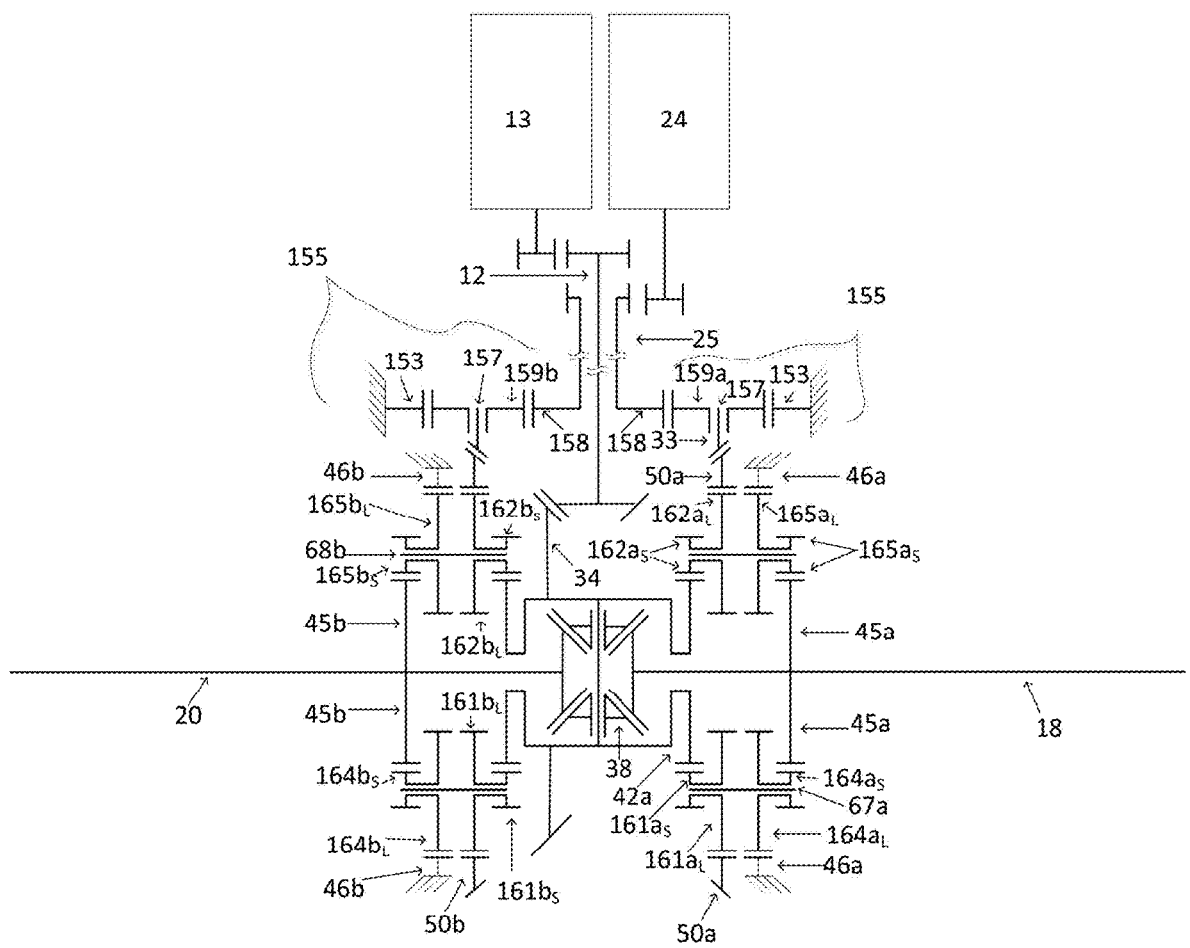
FIG. 11 is a schematic gearing diagram for an embodiment similar to that depicted in FIGS. 3A-3D with the planetary gears replaced by stepped planetary gears and including a gearing reduction assembly between the motor and the steering control pinion gear in accordance with some embodiments.

FIG. 11 schematically depicts a gearing diagram for an embodiment similar to that depicted in FIGS. 3A-3D, except that planetary gears 61a, 62a, 64a, 65a, 61b, 62b, 64b, 65b are replaced by stepped planetary gears each including a smaller diameter portion 161a$_S$, 162a$_S$, 164a$_S$, 165a$_S$, 161b$_S$, 162b$_S$, 164b$_S$, 165b$_S$ and a larger diameter portion 161a$_L$, 162a$_L$, 164a$_L$, 165a$_L$, 161b$_L$, 162b$_L$, 164b$_L$, 165b$_L$. The embodiment of FIG. 11 also provides a gearing reduction between the motor 24 and the steering control pinion gear 33 in the form of a gearing reduction assembly.

In some embodiments, the gearing reduction assembly includes a planetary reduction gear assembly 155 including a planetary reduction carrier 157 that is coupled with, attached to or integral with the steering control pinion gear 33. The planetary reduction gear assembly 155 also includes a planetary reduction sun gear 158, a plurality of planetary gears (e.g., 159a, 159b) and a planetary reduction internally toothed ring gear 153. Steering control shaft 25 turns the planetary reduction sun gear 158 that sets in orbit the plurality of planet gears 159a. The internally toothed ring gear 153 of this planetary reduction gear assembly is stationary with respect to the outer case of the differential 16. A gearing reduction is therefore achieved between the input planetary reduction sun gear 158 and the output planetary reduction carrier 157 that is attached to, coupled to, or integral with the steering control pinion gear 33.

Figure 12:
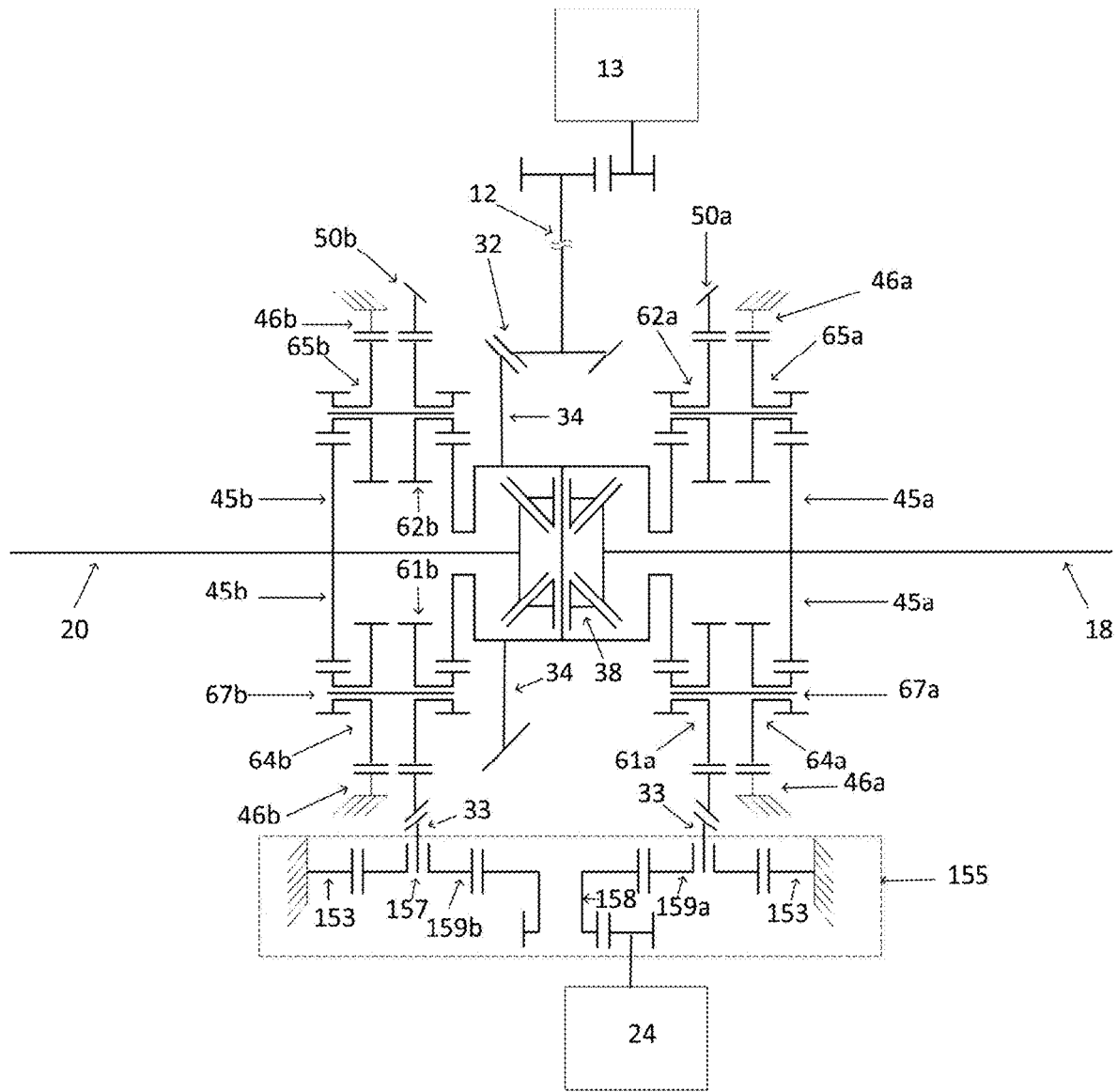
FIG. 12 is a schematic gearing diagram for an embodiment similar to that depicted in FIGS. 4A-4C with the planetary gears replaced by stepped planetary gears and including a planetary reduction gear assembly coupled with, attached to or integral with the steering control pinion gear in accordance with some embodiments.

FIG. 12 schematically depicts a gearing diagram for an embodiment similar to that depicted in FIGS. 4A-4C, except that planetary gears 61a, 62a, 64a, 65a, 61b, 62b, 64b, 65b are replaced by stepped planetary gears 161a, 162a, 164a, 165a, 166a, 162b, 164b, 165b each including a smaller diameter gear or gear portion and a larger diameter gear or gear portion. In FIG. 12, the stepped planetary gears are labeled, but the larger diameter portions and the smaller portion are not individually labeled. See FIG. 11 for individual labeling of the larger diameter and smaller diameter portions for the stepped planetary gears.

The embodiment of FIG. 12 provides a gearing reduction between the motor 24 and the steering control pinion gear 33 through a planetary reduction gear assembly 155 including a planetary reduction carrier 157 that is coupled with, attached to or integral with the steering control pinion gear 33. The planetary reduction gear assembly 155 includes a planetary reduction sun gear 158, a plurality of planetary gears (e.g., 159a, 159b), and a planetary reduction internally toothed ring gear 153. Steering control shaft 25 turns the planetary reduction sun gear 158 that sets in orbit the plurality of planet gears 159a, 159b. Internally toothed ring gear 153 of this planetary reduction gear assembly is stationary with respect to the outer case of the differential 16. A gearing reduction is therefore achieved between the input planetary reduction sun gear 158 and the output planetary reduction carrier 157 that is attached to, coupled to, or integral with the steering control pinion gear 33.

Figure 13:
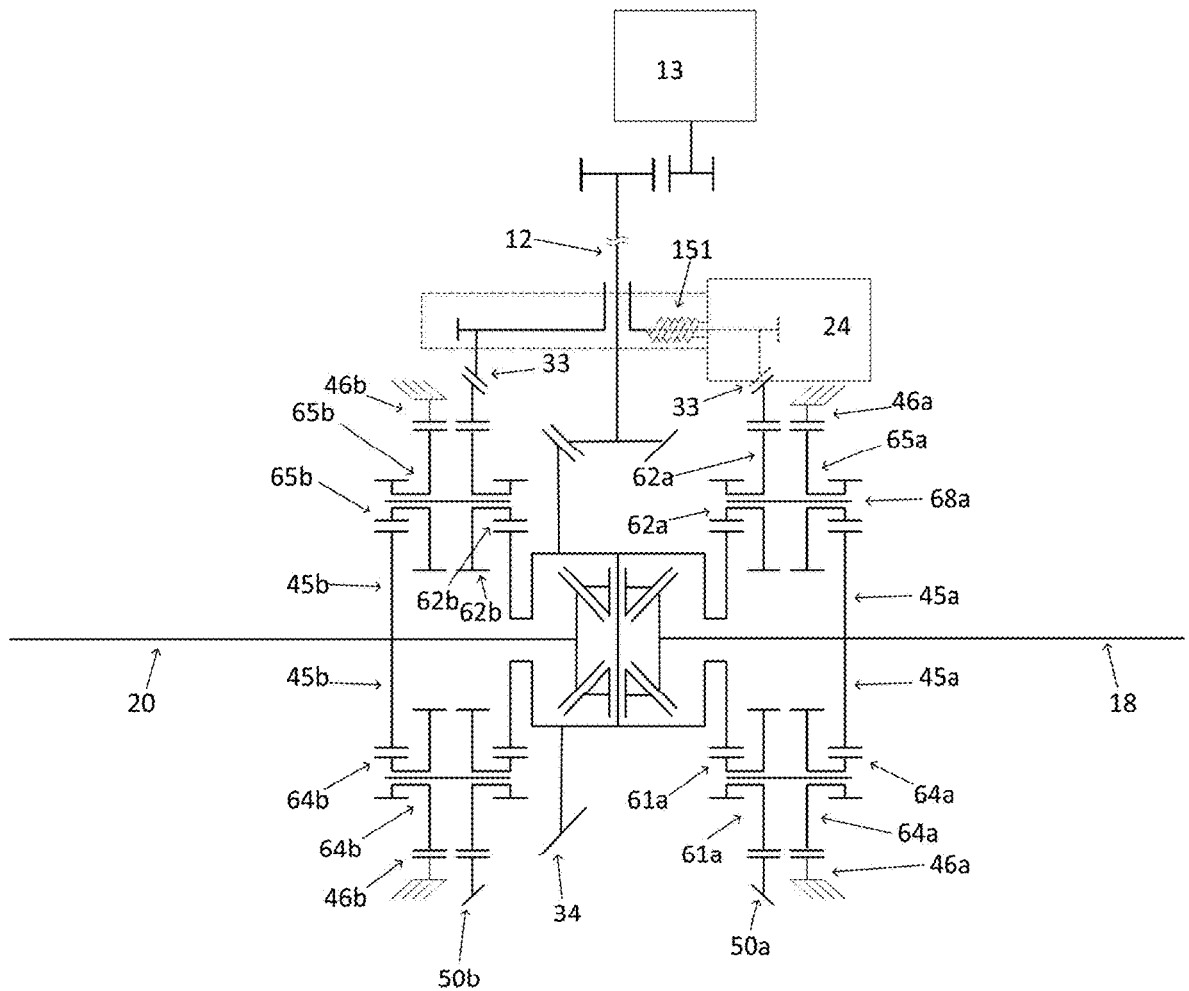
FIG. 13 is a schematic gearing diagram for an embodiment similar to that depicted in FIGS. 3A-3C with the planetary gears replaced by stepped planetary gears and including a gearing reduction assembly between the motor and the steering control pinion gear that includes a worm screw gear and a worm wheel accordance with some embodiments.

FIG. 13 schematically depicts a gearing diagram for an embodiment similar to that depicted in FIGS. 3A-3C, except that planetary gears 61a, 62a, 64a, 65a, 61b, 62b, 64b, 65b are replaced by stepped planetary gears 161a, 162a, 164a, 165a, 166, 162b, 164b, 165b each including a smaller diameter portion and a larger diameter portion, and a gearing reduction assembly 151 between the motor 24 and the steering control pinion gear 33 that includes a worm screw gear 156 and a worm wheel 173. The worm wheel 173 is coupled to, attached to, or integral with the steering control pinion gear 33. The motor 24 drives the worm screw gear 145, which, in turn drives the worm wheel 173 and the steering control pinion gear 33.

Figure 14:
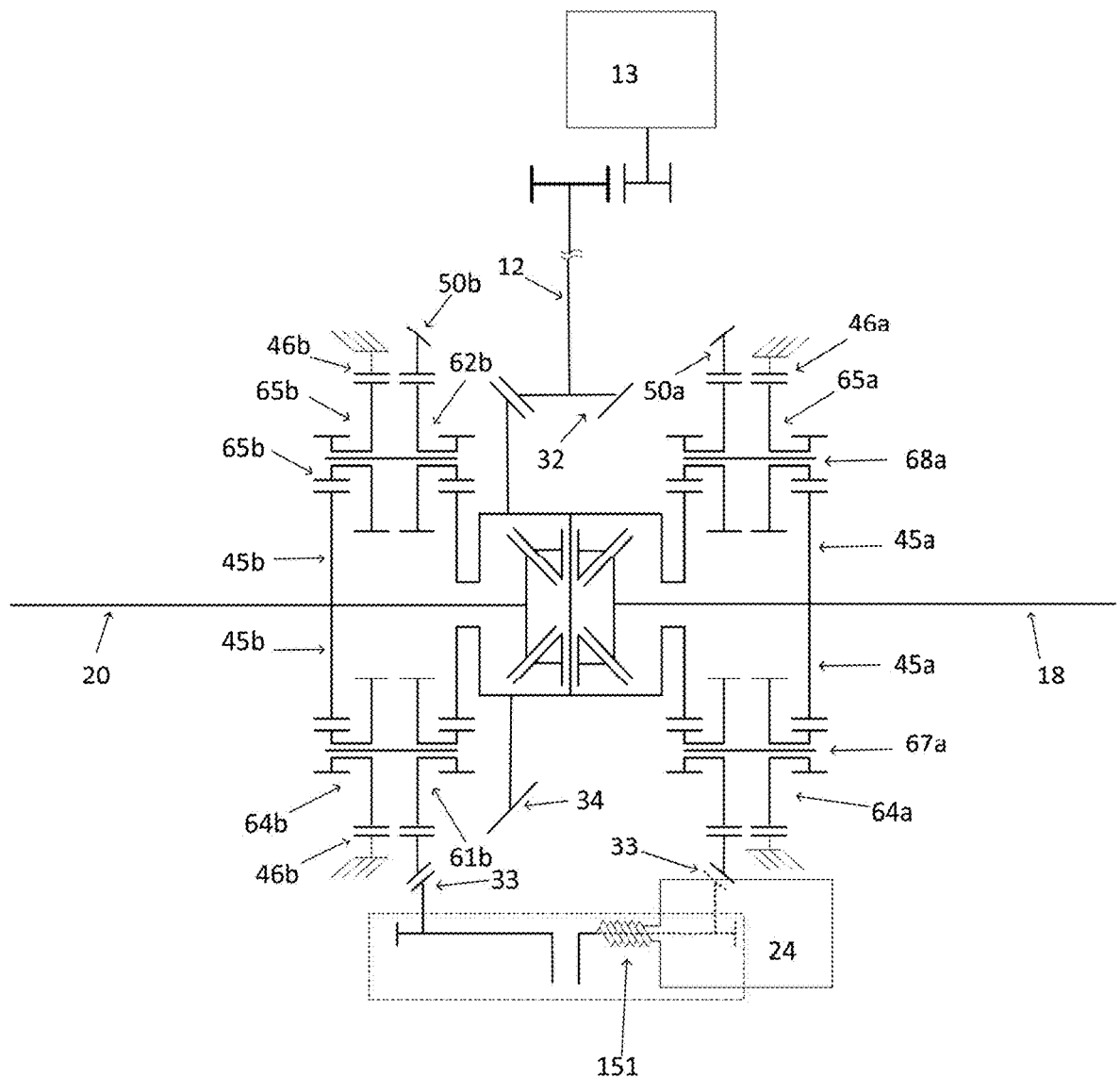
FIG. 14 is a schematic gearing diagram for an embodiment similar to that depicted in FIGS. 4A-4D with the planetary gears replaced by stepped planetary gears and including a gearing reduction assembly between the motor and the steering control pinion gear that includes a worm screw gear and a worm wheel accordance with some embodiments.

FIG. 14 schematically depicts a gearing diagram for an embodiment similar to that depicted in FIGS. 4A-4C, except that planetary gears 61a, 62a, 64a, 65a, 61b, 62b, 64b, 65b are replaced by stepped planetary gears 161a, 162a, 164a, 165a, 166, 162b, 164b, 165b each including a smaller diameter portion and a larger diameter portion, and a gearing reduction gearing reduction assembly 151 between the motor 24 and the steering control pinion gear 33 that includes a worm screw gear 156 and a worm wheel 173.

An overall gearing reduction ratio for a given size of compound planetary gears may be calculated as follows:

Assume all gears are the same module (e.g., the teeth on all the gears are the same size and have the same profile); where $T_s$ is the number of teeth on the sun gear; $T_r$ is the number of teeth on the ring gear, $T_{ps}$ is the number of teeth on the smaller diameter planetary gear (or planetary gear portion) of the compound planetary gear; $T_{pb}$ is the number of teeth on the larger diameter planet gear (or planetary gear portion) of the compound planetary gear 1. Calculate the reduction ratio of the inner planetary set, assuming a stationary sun.

In this case, the "input" is the Ring Gear, and "output" is the Planetary Carrier.

Let $R_s$ be the rotational speed of the ring gear.

1.1) The constraint ratio of the ring to the larger diameter planetary gears or planetary gear portions (with which the ring meshes) is $T_r/T_{pb}$ 1.2) The constraint ratio of the smaller diameter planetary gears or planetary gear portions to the sun gear (with which $T_{ps}$ meshes) is $T_{ps}/T_s$ 1.3) The ratio of the ring gear to the carrier (RC_ratio) is, therefore, the product of the two above constraints, or RC_ratio=$(T_r/T_{pb})*(T_{ps}/T_s)$ 1.4) The difference in rotational speeds between the ring gear and carrier (ΔRC) is calculated as ΔRC=$R_s$/(1+RC_ratio)

1.5) The carrier speed $C_s$ for a given ring speed is $C_s=R_s-\Delta RC$ 1.6) The reduction ratio of the inner planetary set is the ratio between $R_s$ and $C_s$, or Inner_ratio=$R_s/C_s$ 2. Calculate the reduction ratio of the outer planetary set, assuming a stationary ring.

In this case, the "input" is the Planetary Carrier, and "output" is the Sun Gear.

Let Cs=the rotational speed of the carrier (from step 1.5 above)

2.1) The constraint ratio of the sun to the smaller diameter planetary gears (or planetary gear portions) (with which the sun meshes) is $T_s/T_{ps}$ 2.2) The constraint ratio of the larger diameter planetary gears (or planetary gear portions) to the ring gear (with which $T_{pb}$ meshes) is $T_{pb}/T_r$ 2.3) The ratio of the carrier to the sun gear (CS_ratio) is, therefore, the product of the two above constraints, or CS_ratio=$(T_s/T_{pb})*(T_{pb}/T_r)$ 2.4) The difference in rotational speeds between the carrier and sun gear ΔCS is calculated as ΔCS=$C_s$/(CS_ratio)

2.5) The sun gear speed $S_s$ for a given ring speed is $S_s=Cs+\Delta CS$ 2.6) The reduction ratio of the outer planetary set is the ratio between $C_s$ and $S_s$, or Outer_ratio=$C_s/S_s$ Multiplying the inner and outer ratios yields the overall gearing reduction ratio for the compound planetary assemblies, Overall_Ratio=Inner_ratio*Outer_ratio.

FIG. 15 shows example calculations of a gear reduction ratio for adjustment gears in a simple planetary configuration and for a compound (stepped) planetary configuration, in which a larger diameter planetary gear portion meshes with a ring gear and a smaller diameter planetary gear portion meshes with a sun gear. As shown in the FIG. 15, in one embodiment, employing a compound planetary configuration with stepped planetary gears increases the gearing ratio from 0.571 to 2.00.

Figure 16A:
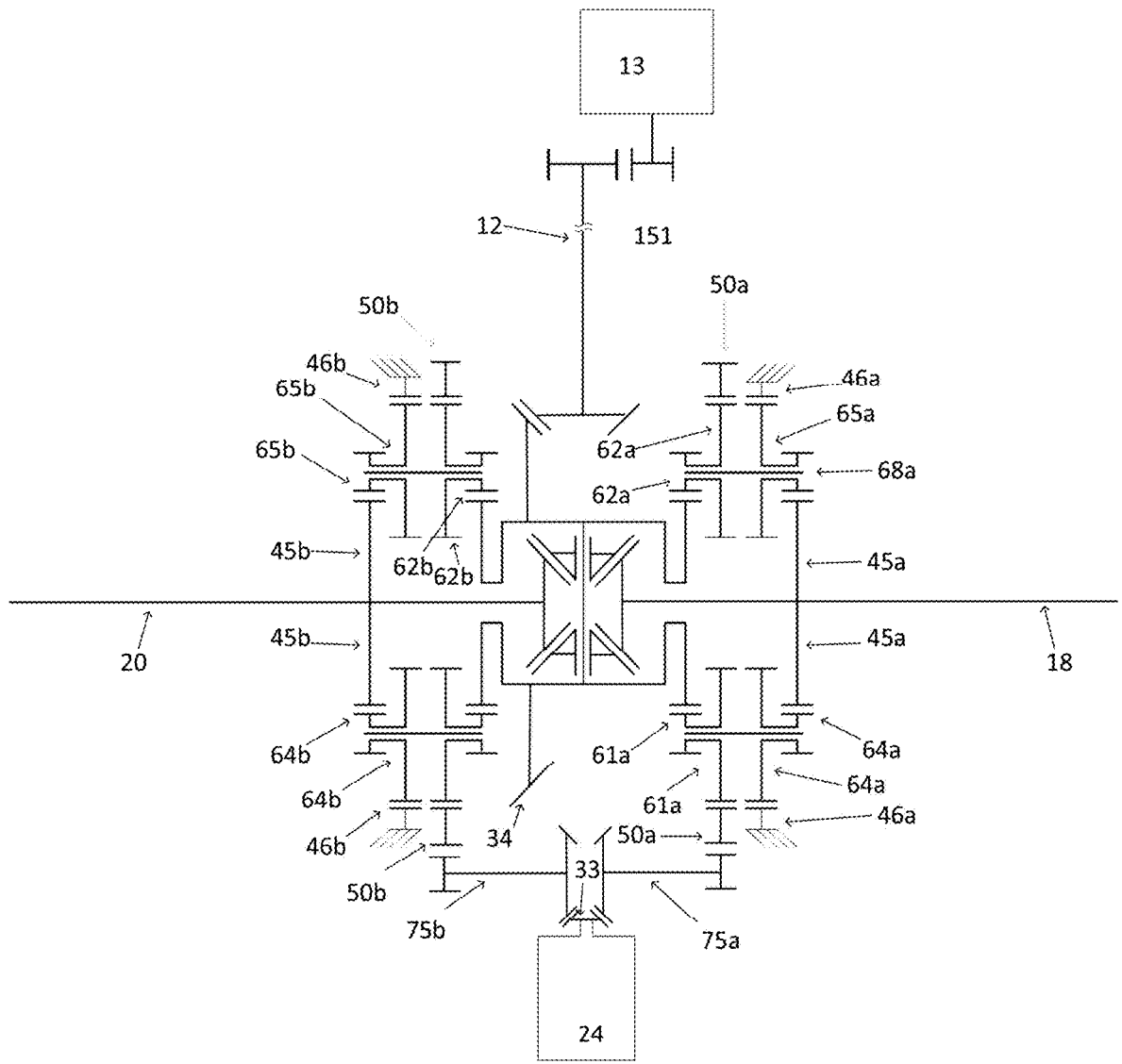
FIG. 16A is a schematic gearing diagram for an embodiment similar to that depicted in FIGS. 4A-4C with the planetary gears replaced by stepped planetary gears and with bevel gears and extension shafts connecting the pinion gear of the variable speed reversible motor to the externally toothed ring gears in accordance with some embodiments.
Figure 16B:
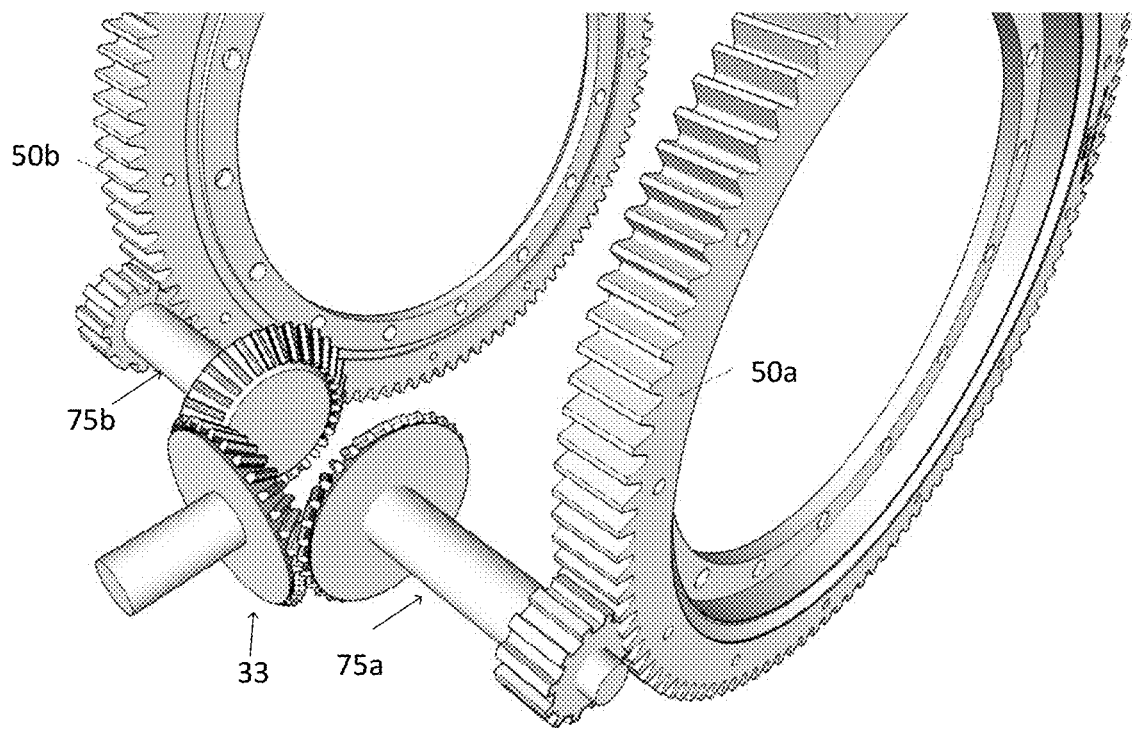
FIG. 16B is a perspective view of the interaction of the bevel gears and extension shafts with the pinion gear of the variable speed reversible motor and with the respective externally toothed ring gears for the embodiment depicted in FIG. 16A.

FIG. 16A schematically depicts a gearing diagram for an embodiment similar to that depicted in FIGS. 4A-4C, except that planetary gears 61a, 62a, 64a, 65a, 61b, 62b, 64b, 65b are replaced by stepped planetary gears 161a, 162a, 164a, 165a, 166, 162b, 164b, 165b each including a smaller diameter portion and a larger diameter portion, and with bevel gears and extension shafts connecting the differential control pinion gear 33 with the externally toothed ring gears 50a, 50b. Specifically, a first extension shaft 75a includes a bevel gear that intermeshes with the bevel differential control pinion gear 33 and includes a spur gear or helical gear that intermeshes with the first externally toothed ring gear 50a. A second extension shaft 75b includes a bevel gear that intermeshes with bevel differential control pinion gear 33 and includes a spur gear or helical gear that intermeshes with the second externally toothed ring gear 50b as depicted in FIG. 16B.

Figure 17A:
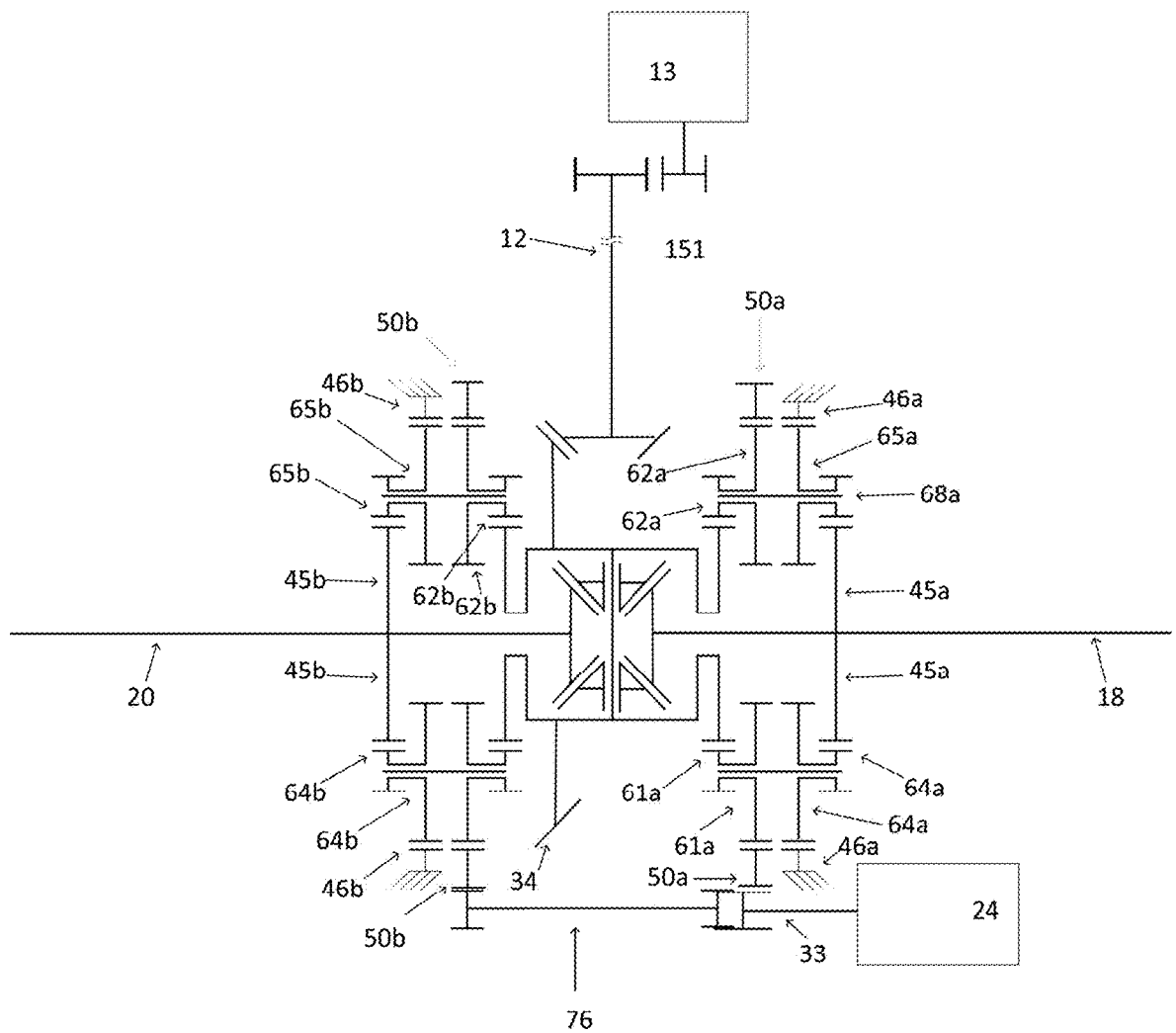
FIG. 17A is a schematic gearing diagram for an embodiment similar to that depicted in FIGS. 4A-4C with the planetary gears replaced by stepped planetary gears and with the pinion gear of the variable speed reversible motor meshing directly with one of the externally toothed ring gears and interacting with the other externally toothed ring gear via a reversing shaft in accordance with some embodiments.
Figure 17B:
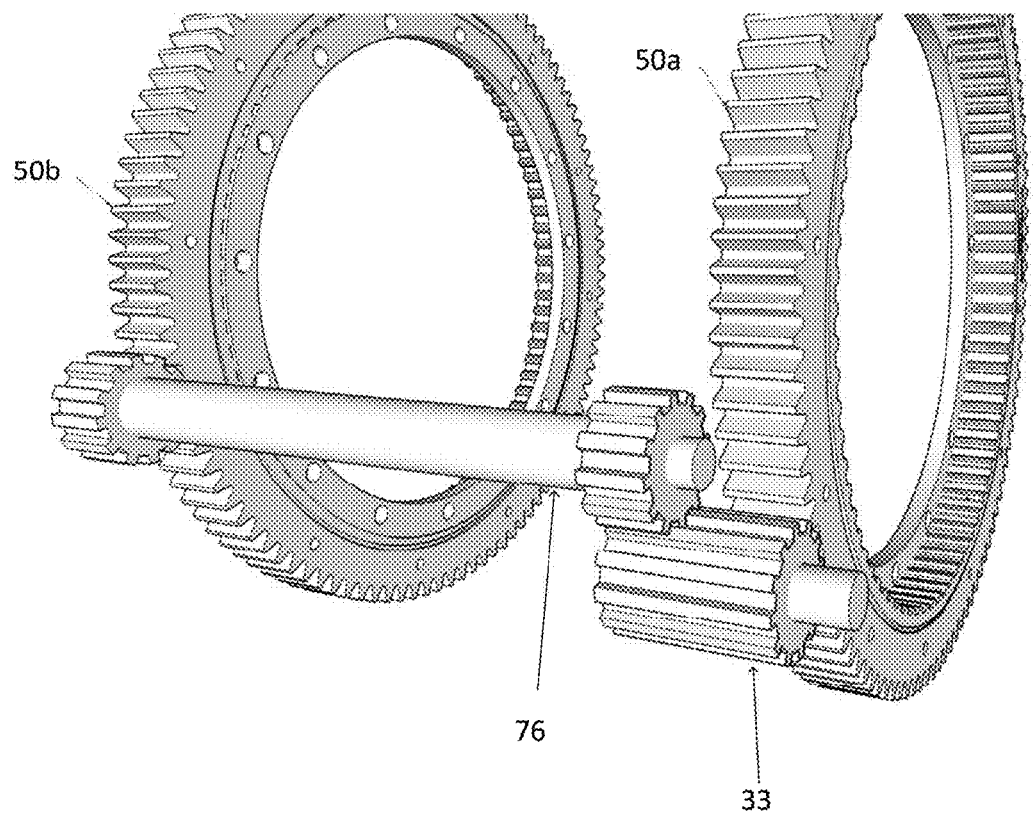
FIG. 17B is a perspective view of the interaction of the pinion gear of the variable speed reversible motor directly with one of the externally toothed ring gears and with the other externally toothed ring gear via an extension shaft in accordance with some embodiments.

FIG. 17A is a schematic gearing diagram for an embodiment similar to that depicted in FIGS. 4A-4C except that planetary gears 61a, 62a, 64a, 65a, 61b, 62b, 64b, 65b are replaced by stepped planetary gears 161a, 162a, 164a, 165a, 166, 162b, 164b, 165b each including a smaller diameter portion and a larger diameter portion, and with the differential control pinion gear 33 of the variable speed reversible motor intermeshing directly with one of the externally toothed ring gears 50a and interacting with the other externally toothed ring gear 50b via a reversing shaft 76 in accordance with some embodiments. As also shown in FIG. 17B, the differential control pinion gear is not a bevel pinion gear, but is instead a spur gear.

The arrangements for interconnecting the differential control pinion gear 33 and the externally toothed ring gears 50a, 50b in FIGS. 16A, 16B, 17A and 17B provide for a greater separation between the two sets of differential adjustment gears, which provides more room for larger and wider bearings for the carrier 36, without having to increase the size of the differential control pinion gear 33. This arrangement can also provide increased gearing reduction for differential control because the differential control pinion gear 33 can be made smaller in relation to the externally toothed ring gears 50a and 50b.

Although the present invention system can be embodied in many ways for use in or with different vehicles, some embodiments described below are described, for illustrative purposes, with respect to a vehicle having rear wheel drive and some embodiments described below are described with respect to a differentially steered vehicle. The description with respect to a rear wheel drive, is merely exemplary and should not be considered a limitation when interpreting the scope of the appended claims. One of ordinary skill in the art will appreciate that different aspects of systems, gearing assemblies and methods disclosed herein can be implemented in vehicles having rear wheel drive, front wheel drive and all-wheel drive.

One of ordinary skill in the art will appreciate that various components of the gearing assemblies described herein can be modified or substituted with equivalent components or groupings of components, and that such substitutions and modifications fall within the scope of the invention.

Use of Some Embodiments for Differential Steering

In differentially steered vehicles, steering control is typically provided through a steering input device 23, such as a steering wheel or handle. In some embodiments, a steering angle sensor 28 that measures steering magnitude and direction is attached to the input device 28. The magnitude and direction of movement away from center as measured by the steering angle sensor provides the primary input for determining the degree and direction of rotation of the differential control pinion gear 33 as controlled by the variable speed reversible motor 24.

In some embodiments, the variable speed reversible motor 24 is a hydraulic or hydrostatic motor. In such an embodiment, in addition to or instead of an attached steering angle sensor 28, the steering input device may directly control one or more control valves or swash plates to control the degree and direction of rotation of the variable speed reversible motor 24.

In some embodiments, the vehicle may be remotely operated. In such an embodiment, the variable speed steering motor is controlled by a signal from a receiver unit in response to a remote steering signal instead of through a steering input device in the vehicle that is controlled by a driver or operator in the vehicle.

In some embodiments, especially where the vehicle may experience significant travel speeds (>20 mph) it may be beneficial to provide a speed sensitive steering control. In such embodiments, an additional sensor 29 is provided to measure drive shaft rotation speed. A reducing function is then applied by a computer 26 to reduce the magnitude of the steering signal to the variable speed reversible motor 24 as the vehicle's drive shaft speed increases.

In some embodiments, the variable speed reversible motor 24 is controlled by a computer through a closed-loop operation. A feedback sensor is provided on the differential control shaft 25, or alternatively on one or more axle shafts 30 to measure the actual differential rotation rate. If only one axle rotation sensor is provided, it can be compared to a drive shaft rotation speed sensor to calculate the actual differential rate. This is done by measuring the deviation of the axle rotation sensor from the expected rotational rate of the axle shaft for no differential, which would be the drive shaft rotation rate divided by the vehicle's final drive ratio. The deviation in this case is the actual differential rotation rate. Adjustments are then made by the computer in order to adjust the actual differential rotation rate towards a desired differential rate for steering the vehicle.

Some embodiments include a method of steering a differentially steered vehicle that incorporates a gearing assembly 14 as described herein. The method includes steering the vehicle by controlling a rate of rotation of a first axle shaft 18 of the vehicle relative to the second axle shaft 18 of the vehicle by controlling rotation of the differential control pinion gear 33 using a variable speed reversible motor 24 of the vehicle. In some embodiments, the method also includes adjusting rotation provided by the variable speed reversible motor 24 based on a first sensor signal indicating an actual drive shaft rotational speed (e.g., a signal from sensor 29) and a second sensor signal indicating an actual differential in rotational speeds between the first axle and the second axle (e.g., a signal from sensor 30) using a computer 26 or a control unit of the vehicle.

Use of Embodiments in Vehicles with Front-Wheel Steering

One of the goals of some embodiments of systems and gearing assemblies described herein as applied to a vehicle equipped with a front-wheel steered (e.g., Ackerman) geometry is to rotate the differential control pinion gear 33 (or the worm gear 56 in the embodiment depicted in FIGS. 5A-5C or the spur gear 57 in the embodiment depicted in FIGS. 6A-6D) in order to mechanically achieve a calculated differential rate that is in close agreement with the vehicle's natural differential rate for any given steering angle and vehicle velocity. This goal specifically describes certain embodiments where the calculated differential rates are not modified in order to change the vehicle's handling behavior, and where the natural differential rate is experienced by a vehicle with Ackerman geometry and fitted with equal left and right tire sizes turning on a flat surface with no wheel slip. In such circumstances, this natural differential rate corresponds to the calculated and "desired" differential rate.

In some embodiments, deviation from this desired differential rate is not permitted, and thus external influences such as unequal traction conditions will have no effect on the system. In this case the system or gearing assembly will perform similar to a welded axle (or locked differential) in low traction conditions without suffering from the welded or locked axle's inability to allow different rates of rotation during a turn.

Figure 18:
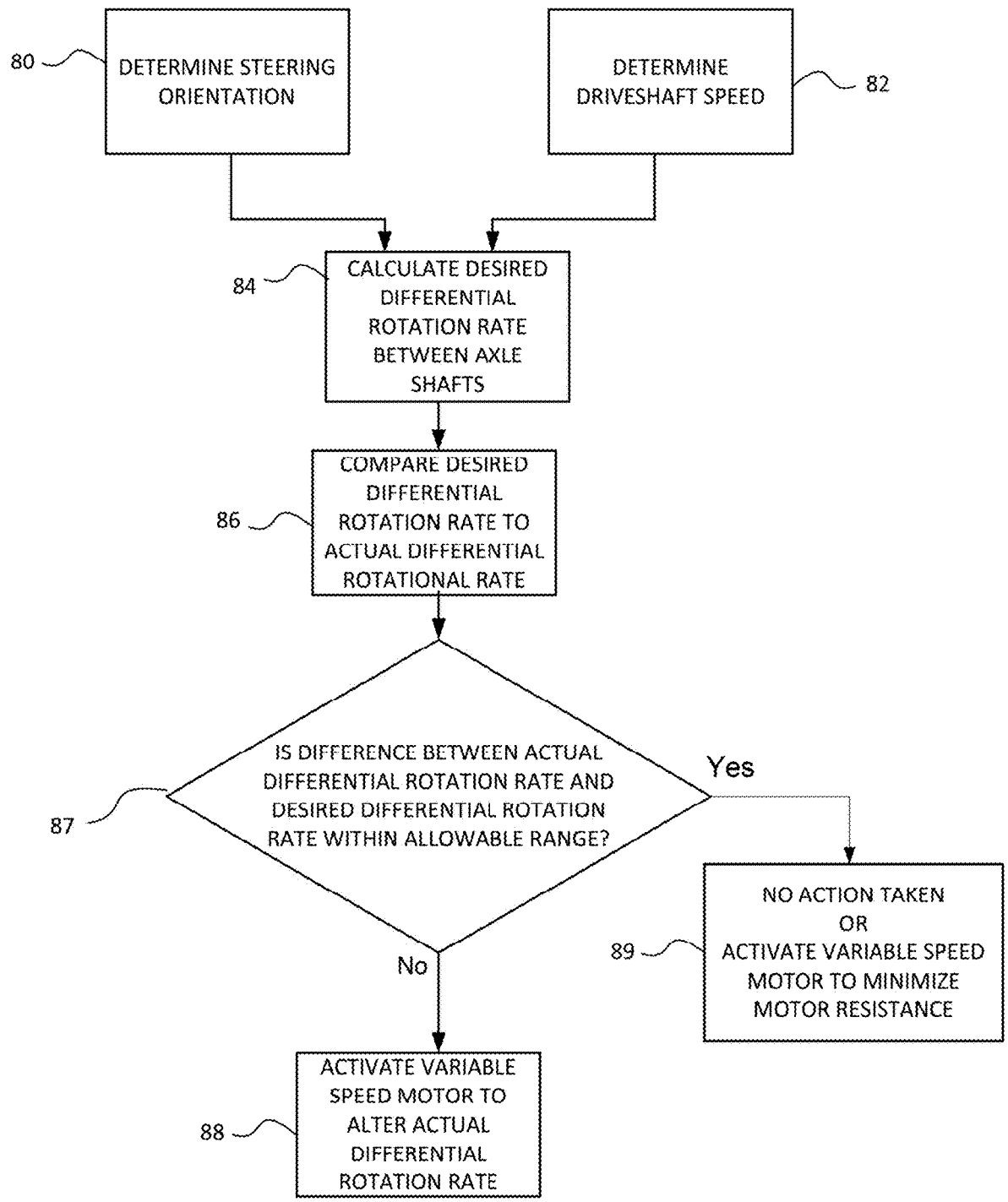
FIG. 18 is a flowchart of a method for operating a vehicle in accordance with some embodiments.

A method of operating a vehicle including a gearing assembly 14, 14' in accordance with some embodiments, is explained with respect to FIG. 18 in conjunction with FIG. 2. For illustrative purposes, the method is described with respect to FIG. 2, which shows a rear drive vehicle. One of ordinary skill in the art will appreciate that the method could be implemented in a front drive vehicle and the differential could be between the front axle shafts. Similarly, the method could be implemented in a center differential between forward and rear drive shafts in an all-wheel drive vehicle. By operating the variable speed reversible motor 24, the differential rotational rate can be changed, specifically the rotational speed of one of the rear axle shafts 18 (or one of the front axle shafts for a front differential or one of the output drive shafts for a center differential) can be increased or decreased relative to the rotational speed of the other axle shaft 20 (or the other front axle shaft for a front differential or the other output drive shaft for a center differential), depending upon the direction and speed that the variable speed reversible motor 24 turns.

Using the steering angle sensor 28, the engine computer 26 can determine if the vehicle 9 is configured to travel straight, configured to travel in a left turn, or configured to travel in a right turn. See Block 80. Furthermore, using the rotational velocity sensor 29, the RPMs of the drive shaft 12 can be determined. See Block 82. As is indicated by Block 84, the engine computer 26 calculates a desired differential rotation rate between the rotational speed of the first axle shaft 18 and the rotational speed of the second axle shaft 20, based, at least in part, on the steering angle of the vehicle and the rotational speed of the drive shaft 12. In some embodiments, the desired differential rotation rate is only calculated if the drive shaft has a nonzero rate of rotations per minute and the steering angle sensor indicates that the vehicle is configured to travel in a turn. The desired differential rotation rate is then compared to the actual differential rotation rate between the rotational speed of the first axle shaft 18 and the rotational speed of the second axle shaft. See Block 86.

A determination is made regarding whether a difference between the actual differential rotation rate and the desired differential rotational rate is within an allowable range. See Block 87. If the difference between the actual differential rotation rate and the desired differential rotational rate is within the allowable range, then, in some embodiments, no action is taken. See Block 89. In other embodiments, if the difference between the actual differential rotation rate and the desired differential rotation rate is within the allowable range, the variable speed reversible motor may be activated to actively coordinate the rotation of the motor with the actual differential rotation rate to reduce motor resistance and favor greater steering agility. See Block 89. If the difference between the actual differential rotation rate and the desired differential rotational rate is not within the allowable range, a control signal value based on the difference is sent to the variable speed reversible motor 24. The variable speed reversible motor 24 then operates to speed up or slow down the actual rotational speed of the first axle shaft 18 so that the actual differential rotational rate more closely matches the desired differential rotational rate. See Block 88. This method may be implemented as a continuous closed-loop process. As such, the differential in rotation between the first axle shaft 18 and the second axle shaft 20 is controlled via the differential control pinion gear 33 by the variable speed reversible motor 24. Slipping due to unequal traction conditions will therefore be reduced or prevented.

Physical control of the differential rate is provided through the differential control pinion gear 33 (or the worm gear 56 in the embodiment depicted in FIGS. 5A-5C or the spur gear 57 in the embodiment depicted in FIGS. 6A-6D). The following table shows the relationship between the differential control pinion gear 33, the drive shaft 12 or propulsion shaft, and the behavior of the vehicle. One of ordinary skill in the art in view of the present disclosure will understand how these relationships would be modified for embodiments employing the worm gear 56 or the spur gear 57 or additional gearing components are employed between the differential control pinion gear 33 and the externally toothed ring gears 50a, 50b.

TABLE 1

Relationship between the shafts and behavior of the vehicle

|  | Drive shaft in motion | Drive shaft at rest |
|---|---|---|
| Differential control pinion gear at rest | Vehicle traveling in straight line | Vehicle at rest |
| Differential control pinion gear in motion | Vehicle in motion and turning | Vehicle performing a neutral turn (requires all wheel drive and steering wheel locked) |

A vehicle that is equipped with an Ackerman steering geometry and with equal-sized tires will show no significant differential activity at a standstill or while traveling in a straight line. As the vehicle executes a turn, the amount that the internal gears of an open differential rotate in order to accommodate the different turning radii of the inside and outside wheels will be proportional to the vehicle's steering angle and velocity. On an ideally flat and dry surface, there is a distinct relationship between steering angle, velocity, and the vehicle's differential rate. This rate is referred to herein as the ideal differential rate of the vehicle or the natural differential rate of the vehicle for a given turn angle at a given vehicle velocity.

Figure 19:
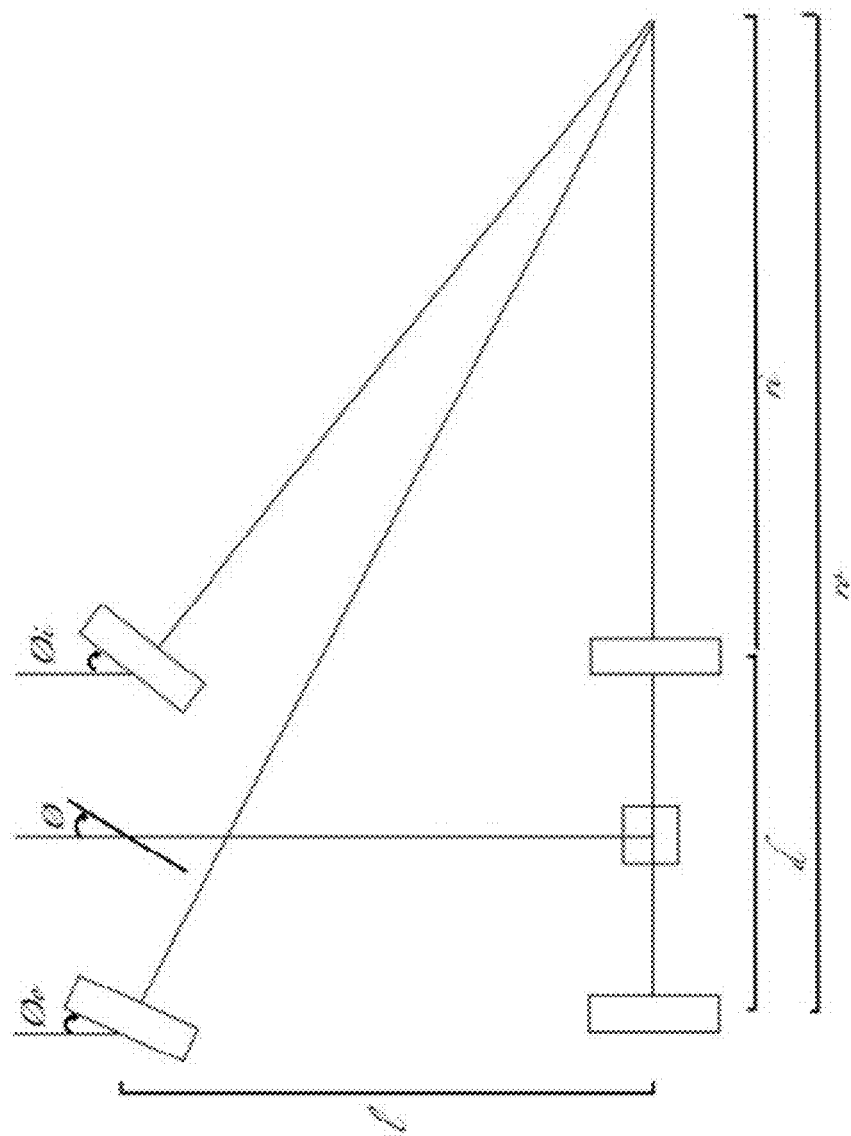
FIG. 19 illustrates the parameters used in determining the desired difference in rotational velocity for the rear differential according to FIG. 18.

In addition to steering angle and velocity, a vehicle's natural differential rate also depends on its wheelbase and width. For description purposes, the vehicle wheelbase is referred to as l, and the vehicle width is referred to as d. The vehicle width d is measured from the center of the left wheel to the center of the right wheel and in the same units as the wheelbase 1. Also for description purposes, the steering angle is referred to as Ø, and rotations per minute of the center axle is RPM. FIG. 19 illustrates these variables when calculating a rear differential rate.

RPM of the center axle is often a precise and accurate measure that is capable of detecting small fractions of rotations. It also is a vector quantity, able to detect not only the magnitude but also the direction of rotation, for example +26.215 RPM or −0.218 RPM, where + and − are used as direction indicators for use in equations. As used herein, a positive RPM is corresponds with forward vehicle motion and a negative RPM corresponds with reverse vehicle motion.

The steering angle Ø is provided in degrees from parallel with chassis, so traveling in a straight line provides Ø=0°. A moderate right turn would be Ø=20° and a moderate left turn would be Ø=−20°. This Ø angle is that of an imaginary wheel between the two turning wheels and can be easily measured from the steering column or rack of the vehicle.

When the vehicle is not in motion or when Ø is equal to zero, the natural differential rate will also be zero. In these situations, the angular velocity of all four wheels is the same and no differential motion is desired. As previously discussed, it may be advantageous in some embodiments to prevent significant deviation from the desired (in this case zero) differential rate. In these embodiments, this deviation may be prevented by employing a mechanism such as a high reduction gear (such as a worm gear) between the variable steering motor 24 and the differential control pinion gear 33, or by using a sufficiently strong variable speed reversible motor 24 in closed-loop operation. Even when unequal traction conditions work against the desired zero differential rate, the mechanism will prevent these conditions from changing the actual differential between the first axle shaft 18 and the second axle shaft 20 away from the desired zero differential. For example, consider a situation where a vehicle has one wheel on ice and the opposite wheel on dry pavement. Power is applied to the drive shaft 12 and the steering wheels are configured for straight-line travel. Because there is a steering angle of zero, no differential activity is desired, and thus it is desirable for the wheels 21, 22 on both sides to turn at equal speeds. In this case, the differential control pinion gear 33 is at rest. However, the unequal traction conditions are not favorable for both wheels turning at equal speeds. The wheel on ice wants to turn faster because it has less friction but this deviation from the desired differential rate is prevented by controlling the rotation of the differential control pinion gear 33 in order to prevent the wheel on ice from spinning faster than the wheel on dry pavement. Thus power is delivered equally as if the wheels were locked together.

When RPM is non-zero and Ø is non-zero, the desired differential rate will also be non-zero. This differential rate is a vector quantity referred to as herein in revolutions per minute, or RPMDiff and represents the difference in the rotational speed of one axle shaft relative to the opposite axle shaft. Because the differential control pinion gear 33 applies an equal but opposite rotational difference to first plurality of adjustment gears 15a associated with the first axle 18 and the second plurality of adjustment gears 15b associated with the second axle, it is beneficial to choose a reference axle shaft to better understand the effect of rotating the differential control pinion gear. In examples described herein, the first axle shaft 18 (e.g., the right axle) has been selected as the reference axle shaft. However, in other embodiments, this may be reversed. The sign of RPMDiff indicates the direction of rotation of the differential input on that side of the vehicle. Positive indicates axle rotation in the forward direction of the vehicle and negative indicating axle rotation in the reverse direction of the vehicle. For example, the differential control pinion gear 33 will need to rotate so as to apply a positive (additive) adjustment to the selected right side reference axle shaft if the vehicle is moving forward and making a left turn. This is because the right side wheels of the vehicle move faster than the left side in order to cover the larger turning radius compared to the left wheels, so an additional (additive) rotational speed is provided to that side while an equal rotational speed is subtracted from the left side. As noted above, simultaneously with applying a positive adjustment to the right axle shaft 18 through the first plurality of adjustment gears 15*a* the differential control pinion gear 33 applies an equal negative adjustment to the rotation rate of the left axle shaft 20 through the second plurality of adjustment gears 15*b*. This illustrates the balanced regenerative aspects of the gearing assembly. The embodiments depicted in FIG. 5A-6D are not regenerative gearing assemblies.

Consider the same scenario except now the vehicle is making a right turn of equal intensity and speed. The sign of RPMDiff will be reversed to indicate a negative and subtractive effect on the reference right axle shaft 18. When the vehicle travels in reverse, the sign must also be reversed in order to preserve the additive or subtractive nature of RPMDiff. In other words, the direction of rotation of the differential control pinion gear 33 will reverse as the vehicle switches from forward to reverse travel, however, the additive or subtractive nature of the differential control pinion gear's rotation with respect to the reference axle-shaft is maintained.

TABLE 2

Direction and effect of RPMDiff with right axle reference configuration

| | Positive RPM (forward) | Negative RPM (reverse) |
|---|---|---|
| Right turn (positive Ø) | Reverse(−), subtractive | Forward(+), subtractive |
| Left turn (negative Ø) | Forward(+), additive | Reverse(−), additive |

Note that RPMDiff may not equal the RPM of the differential control pinion gear 33. The variable speed reversible motor 24 rotates the differential control pinion gear 33 so that the RPM of the reference axle shaft either increases or decreases by the amount of RPMDiff. Actual RPM of the differential control pinion gear 33 will differ due to factors such as the gearing reduction; however, the rotation of the differential control pinion gear 33 is directly proportional to RPMDiff.

Figure 20:
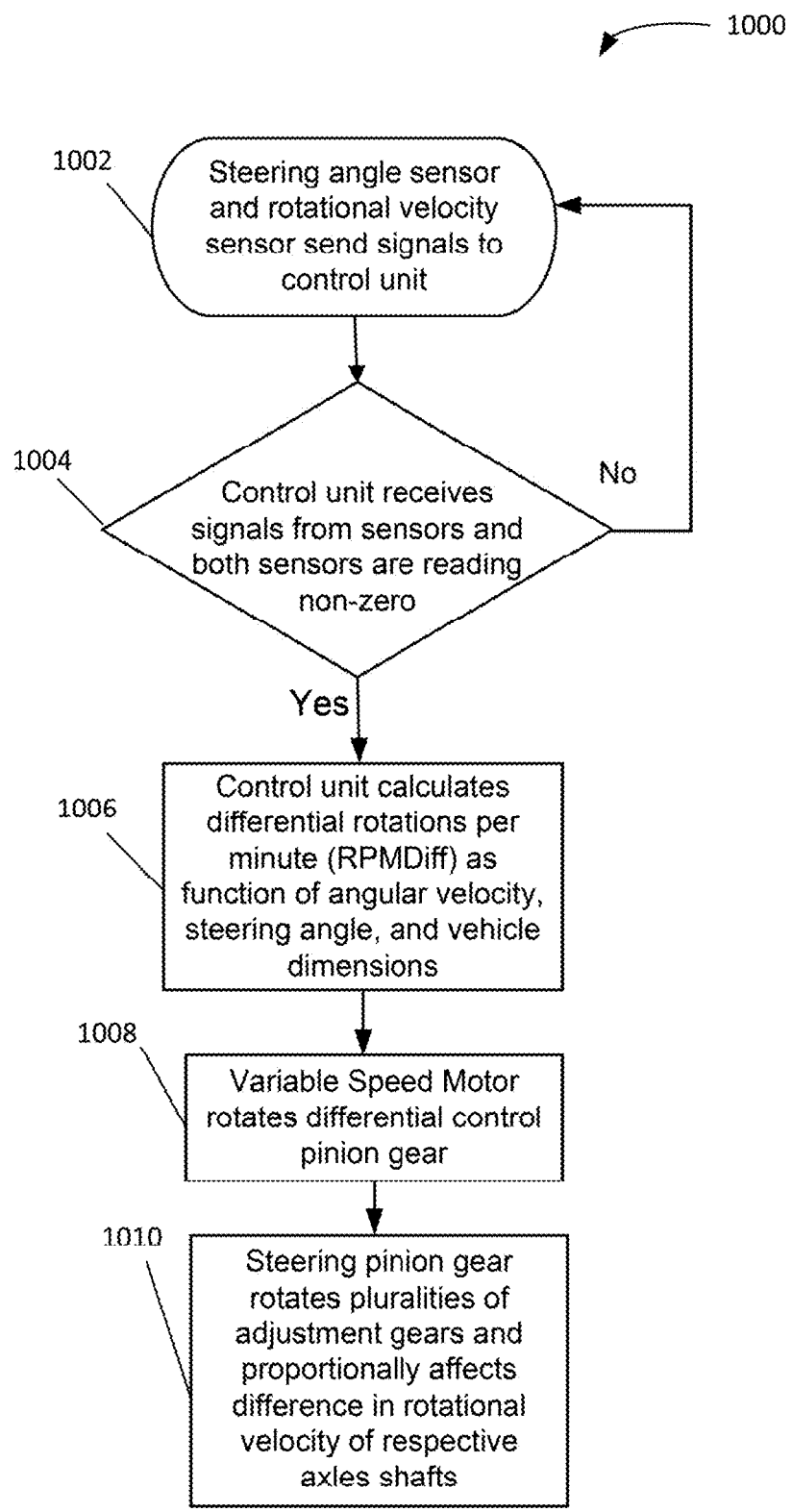
FIG. 20 is a flowchart of a method for actively controlling a differential in rotational velocity between a first axle shaft and a second axle shaft in accordance with some embodiments.

FIG. 20 is a flowchart for an example method 1000 for actively controlling a differential in rotational velocity between a first axle shaft and a second axle shaft according to some embodiments. At step 1002, the steering angle sensor 28 and the rotational velocity sensor (e.g., drive shaft rotation velocity sensor) 29 send signals to a control unit of a vehicle. The control unit may be a computer of the vehicle (e.g., computer 26) or a control unit separate from a computer of the vehicle. At step 1004, the control unit determines if both of the received signals (from step 1002) are reading non-zero. In some embodiments, the control unit instead determines if both signals are outside of specified ranges around zero. If both signals are non-zero (or outside specified ranges around zero), then the method 1000 continues to step 1006, otherwise, the method 1000 returns to step 1002.

At step 1006, the control unit calculates differential rotations per minute (referred to herein as RPMDiff). The differential rotations per minute is calculated as a function of drive shaft angular velocity, steering angle, and vehicle dimensions. At step 1008, the variable speed reversible motor rotates the differential control pinion gear 33. At step 1010, the differential control pinion gear 33 rotates the externally toothed ring gears 50*a*, 50*b* of the respective pluralities of adjustment gears 15*a*, 15*b* mounted on each opposing axle shaft 18, 20 in opposite directions which proportionally affects the difference in rotational velocity of the respective axle shafts 18, 20. This method may be implemented as a continuous closed-loop process using appropriate feedback sensors.

Figure 21:
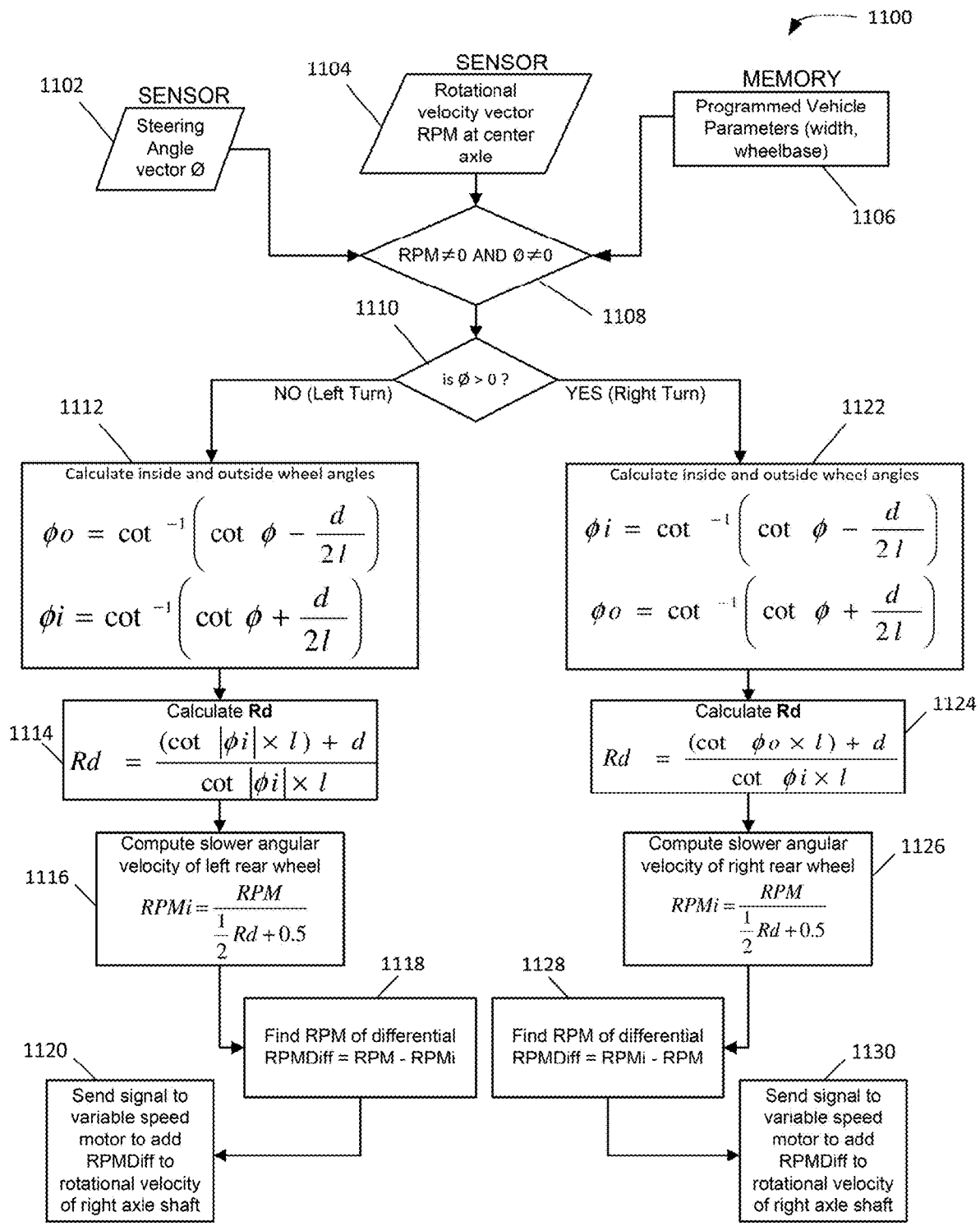
FIG. 21 is a flowchart of a method determining a desired difference in rotational velocity between rear axle shafts in a vehicle having a rear differential in accordance with some embodiments.

FIG. 21 is a flowchart for a method 1100 for controlling a difference in rotational velocity between rear axle shafts in a vehicle having a rear differential in accordance with some embodiments. FIG. 19 illustrates the parameters used in calculating the desired difference in rotational velocity for the rear differential according to FIG. 21. For the rear differential, the value of RPMDiff can be calculated through the method 1100. At step 1102, sensor data is received indicating the steering angle Ø (e.g., from steering angle sensor 28). At step 1104, sensor data is received indicating rotational velocity (RPM) at the center axle (e.g., from drive shaft rotation sensor 29). At step 1106, the vehicle parameters, such as width (d) and wheelbase (l), are retrieved from the vehicle memory.

At step 1108, it is determined whether the steering angle Ø and the RPM are nonzero values (that is, the vehicle is in motion and turning). In some embodiments, the control unit instead determines if the steering angle Ø and the RPM are both outside of specified ranges around zero. If both values are non-zero (or outside specified ranges around zero), the method 1100 continues to step 1110. At step 1110, it is determined whether the steering angle is positive or negative, that is, whether the vehicle is turning right or turning left respectively.

If the steering angle Ø is positive, meaning that is the vehicle is turning right, then the method 1100 continues to step 1122. At step 1122, the inside $Ø_i$ and outside $Ø_o$ wheel angles are calculated as a function of the width d and the wheelbase l. These parameters are illustrated in FIG. 19. Using the Ackerman expressions (equations 1.1 and 1.2 below), the angle of either the inside Øi or the outside $Ø_o$ wheel can be determined based on a given Ø.

For a right turn where Ø>0:

$$\phi o = \cot^{-1}\left(\cot\phi + \frac{d}{2l}\right) \text{ and}$$

$$\phi i = \cot^{-1}\left(\cot\phi - \frac{d}{2l}\right)$$

Equation 1.1

For a left turn where Ø<0:

$$\phi o = \cot^{-1}\left(\cot\phi - \frac{d}{2l}\right) \text{ and}$$

$$\phi i = \cot^{-1}\left(\cot\phi + \frac{d}{2l}\right)$$

Equation 1.2

The difference in travel distance between the inside (right) wheel and the outside (left) wheel can be expressed as a ratio, Rd. At step 1124, Rd is calculated as shown below in equation 2.3 by dividing the outside turn radius ro by the inside turn radius ri (see FIG. 19 for illustration of ri and ro). For a right turn calculation of RPMDiff, where Ø>0, ri is calculated as follows:

$$ri = \cot\emptyset i * l \quad \text{Equation 2.1}$$

ro is calculated as follows:

$$ro = (\cot\emptyset i * l) + d \text{ and} \quad \text{Equation 2.3}$$

$$Rd = \frac{ro}{ri}$$

Rd will decrease and approach 1 as the steering angle decreases. The greater the steering angle, the more difference there is between the inside and outside radius, and the greater the value of Rd. At step 1126, using Rd and RPM in the equation 2.4 provides the slower angular velocity of the right rear (reference) wheel:

$$RPMi = \frac{RPM}{\frac{1}{2}Rd + 0.5} \quad \text{Equation 2.4}$$

At step 1128, RPMDiff is calculated as the RPM difference between the right wheel and the middle axle. This can be found by subtracting RPM from RPMi:

$$\text{RPMDiff} = \text{RPMi} - \text{RPM} \quad \text{Equation 2.5}$$

This gives a negative value of RPMDiff, which is appropriate in this case because this is subtracted from the forward RPM on the right side during a right hand turn.

At step 1130, the control unit sends a signal to the variable speed reversible motor to add RPMDiff to the rotational velocity of the right axle shaft by means of the differential control pinion gear 33 the first plurality of adjustment gears 15a and the second plurality of adjustment gears 15b.

At step 1110 if the steering angle Ø is negative, meaning that the vehicle is turning left, then the method 1100 continues to step 1112. At step 1112, the inside $\emptyset_i$ and outside $\emptyset_o$ wheel angles are calculated as a function of the width d and the wheelbase 1. These parameters are illustrated in FIG. 19. At step 1114, Rd is calculated as a function of $\emptyset_i$, $\emptyset_o$, l and d.

At step 1116, using Rd and RPM provides the slower angular velocity of the left rear wheel. At step 1118, RPMDiff is calculated for a left turn, where 0<0, ri, ro and RPMDiff are calculated as follows:

$$ri = \cot|\emptyset i| * l \quad \text{Equation 2.6}$$

$$ro = (\cot|\emptyset i| * l) + d \quad \text{Equation 2.7}$$

$$\text{RPMDiff} = \text{RPM} - \text{RPMi} \quad \text{Equation 2.8}$$

The order of subtraction for RPMDiff is flipped because our reference axle is still on the right side, but the inside wheel is now the left, instead of the right.

At step 1120, the control unit sends a signal to the variable speed reversible motor to add RPMDiff to the rotational velocity of the right axle shaft by means of the differential control pinion gear 33, the first plurality of adjustment gears 15a and the second plurality of adjustment gears 15b.

Figure 22:
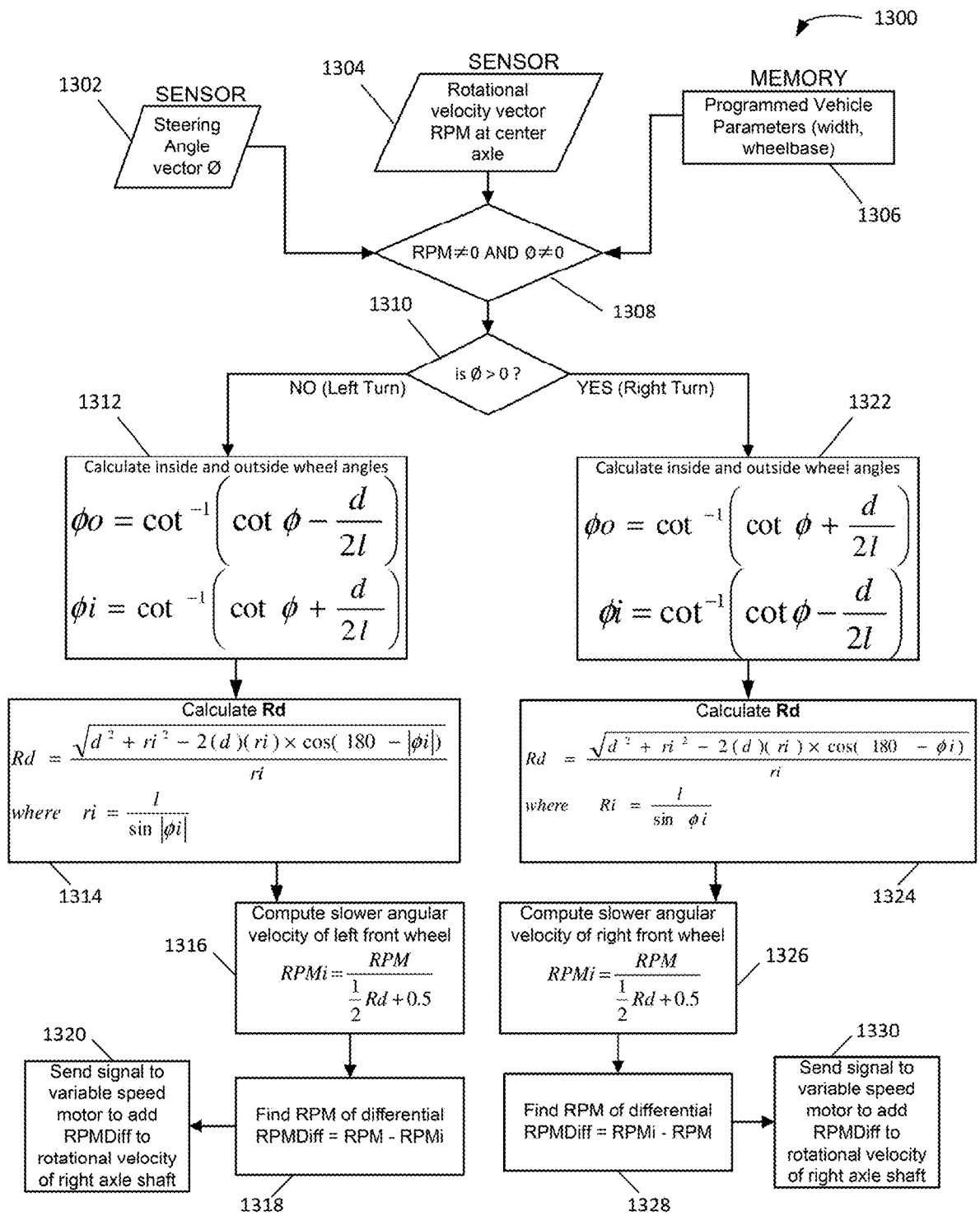
FIG. 22 is a flowchart of a method for determining a desired difference in rotational velocity between front axle shafts in a vehicle having a front differential in accordance with some embodiments.
Figure 23:
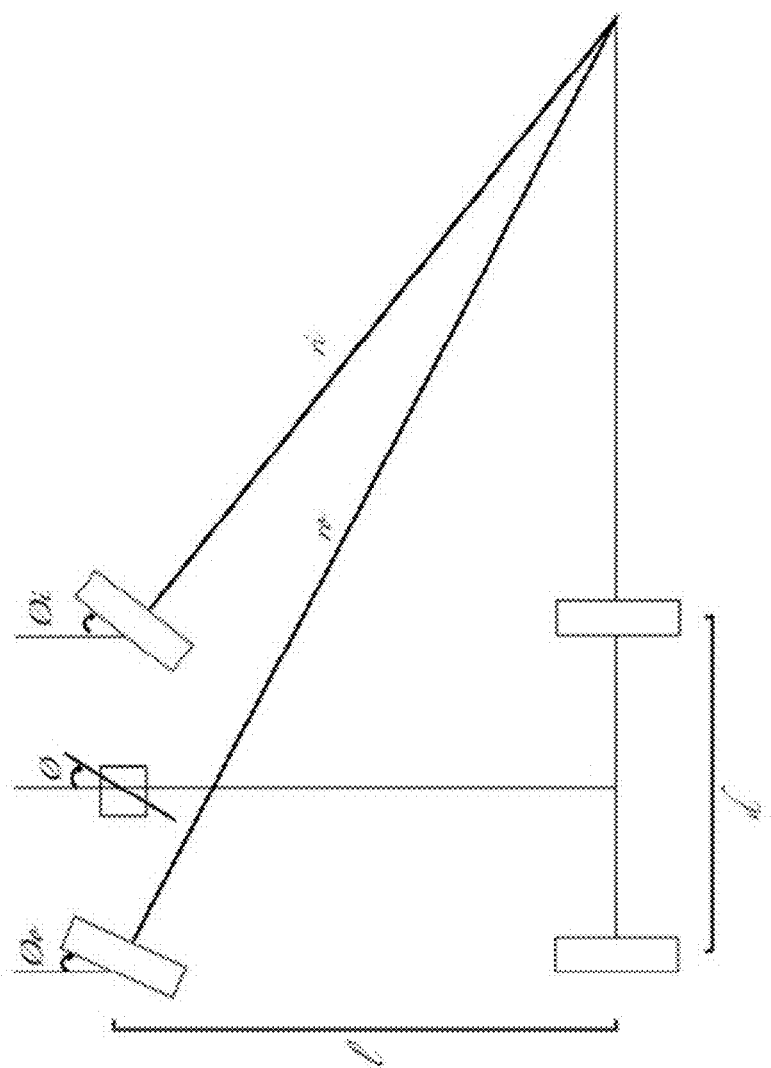
FIG. 23 illustrates the parameters used in determining the desired difference in rotational velocity for the front differential according to FIG. 22.

FIG. 22 is a flowchart for method 1300 for controlling a difference in rotational velocity between front axle shafts in a vehicle having a front differential in accordance with some embodiments. The reference axle-shaft in this case is the right front axle-shaft, and so the differential control pinion gear 33 will be rotated to achieve the desired RPMDiff with respect to this axle shaft. Recall that due to the regenerative nature of this design, and the opposite action of the differential control pinion gear on the left adjustment gears, the left front axle shaft will experience an equal and opposite adjustment to the rotation rate. For simplicity, the right axle as the reference point for these calculations. Example method 1300 can be used for calculating a desired difference in rotational velocity for a front differential. FIG. 23 illustrates the parameters used in calculating the desired difference in rotational velocity for the front differential according to FIG. 22.

For the front differential, the value of RPMDiff can be calculated through the method depicted in FIG. 22. At step 1302, sensor data is received indicating the steering angle Ø (e.g., from steering angle sensor 28). At step 1304, sensor data is received indicating rotational velocity (RPM) at the center axle (e.g., from drive shaft rotational velocity sensor 29). At step 1306, the vehicle parameters, such as width (d) and wheelbase (l), are retrieved from the vehicle memory.

At step 1308, it is determined whether the steering angle Ø and the RPM are nonzero values (that is, the vehicle is in motion and turning). In some embodiments, the control unit instead determines if the steering angle Ø and the RPM are both outside of specified ranges around zero. If these values are nonzero (or outside specified ranges around zero), the method 1300 continues to step 1310. At step 1310, it is determined whether the steering angle is positive or negative, that is, whether the vehicle is turning right or turning left respectively.

If the steering angle Ø is positive, meaning that the vehicle is turning right, then the method 1300 continues to step 1322. At step 1322, the inside $\emptyset_i$ and outside $\emptyset_o$ wheel angles are calculated as a function of the width d and the wheelbase 1. These parameters are illustrated in FIG. 23.

The difference in travel distance between the inside (right) front wheel and the outside (left) front wheel can be expressed as a ratio, Rd. At step 1324, Rd is calculated as shown below in equation 3.3 by dividing the outside turn radius ro by the inside turn radius ri (see FIG. 21 for illustration of ri and ro). It should be noted that the ri and ro values for the front wheels are different from those for the rear wheels. For a right turn calculation of RPMDiff, where Ø>0, ri and ro are calculated as follows:

$$ri = \frac{l}{\sin\emptyset i} \quad \text{Equation 3.1}$$

$$ro = \sqrt{d^2 + ri^2 - 2d * ri * \cos(180 - \emptyset i)} \quad \text{Equation 3.2}$$

$$Rd = \frac{ro}{ri} \quad \text{Equation 3.3}$$

Note that in some embodiments ro can also be calculated using the Pythagorean theorem ro=$\sqrt{l^2 + ro_r^2}$ where $ro_r$ is the outside turn radius of the rear wheel.

Rd will decrease and approach 1 as the steering angle decreases. The greater the steering angle, the more difference there is between inside and outside radius, and the greater the value of Rd. Using an adjusted value of Rd corrects for the different angular velocity of the right front wheel during the turn. At step 1326, using Rd and RPM in the following equation provides:

$$RPMi = \frac{RPM}{\frac{1}{2}Rd + 0.5} \quad \text{Equation 3.4}$$

At step 1328, RPMDiff is the angular velocity differences between the middle of the axle and the right wheel. This can be found by subtracting RPM from RPMi:

$$RPMDiff = RPMi - RPM \qquad \text{Equation 3.5}$$

At step 1330, the control unit sends a signal to the variable speed reversible motor to add RPMDiff to the rotational velocity of the right axle shaft by means of the differential control pinion gear 33, the first plurality of adjustment gears 15a and the second plurality of adjustment gears 15b.

At step 1310 if the steering angle Ø is negative, that is, the vehicle is turning left, then the method 1300 continues to step 1312. At step 1312, the inside $Ø_i$ and outside $Ø_o$ wheel angles are calculated as a function of the width d and the wheelbase l. These parameters are illustrated in FIG. 21. At step 1314, Rd is calculated as a function of $Ø_i$, $Ø_o$, l and d.

At step 1316, using Rd and RPM provides the slower angular velocity of left front wheel. At step 1318, RPMDiff is calculated for a left turn, where Ø<0, ri, ro and RPMDiff are calculated as follows:

$$ri = \frac{l}{\sin|Øi|} \qquad \text{Equation 3.6}$$

$$ro = \sqrt{d^2 + ri^2 - 2d \ast ri \ast \cos(180 - |Øi|)} \qquad \text{Equation 3.7}$$

$$RPMDiff = RPM - RPMi \qquad \text{Equation 3.8}$$

The order of subtraction for RPMDiff is flipped because the reference axle shaft is still on the right side, but the inside wheel is now the left, instead of the right.

At step 1320, the control unit sends a signal to the variable speed reversible motor to add RPMDiff to the rotational velocity of the right axle shaft by means of the differential control pinion gear 33, the first plurality of adjustment gears 15a and the second plurality of adjustment gears 15b.

Figure 24:
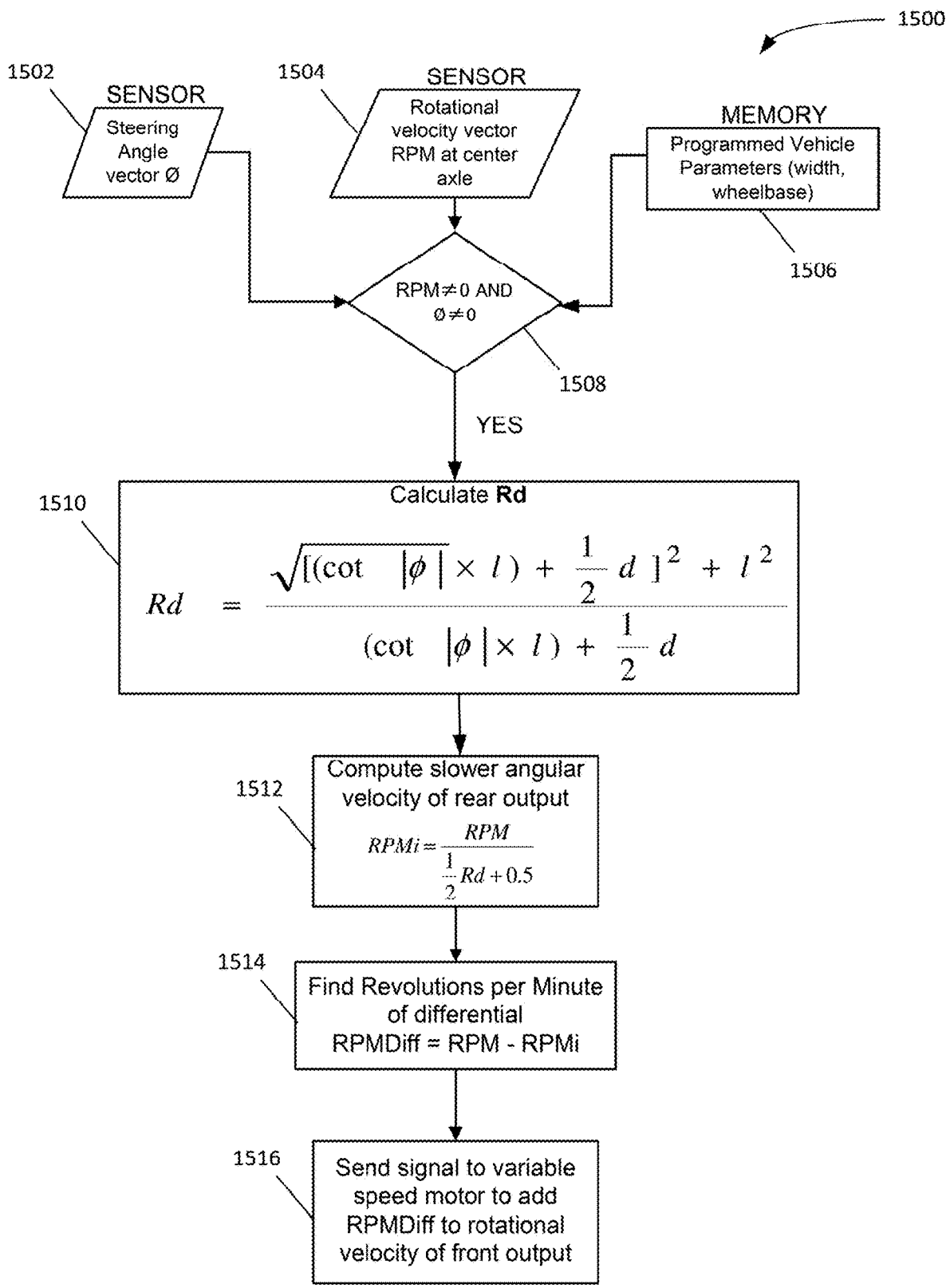
FIG. 24 is a flowchart of an example method for determining a desired difference in rotational velocity between a front output drive shaft and a back output drive shaft for a vehicle having a center differential in accordance with some embodiments.
Figure 25:
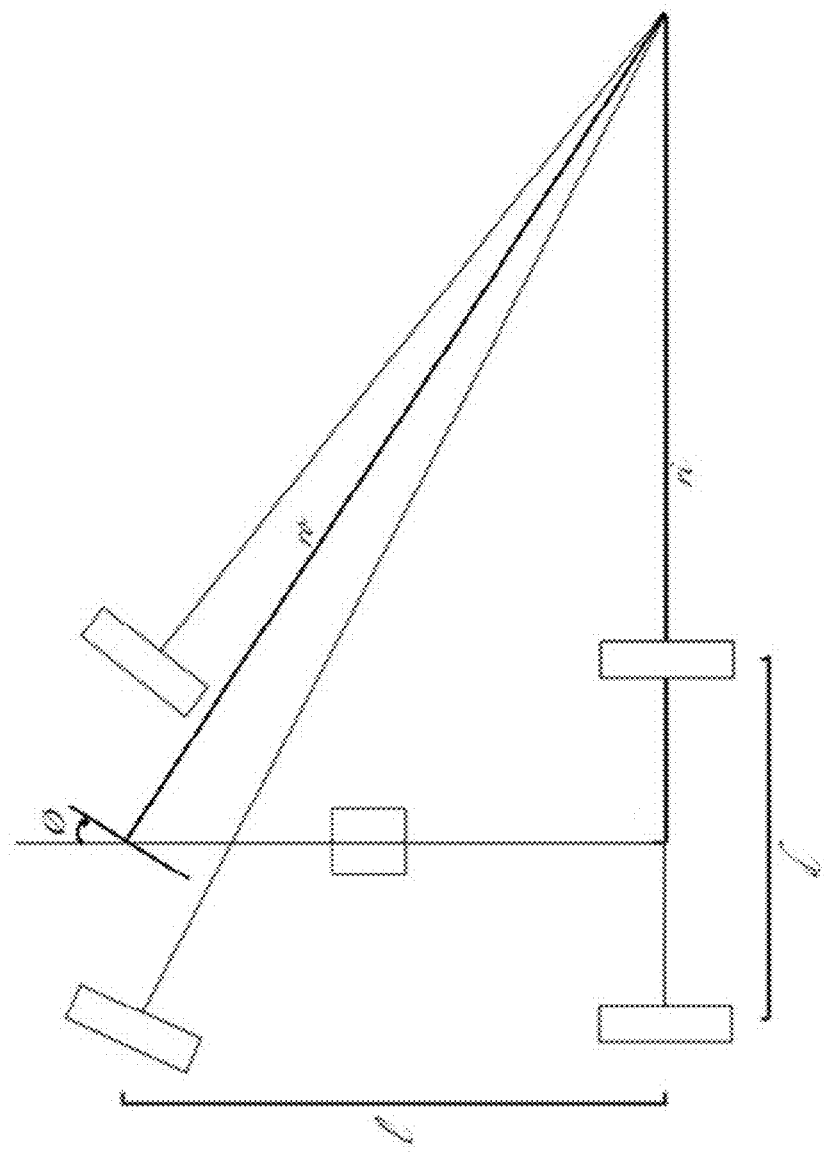
FIG. 25 illustrates the parameters used in determining the desired difference in rotational velocity for the center differential according to FIG. 24.

FIG. 24 is a flowchart for a method 1500 for determining a desired difference in rotational velocity between a front output drive shaft and a back output drive shaft in a vehicle having a center differential in accordance with some embodiments. FIG. 25 illustrates the parameters used in determining the desired difference in rotational velocity for the center differential according to FIG. 24. The reference axle-shaft in this case is the front output shaft, and so the differential control pinion gear 33 will be rotated so as to achieve the desired RPMDiff with respect to this output shaft. Recall that due to the regenerative nature of this design, and the opposite action of the differential control pinion gear on the rear adjustment gears, the rear output shaft will realize an equal and opposite adjustment to the rotation rate. For simplicity, we have the front output shaft as the reference shaft for these calculations.

In all-wheel drive applications there is a center differential to accommodate the different radii between the front and rear axles during a turn. When there is a front, rear and center differential, the rotational velocity of the input to the center differential (the output from the transmission) is used as RPM which, through calculations, can provide the RPM of the center differential's front and rear output shafts, at any given steering angle and velocity. These values can then serve as the RPM for calculating RPMdiff values for the front and rear differentials described above, thus allowing differential rates for all three differentials to be calculated from a single rotational velocity measurement.

For the center differential, the value of RPMDiff can be calculated using the method depicted in FIG. 24. At step 1502, sensor data is received indicating the steering angle Ø (e.g., from steering angle sensor 28). At step 1504, sensor data is received indicating rotational velocity (RPM) at the center axle (e.g., from the drive shaft rotational sensor 29). This RPM is often a precise measurement capable of detecting small fractions of rotations. It is also a vector quantity with the sign indicating direction (+ indicates forward, − indicates reverse). At step 1506, the vehicle parameters, such as width (d) and wheelbase (l), are retrieved from the vehicle memory.

At step 1508, it is determined whether the steering angle Ø and the RPM are nonzero values (that is, the vehicle is in motion and turning). In some embodiments, the control unit instead determines if the steering angle Ø and the RPM are both outside of specified ranges around zero. If these values are nonzero (or outside of specified ranges around zero), the method 1500 continues to step 1510.

Next ri (the rear differential turn radius) and ro (the front differential turn radius) are calculated as follows (see FIG. 23 for illustrations of ri and ro):

$$ri = (\cot(Ø) \ast l) + \tfrac{1}{2}d \qquad \text{Equation 4.1}$$

$$ro = \sqrt{r^2 + l^2} \qquad \text{Equation 4.2}$$

At step 1510, the difference in travel distance between the front axle and the rear axle is expressed as a ratio, Rd herein. Rd is calculated as follows:

$$Rd = \frac{ro}{ri} \qquad \text{Equation 4.3}$$

At step 1512, the RPM of the (slower) rear output is calculated per the below equation.

$$RPMr = \frac{RPM}{\frac{1}{2}Rd + 0.5} \qquad \text{Equation 4.4}$$

At step 1514, the RPMDiff is calculated as follows:

$$RPMDiff = RPM - RPMr \qquad \text{Equation 4.5}$$

RPMr can now be used as the RPM value for the rear differential calculation described above. The faster angular velocity (RPMf) of the front output shaft can be calculated as follows:

$$RPMf = RPMr \ast Rd \qquad \text{Equation 4.6}$$

RPMf can now be used as the RPM value for the front differential calculation described above. At step 1516, the control unit sends a signal to the variable speed reversible motor to add RPMDiff to the rotational velocity of the front output by means of the differential control pinion gear 33, the first plurality of adjustment gears 15a and the second plurality of adjustment gears 15b.

The calculations above require accurate floating-point numbers, especially for small values of Ø. In some embodiments, floating point arithmetic within the control unit is performed with a suitable convention such as IEEE 754.

In embodiments that do not allow significant deviation from the differential rate as calculated above, and/or where a mechanism is employed to prevent deviation such as a reduction gear or worm gear as previously discussed, the power required by the variable speed reversible motor (e.g., the servo or stepper motor) to drive the differential control pinion gear need not be large. In most Ackerman steered vehicles, the maximum rotational speed that the variable speed reversible motor will turn the gear that connects the motor to the gearing assembly (e.g., differential control pinion gear 33, worm gear 56 or spur gear 57) is relatively small compared to the maximum rotational speed of the drive shaft. Furthermore, in these embodiments, under ideal traction conditions, the calculated rotation as applied to the differential control pinion gear 33, worm gear 56 or spur gear 57 will closely align and follow the vehicle's natural differential rate. As such, very little, if any, resistance will be experienced by the variable speed reversible motor under these conditions.

When external conditions do not favor the natural differential rate, such as if one wheel is off the ground, some embodiments incorporate a mechanism such as a reduction or worm gear that prevents power from being lost to that slipping wheel. In this situation where the differential is maintaining a natural differential rate even though external conditions are resisting it, the reduction gear, or other mechanism to prevent deviation may experience an increase in torque load. In this situation it could be difficult for a small variable speed reversible motor to continue operating against increased resistance and therefore it may be advantageous to command the variable speed reversible motor to temporarily hold the differential control pinion gear stationary until the resistance returns below a certain threshold in order to prevent burnout of the variable motor. In this scenario, the differential will continue to power the vehicle as if it was a locked or welded differential, and when the resistance from the traction imbalance returns to a normal range, the system will return to applying the calculated differential rates as described above.

With the degree of differential control that the systems and gearing assemblies disclosed herein provide, the desired differential rate can be adjusted to be different than the natural rate. For example, the control unit could be programmed to compensate for vehicle over-steer or under-steer by decreasing or increasing the differential rates respectively. In such embodiments, a sufficiently powerful variable speed reversible motor should be employed to overcome the possible increased resistance.

In some embodiments, a sufficiently powerful variable speed reversible motor 24 may enable the vehicle to perform a neutral turn. This may be advantageous for tight maneuvering such as turning the vehicle 180 degrees in a confined space without the need to perform a multi-point turn. The regenerative and symmetrical nature of the differential adjustment gears allows this type of maneuver to be performed exclusively through the differential control pinion gear 33, without any involvement of the propulsion drive shaft 12. In such a maneuver, it is necessary to lock, or hold the steering wheel in a fixed position so that the neutral turn is not impacted by unintended movement of the steering wheel.

The differential control system may need to be calibrated to adjust for changes in tire size due to uneven tread wear or differences in tire inflation pressures. A manual trim, or calibration knob may be used, which may increase or decrease the differential rates by small amounts or percentages. For example, a vehicle in motion with different sized tires on the left and right may tend to yaw to one side even when the steering wheels are kept straight. The knob may be used to adjust the differential rate in order to keep the vehicle traveling straight. More specifically the adjustment may cause the differential control system to increase the rotational velocity of the tire with the smaller radius and therefore slowing down the larger tire on the opposite side. This adjustment is done until the distance covered by the smaller tire that is spinning faster matches the distance covered by the larger tire that is turning slower in any unit time. In some embodiments, such an adjustment may be made automatically based on sensor input.

In some embodiments, a desired differential rate may be modified based on a sensed or measured differential in torque between the first axle shaft and the second axle shaft. In some embodiments, the desired differential rate may be modified based on an instantaneous current measured differential in torque. In some embodiments, the desired differential rate may be modified based on a differential in torque measured over a period of time. In some embodiments, one or more torque sensors are employed to obtain measurements to determine a difference in torque between the first axle and the second axle and based, at least in part on the measurements, the computer determines how balanced or unbalanced the torque is between the two wheels, and to modify the desired differential rate base, at least in part, on how unbalanced the torque is.

Figure 26:
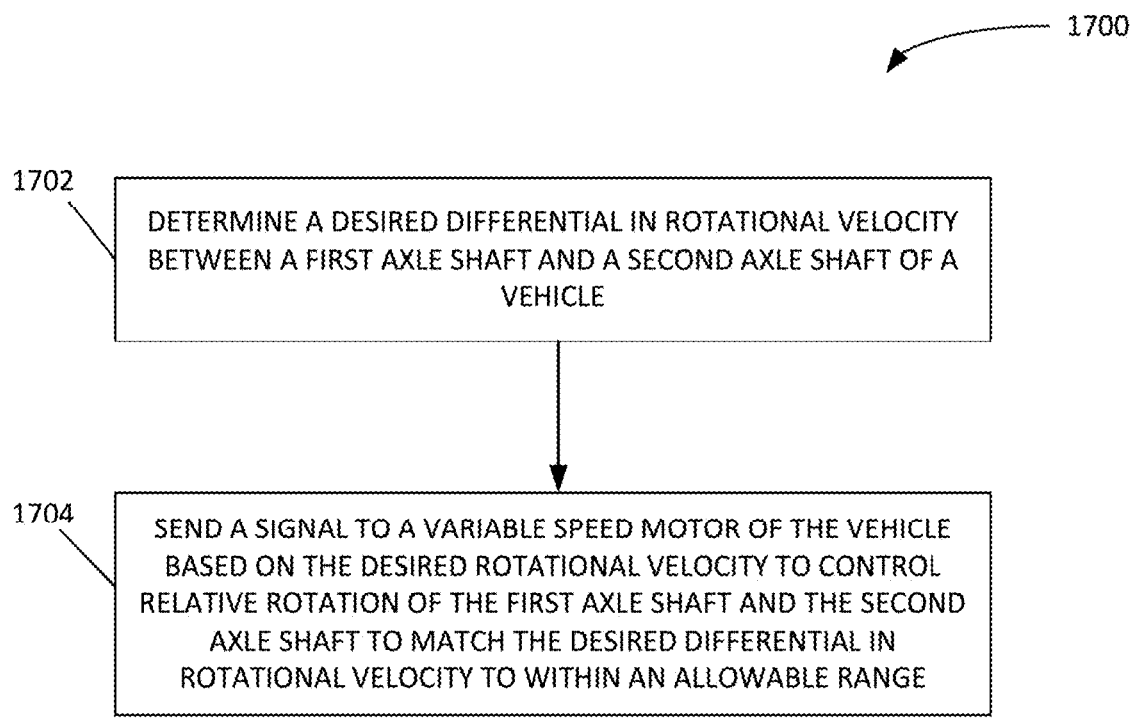
FIG. 26 is a flowchart of a method for operating a differential system in accordance with some embodiments.

FIG. 26 is a flowchart for an example method 1700 for operating a differential system according to an example embodiment. The method 1700 begins at step 1702 where a control unit including one or more processors is programmed to determine a desired differential in rotational velocity between a first axle shaft and a second axle shaft of a vehicle. In some embodiments, the control unit is a main computer 26 of the vehicle. In some embodiments, the control unit is not included in the main computer of the vehicle. In some embodiments, the control unit is a computer 26 that operates the engine of the vehicle. In some embodiments, the control unit is separate from the computer 26 that operates the engine of the vehicle. In some embodiments, the control unit includes one or more microprocessors. The control unit can have any suitable configuration for implementing computer-executable instructions. The desired differential in rotational velocity is determined based, at least in part, on a current steering angle of the vehicle (e.g., as provided by the steering angle sensor 28) and on a current rotational velocity of a first drive shaft 12 of the vehicle (e.g., as provided by the drive shaft rotational sensor 29). The first drive shaft 12 powers a differential 40 to which the first axle shaft 18 and the second axle shaft 20 are connected.

At step 1704, the control unit is programmed to send a signal to a variable speed reversible motor 24 of the vehicle based on the desired differential in rotational velocity determined in step 1702 to control relative rotation of the first axle shaft 18 and the second axle shaft 20 to match the desired differential in rotational velocity to within an allowable range.

In an example embodiment, the allowable range may fall within a range of ±0% to ±15% of the desired differential value. In another example embodiment, the allowable range may fall within a range of ±1% to ±5% of the desired differential value.

In some embodiments, the control unit may be programmed to change the allowable range in response to a user input. For example, the user input may indicate selection of a 'off road' or 'rough road' drive option for the vehicle, among other possible options.

In some embodiments, the control unit may be programmed to change the allowable range based, at least in part, on a sensor input while the vehicle is in motion. The sensor input may be an input from a g-force sensor or a sensor associated with the suspension of the vehicle. The allowable range may be changed based on input from a sensor or sensors over a period of time. The period of time may fall in a range of 5 seconds to 20 minutes. In other embodiments, the period of time may fall in a range of 1 minute to 10 minutes.

In another example, the control unit may adjust the allowable range automatically based on sensor readings indicating that the vehicle is moving over rough terrain. For example, the control unit may receive sensor input from an acceleration sensor or a sensor associated with the suspension over a period of time while the vehicle is in motion and adjust the allowable range in response to the received sensor input. A suitable period of time may be selected. For example, in some embodiments, the period of time may fall in a range of 5 seconds to 20 minutes. In some embodiments, the period of time may fall in a range of 1 minute to 10 minutes.

In an example embodiment, the variable speed reversible motor 24 controls relative rotation of the first axle shaft 18 and the second axle shaft 20 using a gearing assembly 14 of the vehicle that is coupled to the variable speed reversible motor. The gearing assembly may be any of the gearing assemblies 14, 14' described herein.

The control unit may receive information regarding a sensed current steering angle of the vehicle and receive information regarding a sensed current rotational velocity of the first drive shaft 12 of the vehicle to determine the desired differential in rotational velocity at step 1702.

In an example embodiment, the variable speed reversible motor may control relative rotation of the first axle shaft 18 and the second axle shaft 20 by rotating a differential control pinion gear 33 at a rotational velocity that is proportional to the desired differential in rotational velocity determined in step 1702. This method may be implemented as a continuous closed-loop process using appropriate feedback sensors.

In some embodiments, the desired differential in rotational velocity between the first axle shaft 18 and the second axle shaft 20 of the vehicle is also determined based on information regarding a width of the vehicle and a wheelbase of the vehicle.

In some embodiments, determining the desired differential in rotational velocity between the first axle shaft 18 and the second axle shaft 20 of the vehicle includes adding a factor related to a differential baseline during straight line travel based on a vehicle asymmetry. In some embodiments, this factor may be determined automatically by the control unit. The factor may be determined based on a sensed resistance to the desired differential rate during a period of time when the vehicle is in motion. In some embodiments, the period of time may fall in a range of 5 seconds to 20 minutes. In some embodiments, the period of time may fall in a range of 1 minute to 10 minutes.

In some embodiments, the desired differential may be modified, for example, based on measurements of a differential torque between the first axle shaft and the second axle shaft. In some embodiments, measurements of a differential torque are used to as feedback to continuously modify the desired differential. In some embodiments, measurements of long term relatively constant differential torque over time are used to determine a modification factor that is stored by the computer in memory for current and future application. In some embodiments, measurements of varying or instantaneous changes in the differential torque are also applied to modify the desired differential, but need not be stored by the computer in memory.

In some embodiments, the method 1700 may further includes determining a second desired differential in rotational velocity between a third axle shaft and a fourth axle shaft of the vehicle. The second desired differential may be determined based on, at least in part, the current steering angle of the vehicle and on the current rotational velocity of a second drive shaft of the vehicle. The second drive shaft may power a second differential to which the third axle shaft and the fourth axle shaft are connected. The method 1700 may further include sending a signal to a second variable speed reversible motor of the vehicle based on the desired second differential in rotational velocity to control relative rotation of the third axle shaft and the fourth axle shaft to match the desired second differential in rotational velocity to within a second allowable range. The second allowable range may be the same as or different than the allowable range in step 1704.

In an example embodiment, the first and second axle shafts may be shafts of a rear axle of the vehicle, and the third and fourth axle shafts may be shafts of a front axle of the vehicle. In some embodiments, the method 1700 may further include determining a third desired differential in rotational velocity between the first drive shaft and the second drive shaft of the vehicle based, at least in part, on the current steering angle of the vehicle and on the current rotational velocity output by the transmission or drive motor of the vehicle. The method 1700 may also include sending a signal to a third variable speed reversible motor of the vehicle based on the desired third differential in rotational velocity to control relative rotation of the first drive shaft and the second drive shaft to match the desired third differential in rotational velocity to within a third allowable range.

Figure 27:
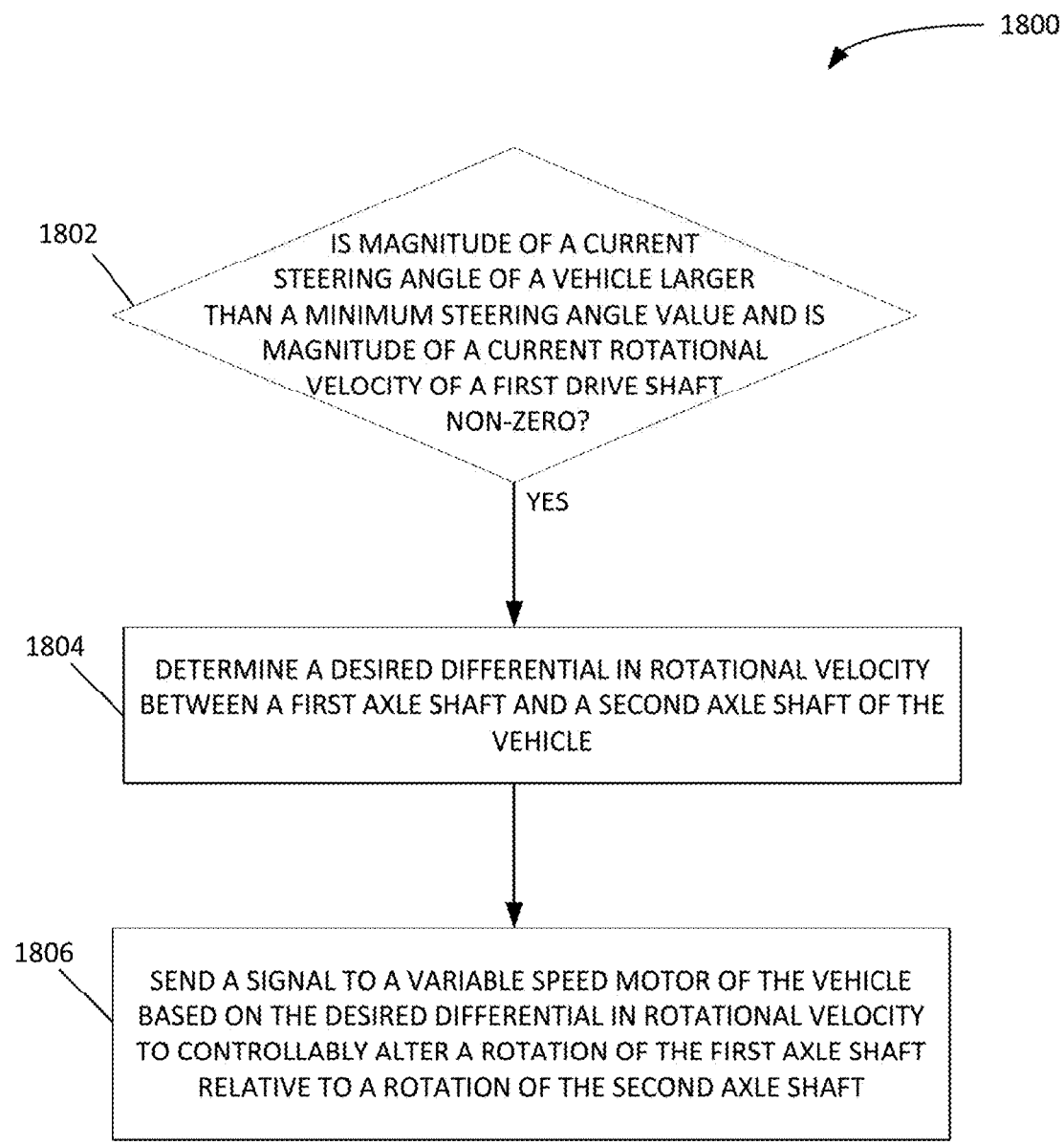
FIG. 27 is a flowchart of another method for operating a differential system in accordance with some embodiments.

FIG. 27 is a flowchart for a method 1800 for operating a differential system according to an example embodiment. The method 1800 begins at step 1802 where a control unit of a vehicle is programmed to determine whether a magnitude of a current steering angle of a vehicle is larger than a minimum steering angle value, and to determine if a magnitude of a current rotational velocity of a first drive shaft of the vehicle is non-zero. In some embodiments, the non-zero drive shaft rotational velocity condition is met when the rotational velocity is less than about 0.002 rpm.

If these conditions are met, then at step 1804, the microprocessor is programmed to determine a desired differential in rotational velocity between a first axle shaft and a second axle shaft of the vehicle. The desired differential in rotational velocity is determined, at least in part, based on the current steering angle of the vehicle and the current rotational velocity of the first drive shaft of the vehicle. The first drive shaft powers a differential to which the first axle shaft and the second axle shaft are connected.

At step 1806, the microprocessor of the vehicle is programmed to send a signal to a variable speed reversible motor of the vehicle based on the desired differential in rotational velocity determined in step 1804 to controllably alter a rotation of the first axle shaft relative to a rotation of the second axle shaft. This method may be implemented as a continuous closed-loop process using appropriate feedback sensors.

In an example embodiment, the variable speed reversible motor 24 controls relative rotation of the first axle shaft and the second axle shaft using a gearing assembly 14, 14' of the vehicle that is coupled to the variable speed reversible motor 24. The gearing assembly may be any of the gearing assemblies 14, 14' described herein.

In an example embodiment, if the magnitude of the current steering angle is larger than the minimum steering angle value and the magnitude of the current rotational velocity of the drive shaft is nonzero, then the microprocessor of the vehicle is programmed to determine a second desired differential in rotational velocity between a third axle shaft and a fourth axle shaft. The second desired differential in rotational velocity may be based on, at least in part, the current steering angle of the vehicle and the current rotational velocity of a second drive shaft of the vehicle. The second drive shaft may power a second differential to which the third axle shaft and the fourth axle shaft are connected. In this embodiment, the method 1800 may further include sending a signal to a second variable speed reversible motor of the vehicle based on the determined second desired differential in rotational velocity to controllably alter the rotation of the third axle shaft relative to the fourth axle shaft.

In an example embodiment, the first and second axle shafts may be shafts of a rear axle of the vehicle, and the third and fourth axle shafts may be shafts of a front axle of the vehicle. In this embodiment, the method 1800 may include determining a third desired differential in rotational velocity between the first drive shaft and the second drive shaft of the vehicle based on, at least in part, the current steering angle of the vehicle and the current rotational velocity output by the transmission or drive motor of the vehicle. The method 1800 may further include sending a signal to a third variable speed reversible motor of the vehicle based on the determined third desired differential in rotational velocity to controllably alter the rotation of the first drive shaft relative to a rotation of the second drive shaft.

The control unit may receive information regarding a sensed current steering angle of the vehicle and receive information regarding a sensed current rotational velocity of the drive shaft of the vehicle.

In some embodiments, the minimum steering angle value falls in a range of 0.01 degrees to 5 degrees. In some embodiments, the method 1800 includes changing the minimum steering angle based on a sensor input while the vehicle is in motion. In other embodiments, the method 1800 includes changing the minimum steering angle in response to a user input.

In some embodiments, a method of controlling a differential rotation rate in a vehicle need not employ information regarding a current steering angle and a current drive shaft speed and need not include calculating a desired differential rotation rate steering angle sensor and drive shaft speed sensor are not utilized In such an embodiment, a control unit prevents the difference in rotation rates between axle shafts from exceeding a specified limit. Such an embodiment may permit greater wheel slip in conditions of unequal traction as compared to some of the other example embodiments described, but will still prevent excessive wheel slip corresponding to differential rotation values beyond the specified limit.

Such an embodiment may employ a sensor or set of sensors to continuously measure the rotational speed of an axle shaft (e.g., first axle shaft 18, third axle shaft) in relation to the rotational speed of the other axle shaft for that axle (e.g., second axle shaft 20, fourth axle shaft). Such embodiments may also employ a sensor to measure torque acting on the variable speed reversible motor. Such an embodiment will permit the variable motor to rotate in compliance with any torque acting to create a difference between the rotational speeds of first axle shaft 18 and second axle shaft 20 within a programmed maximum allowable range. Such a maximum range will be determined based in part on the maximum difference in rotational speed between first and second axle shafts that could be plausibly achieved in non-slipping conditions for a vehicle equipped with such an embodiment. Should measured differential speeds exceed this maximum allowable range, the variable motor would be activated in opposition to the measured actual differential force.

In embodiments that employ a steering angle sensor 28 and drive shaft rotational sensor 29 to calculate and apply a desired differential rate, it may be desirable to provide an operational mode to handle a scenario where one or both of these sensors fail completely, produce an implausible signal, or otherwise become unreliable. Such a scenario would result in an inability to accurately calculate the desired differential rate and this may negatively affect the handling agility of the vehicle. Should such a sensor failure be detected, such embodiments that rely on these sensors in normal operation would enter a safety mode of operation that permits the variable speed reversible motor to turn in accordance with any rotational force acting to create a difference between the rotational speed of first axle shaft 18 and second axle shaft 20, up to a maximum plausible limit. Such a safety mode would be similar in operation to the embodiment described above that does not rely on data regarding a current steering angle and current drive shaft speed.

Variations from Desired Differential Rotational Speed

The discussion above addresses some embodiments of methods that include determining a desired rotational speed for each axle joined by a differential, or for determining a desired difference in rotational speeds between the axles joined by a differential for a given set of conditions. However, some methods described herein for operating a vehicle include a tolerance or a deviation from the determined desired rate or rates, which reflect the real world conditions in which a vehicle operates. Further, one of ordinary skill in the art, in view of the present disclosure, would appreciate that a vehicle operating with insignificant deviations from the determined desired rotational speed for each axle or from the determined desired difference in rotational speeds between the axles would still fall within the scope of the invention. In some embodiments, the desired differential rate is intentionally selected or set to be different from the natural differential rate to obtain desired steering behavior (e.g., oversteering and understeering) as described in a separate section below.

In some embodiments for a front-wheel steered vehicle, a control method calculates an upper and lower bound for the allowable differential rotation rate based on the vehicle's given configuration. A variable speed reversible motor 24 then governs the differential control pinion gear 33 to be within this calculated bound. Any undesired wheel slip due to traction imbalances is prevented as it would fall outside of the calculated bound.

Some methods described above disclose how to calculate and apply the desired differential rate for a given scenario; however, it is understood that this calculated rate would only be matched under ideal road conditions with a vehicle with properly inflated tires. The calculated rate being matched means that the calculated rate for the given input signals agrees with the differential rate that the vehicle actually experiences at that moment. This is also the situation of minimal resistance on the variable speed reversible motor. In reality, vehicles may be operated with asymmetrically inflated or worn tires, and on road surfaces that create differential suspension action. As a result, it is necessary to allow a tolerance for deviation from the desired differential rate in order to accommodate such real-world variances. There are several factors to consider, which are described below.

Plausible Upper and Lower Bounds:

In some embodiments, it is important that the motor connected to the differential be allowed to rotate at a rate that yields a differential rate of rotation between the axles that differs from the determined desired differential rate in order to accommodate unforeseen conditions such as the ones described below. However, the absolute rate of deviation from the determined desired differential rate should be bounded to a minimum and maximum value below and above the determined desired rate, respectively. This establishes a plausible upper and lower bound beyond which it would be reasonable to expect the vehicle would not experience such differential rates under normal control. The range of plausibility should be determined by each manufacturer for each vehicle based on a number of factors such as vehicle type its intended performance goals, and vehicle dimensions. Generally speaking, a broader plausible range with respect to determined desired differential rate is more forgiving, whereas a tighter range will more aggressively seek to achieve the desired differential rate and may lead to increased tire wear.

Constant Deviation Due to Vehicle Asymmetries:

To accommodate deviations from the determined desired differential rate due to asymmetries in the vehicle, one or more pressure or torque sensor sensors or some other method or device can be employed to measure the resistance being experienced by the variable speed reversible motor. This sensor would be able to detect a constant deviation from the desired differential rate that would result from a vehicle asymmetry such as tires on one side of the vehicle being under inflated. For example, in straight line travel, the under inflated tires would need to spin faster to make up the same distance as the other tires thus creating a constant deviating force from the calculated desired rate (which should be zero in straight line travel, but now must be non-zero to accommodate the asymmetry). In this situation, the algorithm would self-adjust to factor in the new "constant" asymmetry, and perhaps inform the driver via an information display, or triggering an OBD code should this condition continue for some pre-determined duration. Such scenarios (constant deviation due to vehicle asymmetry) where the differential must self-adjust to the new "normal", can be thought of as analogous to utilizing the tare function on a kitchen scale. As explained above, in some embodiments, the control unit may be programmed to make automatic adjustments to the desired differential rate based on the sensed resistance to imposing the desired differential rate over a period of time. Such adjustment values can be referred to as long-term differential trim.

Instantaneous Deviation Due to Asymmetrical Suspension Travel or Other Environmental Factors:

An additional source of deviation comes from asymmetrical suspension travel or rugged terrain conditions. However, this should be factored into the calculation of plausible upper and lower bounds. If a manufacturer desires a narrow range of plausible bounds above and below the determined desired rate, such that extreme suspension travel would regularly exceed the plausible bounds, then it may be necessary to factor suspension travel and allow a greater deviation under certain suspension conditions. In this case, sensors can be used to monitor the position of the vehicle's suspension and provide a greater allowable deviation. For example, if one side of the vehicle encounters undulating terrain causing heavy suspension travel, the wheels on that side are covering more "ground" and would need to be allowed to rotate slightly faster than the wheels on the other side. As explained above, in some embodiments, the range may be adjusted based on user input. As also explained above, in some embodiments, the range may be automatically adjusted during use based on sensor input during motion (e.g., input from torque sensors, acceleration sensors or sensors associated with the suspension). Such adjustment values can be referred to as short-term differential trim.

Intentional Deviation of Desired Differential Rate from Natural Differential Rate In some embodiments and under some circumstances the desired differential rate intentionally varies or deviates from the natural differential rate. For example the desired differential rate may intentionally deviate from the natural differential rate to influence handling of the vehicle or to correct for or otherwise reduce the magnitude of undesirable vehicle behavior (e.g., a desired rate greater than the natural rate corresponds to increased vehicle agility and favors oversteer). In some embodiments, this intentional deviation may be automatic and in response to current input from one or more vehicle sensors (e.g., in response to sensor information regarding acceleration of the vehicle indicating a yaw of the vehicle).

Aspects and some benefits of various embodiments are described below with respect to reference numbers employed in FIGS. 1-4D above merely for illustrative purposes. One of ordinary skill in the art in view of the present disclosure will appreciate that the notes below apply to other configurations of vehicles and other gearing assemblies as well.

Some embodiments provide a gearing assembly 14, 14' that is connected to a variable speed reversible motor 24 (e.g., a servo motor, a stepper motor, a hydraulic motor), which is controlled by a control unit a computer or computing device of a vehicle (e.g., an engine computer 26). The gearing assembly 14, 14' includes a differential 40, which connects with a first axle shaft 18 and a second axle shaft 20 of a vehicle, and first and second pluralities of adjustment gears 15a, 15b which are configured to controllably alter the rotation rate of the first axle shaft 18 relative to the rotation rate of the second axle shaft 20 using the variable speed reversible motor 24. As noted above, in some embodiments steering clutches are used instead of a variable speed reversible motor 24 to controllably alter the rotation rate of the first axle shaft 18 relative to that of the rotation rate of the second axle shaft 20.

In some embodiments, the gearing assembly 14, 14' does not rely on friction when altering the rotation rate of the first axle shaft 18 relative to that of the second axle shaft 20. This is beneficial because gearing assemblies that rely on friction, e.g., limited slip differentials for front-wheel steered vehicles, allow for some slip of axles and wheels, which can detract from the safety of a vehicle. In contrast, some embodiments of the gearing assembly disclosed herein that do not rely on friction to alter the rotation rate of the first axle shaft relative 18 to the second axle shaft 20 do not allow for any slip of axles and wheels. Further, limited slip differentials allow some loss of torque to a slipping wheel, which does not occur with embodiments claimed herein that do not rely on friction when altering the rotation rate of the first axle shaft relative to the second axle shaft.

Embodiments that strictly enforce the determined desired differential in rotational speed between axle shafts allow no slip; however, even embodiments that allow for the actual differential in rotational speed between axles to deviate from the desired differential within specified upper and lower bounds, which allow a small amount of slip, allow only a small amount of slip when compared to conventional friction-based designed for differential and for limited-slip differentials.

Another benefit of some embodiments that do not rely on friction or that allow only a slight deviation from the desired differential in rotational speed between the axel shafts is the reduction or elimination of torque-steer, which occurs due to unequal torque being supplied to drive wheels. Traditional limited slip differentials can actually exaggerate torque steer due to shifting torque between the left and right wheels and allowing large torque differences between the left and right wheels. By governing allowable rotation rates, methods and gear assemblies described herein can prevent torque imbalances from causing differences between left and right wheel rotational speeds under acceleration. In some embodiments, under high acceleration where torque steer is most noticeable, the allowable deviation from the desired differential in rotational speeds may be reduced to ensure that the left and right wheels rotate together to further prevent torque steer.

Another benefit of some embodiments that do not rely on friction or that allow only a slight deviation from the desired differential in rotational speed between the axels is a reduction or elimination of lag time in addressing or mitigating wheel slip. Many friction-based designs utilize wheel speed sensors to detect wheel slip and apply friction components to reduce slip. In certain situations such as climbing a hill under low traction, the delay required to detect and mitigate slip can cause an undesirable loss in vehicle momentum up the hill. By continuously calculating and applying the desired differential rotation rate for each axle over time, this system does not suffer from this undesirable delay.

As may be recognized by those of ordinary skill in the pertinent art based on the teachings herein, numerous changes and modifications may be made to the above-described and other embodiments of the present disclosure without departing from the spirit of the invention as defined in the appended claims. Accordingly, this detailed description of embodiments is to be taken in an illustrative, as opposed to a limiting, sense. Those skilled in the art will recognize, or be able to ascertain using no more than routine experimentation, many equivalents to the specific embodiments described herein. Such equivalents are intended to be encompassed by the following claims.

What is claimed is:

1. A gearing assembly comprising:
   a differential configured to engage a first axle shaft and a second axle shaft of a vehicle and configured to be driven by a drive shaft of the vehicle;
   a differential control pinion gear different than and separate from a pinion gear driven by the drive shaft of the vehicle, the differential control pinion gear configured to be driven by a variable speed reversible motor of the vehicle;
   a first plurality of adjustment gears configured to engage the differential and to engage the differential control pinion gear, the first plurality of adjustment gears comprising:
      a first planetary gear carrier;
      a first set of stepped planetary gears, each coupled to the first planetary gear carrier and each including a larger diameter portion affixed to or integral with a smaller diameter portion, the larger diameter portion being coaxial with the smaller diameter portion; and
      a second set of stepped planetary gears, each coupled to the first planetary gear carrier and each including a larger diameter portion affixed to or integral with a smaller diameter portion, the larger diameter portion being coaxial with the smaller diameter portion; and
   a second plurality of adjustment gears configured to engage the differential and to engage the differential control pinion gear, the second plurality of adjustment gears comprising:
      a second planetary gear carrier;
      a third set of stepped planetary gears, each coupled to the second planetary gear carrier and each including a larger diameter portion affixed to or integral with a smaller diameter portion, the larger diameter portion being coaxial with the smaller diameter portion; and
      a fourth set of stepped planetary gears, each coupled to the second planetary gear carrier and each including a larger diameter portion affixed to or integral with a smaller diameter portion, the larger diameter portion being coaxial with the smaller diameter portion;
   wherein the first plurality of adjustment gears and the second plurality of adjustment gears are configured to controllably alter a rotation rate of the first axle shaft relative to a rotation rate of the second axle shaft through rotation of the differential control pinion gear produced by the variable speed reversible motor.

2. The gearing assembly of claim 1, wherein the first plurality of adjustment gears further comprises a first externally toothed ring gear having external teeth configured to be driven by the differential control pinion gear and having internal teeth configured to intermesh with the first set of stepped planetary gears; and
   wherein the second plurality of adjustment gears further comprises a second externally toothed ring gear having external teeth configured to be driven by the differential control pinion gear and having internal teeth configured to intermesh with the third set of stepped planetary gears.

3. The gearing assembly of claim 2, wherein the external teeth of the first externally toothed ring gear are configured to intermesh with the differential control pinion gear; and
   wherein the external teeth of the second externally toothed ring gear are configured to intermesh with the differential control pinion gear.

4. The gearing assembly of claim 2, wherein the external teeth of the first externally toothed ring gear are configured to intermesh with the differential control pinion gear;
   wherein the gearing assembly further comprises a reversing shaft including a first set of external teeth that are configured to intermesh with the differential control pinion gear; and
   wherein the external teeth of the second externally toothed ring gear are configured to intermesh with a second set of external teeth of the reversing shaft.

5. The gearing assembly of claim 2, wherein the gearing assembly further comprises:
   a first extension shaft including a gear configured to intermesh with the differential control pinion gear and a gear configured to intermesh with the external teeth of the first externally toothed ring; and
   a second extension shaft including a gear configured to intermesh with the differential control pinion gear and a gear configured to intermesh with the external teeth of the first externally toothed ring.

6. The gearing assembly of claim 5, wherein the differential control pinion gear is a bevel pinion gear;
   wherein the gear of the first extension shaft configured to intermesh with the differential control pinion gear is a bevel gear; and wherein the gear of the second extension shaft configured to intermesh with the differential control pinion gear is a bevel gear.

7. The gearing assembly of claim 5, wherein the gear of the first extension shaft configured to intermesh with the external teeth of the first externally toothed ring is a spur gear or a helical gear; and
wherein the gear of the second extension shaft configured to intermesh with the external teeth of the second externally toothed ring is a spur gear or a helical gear.

8. The gearing assembly of claim 2, wherein teeth of the larger diameter portion of each stepped planetary gear in the first set of stepped planetary gears are configured to intermesh with the internal teeth of the first externally toothed ring gear; and
wherein teeth of the larger diameter portion of each stepped planetary gear in the third set of stepped planetary gears are configured to intermesh with the internal teeth of the second externally toothed ring gear.

9. The gearing assembly of claim 8, wherein the gearing assembly is configured such that rotation of the differential control pinion gear drives a first rotation of the first externally toothed ring gear and an equal and opposite rotation of the second externally toothed ring gear.

10. The gearing assembly of claim 2, wherein the differential control pinion gear is a bevel pinion gear;
wherein the external teeth of the first externally toothed ring gear are beveled; and
wherein the external teeth of the second externally toothed ring gear are beveled.

11. The gearing assembly of claim 2, wherein the gearing assembly further comprises one or more torque sensors configured to provide information regarding an instantaneous differential torque between the first axle shaft and the second axle shaft.

12. The gearing assembly of claim 2, wherein the differential further comprises a carrier housing, and wherein the gearing assembly further comprises:
a first differential sun gear coupled to, attached to, or integral with the carrier housing, wherein the first set of stepped planetary gears is configured to engage the first differential sun gear, and wherein the first plurality of adjustment gears interact with the differential through the first differential sun gear; and
a second differential sun gear coupled to, attached to, or integral with the carrier housing, wherein the third set of stepped planetary gears is configured to engage the second differential sun gear, and wherein the second plurality of adjustment gears interact with the differential through the second differential sun gear.

13. The gearing assembly of claim 12, wherein the smaller diameter portion of each stepped planetary gear in the first set of stepped planetary gears is configured to engage the first differential sun gear; and
wherein the smaller diameter portion of each stepped planetary gear in the third set of stepped planetary gears is configured to engage the second differential sun gear.

14. The gearing assembly of claim 1, wherein the differential further comprises a carrier housing.

15. The gearing assembly of claim 14, further comprising:
a first differential sun gear coupled to, attached to, or integral with the carrier housing, wherein the first set of stepped planetary gears is configured to engage the first differential sun gear, and wherein the first plurality of adjustment gears interact with the differential through the first differential sun gear; and
a second differential sun gear coupled to, attached to, or integral with the carrier housing, wherein the third set of stepped planetary gears is configured to engage the second differential sun gear, and wherein the second plurality of adjustment gears interact with the differential through the second differential sun gear.

16. The gearing assembly of claim 15, wherein the smaller diameter portion of each stepped planetary gear in the first set of stepped planetary gears is configured to engage the first differential sun gear; and
wherein the smaller diameter portion of each stepped planetary gear in the third set of stepped planetary gears is configured to engage the second differential sun gear.

17. The gearing assembly of claim 14, wherein the carrier housing is a miter gear carrier.

18. The gearing assembly claim 1, further comprising:
a first axle sun gear coupled to, attached to, or integral with the first axle shaft, wherein the second set of planetary gears is configured to engage the first axle sun gear; and
a second axle sun gear coupled to, attached to, or integral with the second axle shaft, wherein the fourth set of planetary gears is configured to engage the second axle sun gear.

19. The gearing assembly of claim 18, wherein the smaller diameter portion of each stepped planetary gear in the second set of stepped planetary gears is configured to engage with the first axle sun gear; and
wherein the smaller diameter portion of each stepped planetary gear in the fourth set of stepped planetary gears is configured to engage with the second axle sun gear.

20. The gearing assembly of claim 1, wherein the gearing assembly further comprises one or more torque sensors configured to provide information regarding an instantaneous differential torque between the first axle shaft and the second axle shaft.

* * * * *